(12) United States Patent
Stolarczyk

(10) Patent No.: US 8,542,114 B2
(45) Date of Patent: *Sep. 24, 2013

(54) CAP-LAMP AND COMMUNICATIONS SUPPORT SYSTEM

(75) Inventor: Larry G. Stolarczyk, Raton, NM (US)

(73) Assignee: Stolar, Inc., Raton, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,470

(22) Filed: Feb. 12, 2012

(65) Prior Publication Data

US 2013/0157713 A1 Jun. 20, 2013

Related U.S. Application Data

(63) Continuation-in-part of application No. 12/275,205, filed on Nov. 20, 2008, now Pat. No. 8,115,622.

(60) Provisional application No. 60/991,208, filed on Nov. 29, 2007.

(51) Int. Cl.
*G08B 1/08* (2006.01)

(52) U.S. Cl.
USPC ................................................ 340/539.13

(58) Field of Classification Search
USPC .......... 340/539.13, 572.1–572.9, 10.1, 573.1; 455/404.2
See application file for complete search history.

(56) References Cited

U.S. PATENT DOCUMENTS

| | | | | |
|---|---|---|---|---|
| 4,495,496 A | * | 1/1985 | Miller, III | 340/10.2 |
| 4,879,755 A | * | 11/1989 | Stolarczyk et al. | 725/41 |
| 5,438,321 A | * | 8/1995 | Bernard et al. | 340/573.4 |
| 5,635,907 A | * | 6/1997 | Bernard et al. | 340/573.4 |
| 8,294,568 B2 | * | 10/2012 | Barrett | 340/539.11 |
| 2012/0071121 A1 | | 3/2012 | LeVan | |

OTHER PUBLICATIONS

MagneLink® Magnetic Communication System (MCS) Through-The-Earth Two-Way Emergency Wireless Communications for Mine Industry Safety, (c) 2011, Lockheed Martin Mission Systems & Sensors, Wash. DC.

Tapping Tesla to Save Trapped Miners, by Phil Berardelli on Aug. 20, 2010, Science Now, ISSN 1947-8062.

* cited by examiner

*Primary Examiner* — Phung Nguyen

(74) *Attorney, Agent, or Firm* — Richard B. Main; Main Law Firm

(57) ABSTRACT

An underground radio communications and personnel tracking system uses a cap-lamp worn by a miner when underground in a mine. A cap-lamp transceiver provides voice and text communication on ultra-low frequency (ULF) to ultra-high frequency (UHF) carrier frequencies and modulation adapted by programming of a software defined radio to making selective and agile radio contacts via through-the-earth, conductor/lifeline, coal seam, tunnel, and ionosphere/earth-surface waveguides for transmission of electromagnetic waves. These waveguides comprise layered earth coal and mineral deposits, and manmade mining complex infrastructures which serendipitously form efficient waveguides. Ultra-Low Frequency F1/F1 repeaters are placed underground in the mine, and providing for extended range of communication of the cap-lamp transceiver with radios and tracking devices above ground of the mine.

7 Claims, 14 Drawing Sheets

CAP-LAMP AND COMMUNICATIONS SUPPORT SYSTEM

RELATED APPLICATIONS

This Application claims benefit of United States Provisional Patent Application, Emergency and Operational Communications and Tracking (RadCAT) System for Underground Mines, Ser. No. 60/991,208, filed Nov. 29, 2007, by Larry G. Stolarczyk, and is incorporated herein by reference. This Application further is a Continuation-In-Part of U.S. patent application Ser. No. 12/275,205, filed Nov. 20, 2008, and titled, UNDERGROUND RADIO COMMUNICATIONS AND PERSONNEL TRACKING SYSTEM, and which will issue as U.S. Pat. No. 8,115,622, on Feb. 14, 2012.

FIELD OF THE INVENTION

The present invention relates to radio systems, and more particularly to methods and circuits for communicating with and locating miners underground.

DESCRIPTION OF THE PRIOR ART

The Farmington Mine disaster was a high energy methane gas and energetic coal dust explosion in 1968 probably caused by mining into an abandoned gas well casing. Days went by with rescue teams wondering why they could not communicate with the trapped miners. Afterwards, Congress enacted the Federal Coal Mine Health and Safety Act of 1969, which was amended in 1977, and appropriated funds for the U.S. Bureau of Mines (USBM) to develop programs to overcome technology gaps. Unfortunately, the challenge of providing cost-effective wireless mine-wide emergency, post-accident, and operational communications has largely remained unresolved since the Farmington Mine disaster.

Various researchers have tried to develop a "radio geophysics" theory to explain the propagation of electromagnetic energy through slightly conductive media and the natural waveguides created by underground mine infrastructure. At least one technology team has successfully validated and demonstrated wireless ultra low-frequency band (300-3,000 Hz) through-the-earth (TTE), mine-wide wireless low-frequency band (30-300 kHz), and medium-frequency band (300-3,000 kHz) emergency and operational communications via virtual waveguides incidental to typical underground mine infrastructures.

Mining accident investigations found that three-phase AC electrical power distribution and supporting messenger cables often survive catastrophes. Such cables can be shanghaied into serving as radio signal conduits. This happenstance means that a robust EM signal distribution antenna and transmission infrastructure can be pressed into service for wireless medium frequency (MF) communications with miners on the move was already available in underground mines. And the best piece of equipment to enhance with portable communications capabilities that miners would be sure to carry without fail is their cap-lamp.

Tests have demonstrated that the air-filled entries, tunnel, cabling conduits, and pipes can behave like virtual waveguides, albeit with a characteristic cut-off frequency. Below the cut-off frequency, the propagation constant is imaginary, and evanescent mode electro-magnetic (EM) waves will not propagate. The actual cut-off frequencies depend on the physical dimensions, e.g., the height and width of escape-way entries. The dimensions of a typical entry usually put the cut-off frequencies in the VHF band, thus permitting radio wave propagation at higher frequencies in the UHF band. The propagation constant becomes imaginary in accidents that cause squeezing and structure collapse. The attenuation rate of VHF/UHF band EM waves through a roof fall is approximately 10-dB/foot, while attenuation rate through mine water inundations increases to over 400-dB/foot.

The Wilberg Mine fire disaster was caused by an exploding air compressor and fire in a fresh-air entry at a crosscut. A fire investigation report accused the mine management of trying to set a production record at the time of the fire. If emergency mine-wide radio communications has been available, the only miner that did escape could have given directions for the others to walk the 3,000-foot to safety through a series of belt and dogleg entries out through a man door into a return entry of the mains. Self-contained self-rescuer (SCSR) failures and their training prevented some of the miners from escaping. The opportunity for escape lasted for only a few minutes and needed direct voice radio communications between miners.

In one mine fire, trapped miners were in a state of confusion and desperately tried to find alternate escape-ways. The miners on the move knew that a designated tailgate escape-way was blocked by a roof fall. Dense smoke and soot blocked the intake and belt entries near the mouth of the panel. The trapped miners needed wireless radio transceivers that would allow them to communicate by voice while on the move in escape-ways filled with dense smoke, soot, and dangerous gases. The regulation SCSR mouthpieces actually inhibit being able to talk. So throat microphones need to be included with the mouthpieces and face masks.

Recently, some third generation MF transceivers were approved as MSHA intrinsically safe, and made mine-wide wireless communications systems possible. See, U.S. Pat. Nos. 4,777,652 and 4,879,755. Herein, "wireless" refers to any connecting link between a miner-on-the-move and a distributed antenna and transmission facility. Mine-wide wireless and LF/MF communication systems have already been installed in operating underground coal mines. These have operated with as much as 20,000 feet of transmission distance between an intrinsically-safe (IS) portable transceiver at the face out-by, and a base station at the portal without requiring repeaters.

Repeaters designed to amplify the radio signals can be installed to increase the coverage area of voice communication between roving miners. Some miners have been able to keep in touch while moving along ten miles of travel-ways. A 2-dB/kilometer attenuation rate in the lower end of the MF band of already installed conductor waveguides requires that the repeaters be included 5,000 to no more than 10,000 feet apart. In some installations, using the repeater access frequency (F2), the distribution frequency (F1), and the intra-repeater transmission frequencies (F3 and F4) required four separate resonate loop antennas at each repeater site. Repeaters are required to amplify MF signals from miners' transceivers to overcome transmission path attenuation and the 17-dB transmission loss that occurs when MF signals pass by power centers.

In 2006, the Sago Mine owned by International Coal Group experienced a methane gas explosion behind seals in an abandoned part of the mine. The explosion trapped its miners without a way to communicate with surface personnel 13,000 feet above. The trapped miners erected a barricade, harbored their oxygen generators (SCSR's), and scribbled notes to their families. If communications had been available, they could have been given instructions for a 1,500-foot walk to fresh air. Following the explosion, the trapped miners believed that the mine's escape-way was blocked. The pager telephone communications cable had been disabled. They were unable to receive information that the escape-way was not blocked. Like the Wilberg accident, mine-wide wireless communications were needed. The miners were in a state of confusion, hindered by low visibility conditions, wearing SCSR's, desperate, and on the move.

Commercial off-the-shelf (COTS) wide-bandwidth VHF/UHF communication equipment, such as leaky-feeder communications equipment, cannot be relied on in emergency situations and post-accident conditions. Leaky-feeder cable is adequate for operational communications and can be used for a distributed antenna and a transmission facility enabling a wireless link to miners-in-motion. Leaky-feeder technology can be improved and installed in US mines for operational communications to improve safety and productivity.

The Mine Improvement and New Emergency Response Act of 2006, calls for post accident communication between underground and surface personnel via a wireless two-way medium, and calls for an electronic tracking system permitting surface personnel to determine the location of any persons trapped underground. Because such post-accident wireless communications equipment was not commercially available, the MINER Act language was interpreted by MSHA to mean redundant communications infrastructure. The West Virginia Office of Miner's Health, Safety, and Training established early mandates for installing wireless communications and tracking equipment. Leaky-feeder cable communication systems, developed in Europe for tunnel communications in the 1970's, were installed in the mine passageways of some underground coal mines. By 2009, redundant "wired" communication systems were installed.

In 2007, the MSHA administrator wrote a letter to Congress saying that if leaky-feeder cable technology were to be installed in underground mines, there would be no compelling reason to develop and install wireless communications systems when they became available in the future.

Under an Interagency Agreement, the Joint Spectrum Center of the Defense Information Systems Agency developed and commented on EM propagation models for the frequency bands and modes supported by underground mine infrastructures. Transmission line theory can be expanded to include fundamental laws governing mode conversion from bifilar to monofilar, or vice versa, and how dead zones can be avoided by changing the way electrical cables are deployed in mines. This information would have been exceedingly important in formulating the MINER Act requirement for lifeline conductor waveguides and how they are deployed. Shielded parallel resonant loop antennas are used in receiver circuits, and series resonate loop antennas are used when radiating.

MF mesh network modeling tools can be applied in determining performance metrics such as end-to-end delay and packet delivery rate. Mesh networks are designed with nodes that receive and re-transmit digital data according to protocols. Bandwidth efficient minimum shift key (MSK) modulation methods are of great importance in digital data transmission for control and automation of mining equipment. Mesh network protocols enable routing of information through other nodes in the network to the destination. The protocols automatically establish alternative, self-healing paths whenever the direct path becomes disabled. MSK transmission needs sufficient bandwidth to support digital modulation schemes and may operate in the MF and UHF bands. The MF mesh network that was analyzed operated at a transmission bit rate of 26-kHz.

A commercially available analog VHF/UHF band leaky-feeder cable radio system was ruggedized and enhanced in OMSHR projects to include intrinsically-safe (IS) features and UHF capabilities. Commercial-of-the-shelf, wearable radio transceivers are able to support VHF/UHF wireless communications links between miners on the move and the distributed antenna and transmission facility of the leaky-feeder system. Leaky-feeder cables are installed in the fresh-air, man and material entries with "T" couplers positioned at several-hundred-foot intervals along the cable. A coupler with an attached long coaxial cable passes through crosscuts to a directional antenna, extending the radio coverage area into nearby entries. But such antennas are not likely to withstand explosions or fires.

Some technologists believe that leaky-feeder cable is not robust enough and needs a redundant path to the surface to comply with MSHA's interpretation of the MINER Act. A VHF/UHF to MF bridge repeater can be added to robust conductor waveguides to provide a robust redundant signal path to the surface. When the working sections and face areas in coal mines are rapidly moved forward, timely extensions of the leaky-feeder cable get to be a problem. Bridge repeaters are connected to the end of the leaky-feeder cable to convert the radio signals to MF for transmission on cables serving the face. A second repeater converts the signals back to the VHF/UHF band to establish communications with the miners roving in the face area. Roving miners working in the vicinity of the face can then use the wireless VHF/UHF radio link to communicate with the network.

Special amplifiers are under development by many to improve leaky-feeder cable system redundancy. Some UHF mesh and leaky-feeder system technical teams have partnered with mining companies in "early-adopter" demonstrations. A few mines rebuff UHF mesh network systems. The spacing requirements between nodes are very short, less than 1,000 feet, and requiring a significant number of nodes. The mesh nodes are essentially repeaters, so the data rates are slowed down across the mesh. Fiber-optic transmission systems are better for transmitting video and high-speed data, but such systems are not likely to remain operational following an accident, like a methane ignition, a high-energy coal dust explosion, or a Wilberg-like fire.

On Aug. 5, 2010, the Massey Energy Company Upper Big Branch coal mine exploded killing twenty-nine miners, the likely cause of the accident was a coal dust explosion that propagated from a methane ignition. A longwall shearer rotating cutting drum steel cutting edges intersected the aluminum oxide of a sandstone paleochannel and released more than 0.25 millijoules of energy that ignited the methane gas and energetic coal dust. A partially installed leaky-feeder communication system could not be made to function during the rescue and recovery efforts.

The Jellico water inundation trapped three miners for fourteen hours. UHF communications and a tracking mesh network failed when the access point equipment was immersed in mine water. The network featured algorithmic codes to self-heal for network redundancy. But the attenuation caused by the water inundation was too much to overcome.

SUMMARY OF THE INVENTION

Briefly, a system embodiment of the present invention comprises a transceiver disposed in a miner's cap-lamp. A number of radio repeaters are buried in periodically spaced bores in the mine shaft ceilings and walls. These collect communications and tracking locator information, and send the data up to an operations center on the surface. The cap-lamp transceiver opportunistically selects and connects through one or more of the several natural and unintended artificial waveguides that exist in a typical mine. These include radio waveguide equivalents formed by the mine shaft tunnels, the coal seam deposits, random pipes and wires, and yellow life lines.

These and other objects and advantages of the present invention no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
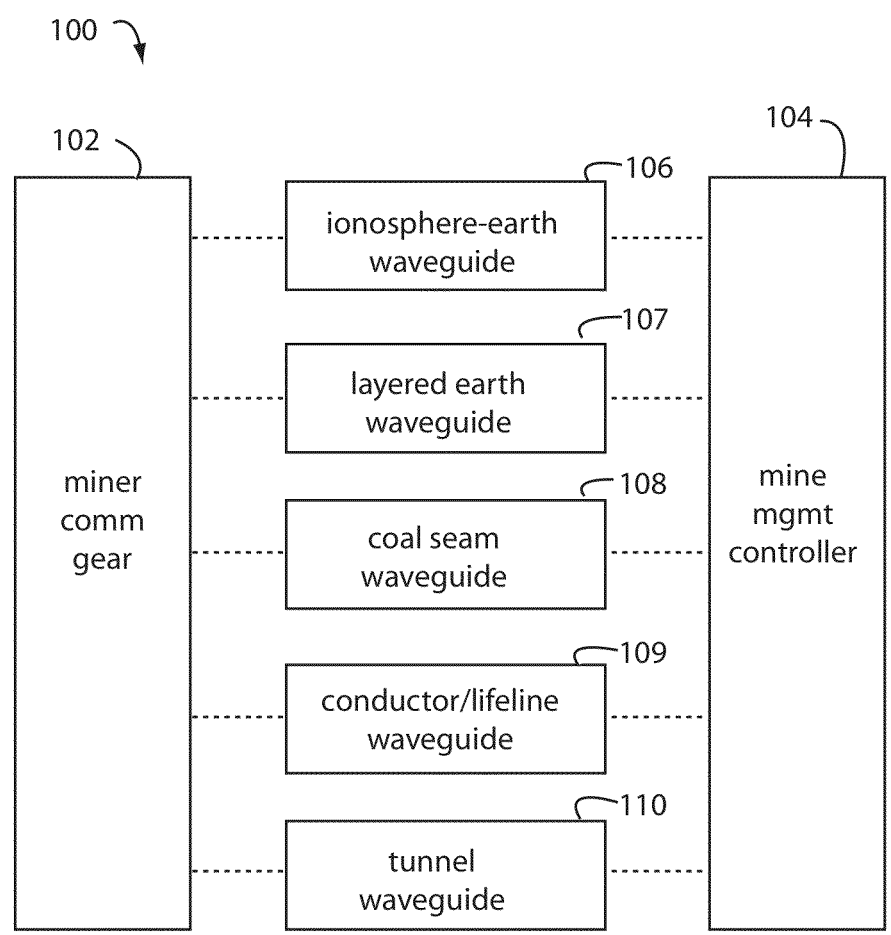
FIG. 1 is a schematic diagram of a radio-transmitter power-output amplifier for use in a wireless telemetry device.

In FIG. 1, a mine wide wireless emergency and operational radio communications and tracking system (RadCAT) 100 takes advantage of at least five different virtual radio waveguides that can be exploited within a typical mining complex infrastructure. Miner communication gear 102 is configured to communicate with a mine management controller 104 over several different radio communication medium and pathway channels 106-110. Each has an optimum carrier frequency and communication bit rate that is controlled by the physics on the mediums involved. For example, an ionosphere earth surface-waveguide (IEW) 106 can support multiple bands, a layered earth waveguide (LEW) 107 uses the ULF band and a 12-80 bps rate, a coal seam waveguide (CSW) 108 uses the LF band and an 1800-bps rate, a conductor/life line waveguide (CLLW) 109 uses the LF band and a 4800-bps rate, and a tunnel waveguide (TW) 110 can support a very wide bandwidth UHF/fiberoptic. The miner communication gear 102 and mine management controller 104 must both provide appropriate transceivers for each communication channel 106-110, and they must synchronously adapt in real time as each channel independently and unpredictably fades in and out.

Channels 106-110 change their characteristics very slowly as the mine topology evolves. Characteristics change too as the individual miners move about, and very quickly when catastrophes strike. The miner communication gear 102 includes a cap-lamp transceiver implemented with a software definable transceiver (SDT) for text messaging, voice communication, and tracking with passive radio frequency identification (RFID) tags installed in every entry at regular intervals.

A mine wide emergency transmission system includes narrow bandwidth F1/F1 repeaters with radio carriers that operate in the ultra low frequency (ULF) 300-3000 Hz band and low frequency (LF) 30-300 kHz bands. Multi-frequency and modulation capabilities are realized by using a software-definable transceiver (SDT) design. The digital core electronics design can thus be shared between the cap-lamp transceivers and F1/F1 repeaters.

A so-called "Yellow-CAT" lifeline capable of supporting low frequency (LF) Hill-Wait bifilar mode of transmission is installed in any of the entries of a mining complex. A Yellow-CAT cable is augmented with a multi-fiberoptic cable for very wide bandwidth transmission. Each face power center and refuse chamber is equipped with 2000-Hz through-the-earth transmission infrastructure.

Electromagnetic (EM) waves propagating in an ionosphere-earth waveguide 106, or coal seam waveguide 108, typically exhibit a vertically polarized electric field component and horizontally polarized magnetic field component. Electro-dynamic boundary conditions are such that charge builds up at the top boundary (ionosphere) and an opposite charge builds up at the bottom (earth). Electric field vectors start on a positive charge and end on a negative charge. The build up of charge on each boundary causes a weaker horizontally polarized electric field component to exist. The polarization alternates every half wavelength of travel distance. The transmission mode is quasi-transverse electromagnetic (quasi-TEM). The horizontally polarized electric and magnetic field components are responsible for transmission of energy through the surface interface and into the through-the-earth waveguide. Cloud to cloud lightning discharges can significantly increase the magnitude of the horizontal field components.

The coal seam waveguide 108 supports quasi-TEM transmission modes, and is cut off for higher order modes. The ionosphere-earth waveguide 106 supports terrestrial modes including direct, ground wave and reflections from the ionosphere boundary. The conductor-life line waveguide 109 supports both monofilar and bifilar transmission modes. These modes enable mine-wide wireless communication and tracking in emergency and operational conditions.

The ionosphere-earth waveguide (IEW) 106 dominates in the trapped miner communications and tracking problem. The usual radio frequency interference (RFI) in the IEW is often orders of magnitude greater than the magnitude of a surface signal (S) propagating upward from a trapped miner. Surface text message communications to trapped miners requires suppression of the surface RFI noise by factors of one hundred (40-dB) to 1,000 (60-dB).

The very high reflection loss at the free space-earth boundary and the high absorption (attenuation rate) of the signal traveling through natural media can cause problems. The ionosphere-earth waveguide (IEW) is formed by layers of trapped solar wind charged ions approximately 100 Km above the earth's surface upper (ionosphere) and lower (earth) conductive layers. A lightning strike anywhere on the earth's surface initiates quasi-TEM EM wave transmissions that circle the earth with the electrical (E) and magnetic (M) field components alternating polarity.

Transmitting antennas radiate energy that travels along a transmission path to a receiving antenna. Any radio frequency interference (RFI) and thermal noise spectra density appearing in the receiver bandwidth are noise (N) added to the signal (S) in the receiver signal path. The electromagnetic wave electric (E) and magnetic (H) field components phase varies along the path (x)

The electric and magnetic field components are "in phase" when traveling along the transmission facility. However, they are orthogonal (90°) to each other. Each field component varies sinusoidally in time at a fixed location (x). Also at a fixed instant of time (t), there is a sinusoidal variation in space along the direction of propagation (x). The distance traveled for one complete cycle is a wavelength ($\lambda$), which is represented mathematically by $$\lambda = \frac{c}{f\sqrt{\varepsilon_r}} \text{ in meters,} \qquad (2\text{-}1)$$

where, $c=3\times10^8$ is the speed of light in meters/second, f=frequency of the energy exchange between the electric (E) and magnetic fields (H) in hertz, and $\varepsilon_r$=relative dielectric constant of the natural media.

The electric and magnetic fields can be mathematically represented by sinusoidal waveforms that shift in phase by 360 electrical degrees when traveling a distance of one wavelength.

A short vertical electrical conductor is called an vertical electric dipole (VED) and will reproduce an electromotive force (emf) voltage waveform similar to the electric field sinusoidal waveform mathematically expressed as $$\text{emf} = h_{ef}E = C\cos\left(\omega t - \frac{2\pi x}{\lambda} + \phi\right), \qquad (2\text{-}2)$$

where $h_{ef}$=effective height of the antenna,

E=amplitude of the electric field in volts/meter,

C=maximum magnitude of the sine wave signal, $\omega=2\pi f$ is the radiant frequency and f is the frequency in Hz, x=travel distance, $\Phi$=initial phase angle when leaving the transmitter, and t=continuing time.

A small coil of wire called a magnetic dipole will reproduce an electromotive force (emf) voltage sinusoidal waveform. The emf voltage is derived from Faradays Law as $$\text{emf} = -N\frac{d}{dt}\int B \cdot dA = -N\frac{d\phi}{dt} \text{ in volts,} \qquad (2\text{-}3)$$

where N=number of turns of magnetic wire in building the coil, $\Phi$=flux (webers) of the magnetic field threading the area (A) of the coil, and A=area vector enclosed by the parameter of the coil wire in square meters.

The flux has a time dependence given by $e^{i\omega t}$ and given by the scalar dot product of the magnetic field and area vectors as $$\Phi = A \cdot B \text{ in webers,} \qquad (2\text{-}4)$$

where $B=\mu H$ the magnetic field density vector in webers/square meter,

H=magnitude of the magnetic field intensity in amperes/meter, and $\mu=\mu_r\mu_o$=magnetic permeability; $\mu_o=4\pi\times10^{-7}$ henries/meter and $\mu_r$ is the relative magnetic permeability of the natural media.

Transmission infrastructure can be VHF leaky-feeder cables, UHF mesh air transmission paths, or MF lifelines and messenger cable waveguides. Along the path, energy is lost because of the spreading of the wave front on an expanding surface area when traveling away from the transmitted antenna, e.g., the spreading loss. For distances greater than ⅓ wavelength, the wave front appears to be an expanding toroidal surface expanding away from an electrically short antenna, resulting in an omni-directional antenna pattern. Arrays and other configurations of antennas can be made to alter the wave front into a beam and reduce the spreading loss, for antenna gain. In a uniform media, the transmission path total loss (TL) is, TL=spreading loss+the media attenuation rate×(separation distance). (2-5)

When the transmission path is through free space, the TL is due to spreading loss. Reflections can alter the TL. A comparison of attenuation loss for different media is given in Table 2-1.

TABLE 2-1

Comparison of Attenuation Loss as a Function of Travel Distance

| Media | Attenuation Rate (dB/km) |
| --- | --- |
| Mine water @ 300 MHz | At least 180,000 |
| Rock @ 2000 Hz | 180 |
| Coal @ 300 kHz | 161 |
| Coaxial Cable @ VHF or UHF | 30 or 60 |
| Clean air | 0-dB |
| Conductor waveguide (lifeline) | 2-dB |

Mine entries driven into natural media to create the mine infrastructure transform into natural waveguides for VHF/UHF band EM waves. A rectangular waveguide with dimensions a (width) and b (height) have cut-off frequencies given by, $$f_{cmm} = c\left[\left(\frac{m}{a}\right)^2 + \left(\frac{n}{b}\right)^2\right]^{1/2} \text{ in Hertz.} \qquad (2\text{-}6)$$

For transverse electric (TE) modes, m and n may be zero, but not simultaneously. The cut-off frequency is given by, $$f_c = \frac{c}{2a} \text{ in Hertz.} \quad (2\text{-}7)$$

Which means the free space wavelength at cut off frequency is twice the largest side of the rectangle. Below the cut off frequency, evanescent EM waves will not propagate. Equation (2-7) is highly idealized and there will be attenuation loss due to finite conductivity of the tunnel walls.

Electromagnetic waves are reflected at boundaries of contrasting impedance. Constructive (destructive) interference occurs when the reflected wave is in phase (180° out of phase) with the transmission path EM wave arriving at the receiving antenna. The apparent path attenuation decreases (increases).

Oftentimes, post-accident conditions will dramatically increase the path loss; with the effect of decreasing the destination signal (S) to noise (N) ratio (S/N).

The separation distance (D) is determined by maximum path loss in-dB anticipated in the link budget of the communications system design. Network transmission paths and links should be designed for a destination signal-to-noise (S/N) ratio of at least 10-dB to 15-dB, depending on the modulation scheme and bit error detection/correction method. The bit error rate (BER) rapidly improves when the S/N ratio improves from 10-dB to 15-dB. For example, the BER improves from one bit in 300-bits to one bit in ten million bits when the destination S/N ratio improves from 10-dB to 15-dB. The communications network falls below threshold and fails when the destination S/N ratio drops below 10-dB.

Algorithmic error detection and correction codes have been developed to improve BER; however, most link budgets are designed to achieve destination S/N ratio greater than 20-dB. The decrease in S/N ratio occurs when more attenuation develops along the transmission path through the media. The link budget for UHF mesh communication networks are designed and installed for the conditions of a minimum entry cross-section area and air-filled entries. The separation distance (D) is limited to less than 1,000-feet. Geologic "squeeze" and roof falls will reduce the cross-section area. Fire inundated and mine water-filled entries can dramatically increase the attenuation rate as described in Table 2-1.

The electrical noise (N) is the sum of the radio frequency interference (RFI) and thermal noise generated in the receiver signal path. The amplifiers in the signal path introduce additional noise and are accounted for by the receiver noise figure (NF).

Designing transmission infrastructure that can remain operational in post-accident conditions requires minimizing the receiver detection bandwidth. Solving the post-accident communications and tracking problem requires optimization of the detection bandwidth to maximize the destination S/N ratio and minimize bit error rate.

The detection sensitivity ($S_i$) dependence on the noise figure (NF) and the detection bandwidth (BW) of the radio frequency (RF) receiver can be mathematically determined.

$$\left(\frac{S}{N}\right)_i \boxed{\begin{array}{c} RF \\ \text{Amplifier} \end{array}} \rightarrow \left(\frac{S}{N}\right)_o$$

The noise figure is defined as $$NF = \frac{\left(\frac{S}{N}\right)_i}{\left(\frac{S}{N}\right)_o} \quad (2\text{-}8)$$

where,
$S_i$ is the detection sensitivity power for a specified output $(S/N)_o$ and
$N_i$ is the noise power spectral density generated in the resistive input circuits of the first stage radio frequency amplifier.

The receiver detection sensitivity is derived from the above definition of noise figure (NF) as $$10\log_{10} NF = -10\log_{10}\left(\frac{S}{N}\right)_o + 10\log_{10}\left(\frac{S}{N}\right)_i \quad (2\text{-}9)$$

$$10\log_{10} S_i - 10\log_{10} N_i = 10\log_{10} NF + 10\log_{10}\left(\frac{S}{N}\right)_o \quad (2\text{-}10)$$

The Johnson noise power spectral density ($N_i$) is given by $$N_i = \frac{e_n^2}{R} = KTBW, \quad (2\text{-}11)$$

where,
K is the Boltzmann Constant $138 \times 6^{-23}$ joules/° Kelvin and
T is the temperature in degrees Kelvin (300° K).
Combining Equations (2-10) and 2-11) gives $$10\log_{10} S_i = 10\log_{10} KTR + 10\log_{10} NF + 10\log_{10} BW + 10\log_{10}\left(\frac{S}{N}\right)_o \quad (2\text{-}12)$$

For an output $(S/N)_o = 20$ dB $$S_T^{20} = -166.8 + 10\log_{10} BW + 10\log_{10} NF \text{ dBm} \quad (2\text{-}13)$$

where,
BW is the detection bandwidth of the receiver in Hz and
NF is the noise figure of the receiver.

The received signal $S_T^{20}$ produces a 20-dB S/N ratio in the receiver detection signal path. A first right-hand term (−166.8-dBm) represents a signal of 1.02 nanovolts that produces a S/N ratio of 20-dB in the receiver signal detection path. The far right-hand term represents the threshold detection sensitivity degradation due to receiver noise figure. Typically, a well-designed receiver will exhibit a noise figure near 2-dB. The middle term shows that the detection bandwidth (BW) is the predominant factor in the receiver design problem.

Modulation processes that require wide occupied bandwidth will significantly degrade the detection sensitivity. Increasing the detection bandwidth by a factor of ten requires an increase in transmit power also by a factor of ten, when compared to a companion receiver design optimized for minimum occupied bandwidth detection. A ten-watt transmitter will need to be increased to one hundred watts when the detection bandwidth is increased from 300-Hz to 3,000-Hz. However, a 100-watt transmitter cannot be made intrinsically safe for use in a mine.

The detection sensitivities of receivers discussed here are:

$$S_i^{20} = \begin{cases} -164.8 \text{ dB}_m & BW = 1 \text{ Hz} & RIM \\ -154.8 \text{ dB}_m & BW = 100 \text{ Hz} & TTE \\ -126.8 \text{ dB}_m & BW = 10 \text{ kHz} & MF \text{ analog} \\ -118.8 \text{ dB}_m & BW = 25 \text{ kHz} & MF \text{ digital} \end{cases} \quad (2\text{-}14)$$

A clear distinction needs to be drawn between operational communications, emergency, and post-accident communications. Operational communications require wide bandwidth VHF/UHF transmission infrastructure. Wide bandwidth infrastructure support transmission of multiple voice channels in man and material travel ways, continuous video coverage of belt transfer points, and monitoring/control of equipment. Because automated machines move faster than miners can react, high-speed data transmission networks are required. A wide bandwidth VHF/UHF facility can improve operational safety and productivity.

Emergency and post-accident communication requirements are vastly different because of the dangerous situations that can develop, and miners need to escape least the become trapped. Full, mine-wide coverage is required to support post-accident communications and tracking of the miners who will be on the move. Miners trying to escape must often pass through smoke-filled, sooty, and low visibility escape-way environments while wearing clumsy facemask, mouthpiece, and breathing devices.

Voice communications and tracking functions must be integrated for miners on the move. Any surface situation-awareness center (SAC) must know the escape routes available and current locations for each miner to escape. Trapped, underground miners trying to escape are often unpredictable given a number of escape-ways. So, medium frequency, distributed antenna and transmission infrastructure, must be integrated with conductors and lifeline waveguides at every entry. Helping miners escape requires tracking them, texting with them, and/or keeping up voice communications with them along the entire escape-way to the surface.

The all too common problems with speaking while wearing safety face and mouthpiece apparatus must be addressed. In the case of the Wilberg Mine escape, the dense smoke, soot, and poisonous gas required the use of self-contained self-rescuers. Only voice communication would have been possible for the miners on the move. Existing VHF/UHF communication network installations in American mines need to be improved by MF to VHF/UHF bridge repeaters that provide wireless links to miners on the move.

The attenuation rates of UHF/UHF EM waves traveling along the available transmission paths are usually high. So network electronics, back-up batteries and chargers should be installed at 500-foot intervals to compensate for path attenuation in UHF mesh networks and VHF leaky-feeder coaxial cable. Redundancy and self-healing requirements can be satisfied with an algorithmic code. Miners-in-motion should wear transponders that can read radio frequency identification data (RFID) location tags for information that can be forwarded through the VHF/UHF networks.

Portable ultra low frequency (e.g., 2,000 Hz) through-the-earth transceivers with text messaging and synthetic-voice transmission at SCSR caches or refuge chambers should be employed. Bridge repeaters are used to wirelessly link between VHF/UHF and ultra low frequency (ULF) transmission infrastructure.

Operational and post-accident communications and tracking networks are separated.

The operational UHF mesh and VHF leaky feeder network electronics and batteries and charger equipment are typically installed at 500-foot intervals in the man and material transportation entries with face-area coverage.

Post-accident communications and tracking medium frequency F1/F1 digital repeaters and network equipment can be installed in roof bolt holes or in buried flameproof enclosures stationed at 5,000 to 10,000-foot intervals. The attenuation rate is about 2 dB/km in the MF band. Lifeline and messenger cables are installed in every entry, except the transportation entries. This creates a distributed antenna and transmission, mode conversion facility.

The object is to create a self-healing and redundant network. Passive LF RFID tags with Braille or reflective tape way-in and way-out indicators should be integrated with the cables.

In embodiments of the present invention, the miners on the move wear cap-lamps with LED lights, built-in batteries, a monitor display, and an integrated LF/MF transceiver. Earlier cap-lamps with incandescent lights needed much larger batteries that had to be worn on a belt and connected with a coiled power supply cord.

In use, each cap-lamp transceiver periodically powers up in a burst-beacon transmission to illuminate any nearby RFID tags. Return transmissions from the RFID tags to the cap-lamp transceivers provide encoded location information. Digital packet switching transmissions from the cap-lamps time stamp the location information being reported to the surface of the network. Each cap-lamp transceiver includes a detachable hand-held display to support text messaging and can further include speakers and microphones for an audio interface.

Portable ULF through-the-Earth transceivers with text messaging and synthetic-voice transmission are preferably positioned at SCSR caches and refuge chambers. Bridge repeaters are used to create wireless links between MF and ULF transmission infrastructure.

One unintended consequence of using an exceedingly large number of rechargeable batteries in VHF/UHF networks is that the batteries constitute a methane gas ignition source. After an accident, ventilation systems can be disabled allowing gas to build up and increase the chances of explosions.

If emergency and post-accident communications are not used in every shift, the communications infrastructure be disregarded and not well maintained. One way to ensure proper maintenance of the communications and tracking infrastructure is to require the emergency and post-accident communication systems to include tracking. Tracking can be a comfortable addition, since passive RFID tags can powered up by the LF/MF band transmissions.

Mine infrastructure development plans for metal and non-metal mines are different from those for coal mines. Metal and non-metal mines develop very few adits or shafts into the working levels of the ore body. In contrast, coal mines are developed with multiple parallel entries into a block of virgin coal. In metal and non-metal mines, UHF leaky feeder infrastructure can be used to provide mine-wide coverage areas.

As a rule, most of the underground personnel will be deployed to the working face area, and therefore at the far ends of a mine communication system. Others will be scattered around doing construction and maintenance tasks. Emergencies often occur where there are concentrations of energy in the mining complex. These are where fires, roof collapses, and explosions are most likely to occur. Accidents are most likely to occur in travel ways, product transportation entries, and/or the work face area. Communications systems using leaky-feeder radios or hard-wired pager telephones will most likely be destroyed or disabled in a mine emergency. All means of communication with trapped or miners-in-motion will often be completely cut off.

The mining industry needs robust wireless, two-way text and voice emergency communications between the face or refuge chamber and the surface. TTE systems must be located in the refuge chambers because miners can be trapped at the working-face area. Transmission infrastructure are needed between the face, or refuge chamber, to the portal that can leverage the mining infrastructure and lifeline waveguides. Roof bolt hole or buried flameproof enclosure repeater transceivers will make possible wireless links between miners-in-motion and distributed antennas and transmission infrastructure of the conductor waveguides. Conveyor belts, AC power distribution and messenger cables, rail, and telephone cables produce the remaining entries conductor waveguide. Wait/Hill lifeline cable waveguides must be installed in the remaining entries to create a robust, redundant, passive, self-healing mesh network with roof bolt hole or buried transceivers.

Miners-in-motion wearing cap-lamps or gas monitors with integrated MF transceivers can offer a wireless link with the distributed antenna and transmission facility of conductor waveguide. Conductor waveguides installed in the transportation entries should include fiber-optics links for operational communications of wide bandwidth data.

Medium-frequency radio systems have been installed, maintained, and operated in many western American coal and metal/non-metal mines. These systems provided radio coverage in the passageways of both large and medium-sized mines. Electric locomotive cars and diesel powered vehicles provided transportation in these mines. Already installed electrical conductors in the man and material entries, conveyor belt entries, shafts, and tunnels shaped a strong MF band distributed antenna and signal transmission system.

More than one hundred intrinsically safe wearable transceivers and fifty repeaters were built for these mines. The MF band radios established a wireless communications link for roving miners via the MF band distributed antenna and signal transmission system. The installed communications system enabled voice communications to coordinate maintenance and change priorities in the underground mining operations during a shift. In one underground coal mine, record keeping proved that the communications with roving maintenance personnel resulted in downtime savings over a three-month period equal to the cost of the entire system. Portable transceivers were installed in the face, lunch rooms, and service areas.

Escape through smoke, soot, and dangerous gases required a microphone integrated in the facemask and mouthpiece of SCSR's. Skull, facemask, mouthpiece, tooth, throat, and noise cancelling microphones were trialed for use with miners on the move. Skull devices created headaches, while throat microphones were judged to be satisfactory. Facemask microphones caused voice signals to be muffled and difficult to understand.

Miners-in-motion considered the wearable vest and bandolier transceivers to be an extra burden given the bulkiness of SCSR units and service items carried by roving miners. The wearable radios were designed with replaceable battery packs to enable multiple shifts of operations with shared transceivers. The charging docks were different from the cap-lamp charger, so some battery packs went uncharged at shift changes. The miners requested that the transceivers be integrated within the cap-lamp battery or preferably, with the miner's cap-lamp.

A cap-lamp transceiver can be integrated into the light emitting diode (LED) lamp and battery assembly. The transceiver, lamp and battery are mounted to a miner's helmet. An air-core vertical magnetic dipole (VMD) is mounted on the miner's helmet. See FIG. 15. The cap-lamp transceiver must periodically burst a 134-kHz transmission to power up a Texas Instruments (RT-IRP-W9UR) passive RFID disk transponder or tag supplemented with the miners' locations.

Re-transmissions from the passive tags convey location information to the cap-lamp transceivers. The wearable transceiver appends identification along with location and transmits a digitally encoded data stream to the surface SAC display. The passive LF RFID tag has the functionality of the red/blue (e.g., way-in/way-out) reflective indicator disks that are installed in underground mine passageways. A communications system that is not required to be in use on every shift will not be maintained. The tracking capability must be built into the MF mesh network.

Portable transceivers were installed at power centers supplying power to the face area. Repeater transceivers were installed at the power centers supplying power to conveyor belt drives of the longwall panels. Repeaters were installed in man and material roadways at separation distances of approximately 5,000-feet because the attenuation rate is only 2-dB/km. Vehicular transceivers communicated via the installed infrastructure of large diameter, three-phase power distribution and messenger cables. Pager telephone cables also provided a transmission facility. The installed cables and conveyor belt structure created a distributed antenna and signal transmission path for the communications system. Repeaters supported push-to-talk transmission in the simplex/half-duplex mode. Separate transmit and receive frequencies were supported in the roadway distribution system by sets of transceivers with four separate operating frequencies each with a resonant-loop antenna. Even trained miners were confused when reconnecting the four separate loop antennas during a required relocation change.

Repeaters are required in the conductor waveguide to overcome the 17-dB MF signal loss when passing through a power center. The MF signals couple to nearby conductors experiencing a few-dB of coupling lost.

The miners requested that a single antenna be used at the repeater site. Metal cabinets resembling stainless steel attaché cases were used as enclosures for the portable and repeater transceivers. The miners recommended that the transceivers be designed for installation in two-inch diameter stainless steel tubular enclosures and installed in roof bolt holes. This installation method was expected to survive an explosion or fire.

The MF transceivers worn by miners included a digital data transmission capability employing frequency shift key (FSK) modulation for digital data transmission of the application data with bit error detection and correction protocols. Miners found that digital control and monitoring communications required high signal-to-noise ratios resulting in shorter distances than analog voice communications.

As Wait/Hill taught, monofilar and bifilar propagation modes are supported on electrical conductors installed in the construction of underground mine infrastructure. There are N–1 propagation modes supported by an ensemble of electrical conductors where N is the number of conductors. The ground or sedimentary rock surrounding the coal bed is one of the conductors. The 23-dB/km attenuation rate of the monofilar mode implies that only the bifilar mode survives at great distance. The high attenuation rate of the monofilar mode is due to the return current flow through the sedimentary rock surrounding the entry or tunnel. The bifilar mode attenuation rate exhibits an exceeding low attenuation rate approaching 2-dB/km. In this case, the return current flows through the nearby conductor. The monofilar mode is excited by the electric field component of the illuminating EM wave that is polarized tangential to the ensemble of conductors.

Twisted pairs are used to suppress the radio frequency interference (RFI) noise coupling in the communications cables connecting sensitive electronic components. The electric field that is tangential to the twisted pair induces monofilar mode current flow in each conductor that is cancelled in the destination differential devices. Twisted pairs suppress the magnetic field noise induced in the cable. Miners found that by installing separate parallel conductors in entries without conductor infrastructure, coupling loss of MF signals to the distributed antenna decreased.

Monofilar and bifilar propagation modes occur simultaneously in the ensemble of electrical conductors. Mode conversion is due to changes in the characteristic impedance of the wire pair installed in mine entries and tunnels. The characteristic impedance depends on the physical distance between conductors in the ensemble of conductors, including the rock conductor. Along the length of the lifeline, intentional separation changes are required. If the conductors in the MF distributed antenna and signal transmission system are installed on opposite corners of the passageway, reflections lead to magnetic field cancelation in the receiving magnetic dipole antenna. Vertical magnetic dipole antennas exhibit deep nulls directly under a cable. Nulls are not encountered when the conductors are installed on only one side of the entry and facilitate mode conversion by intentional change in the separation distance between conductors.

The lifelines should be installed with periodic "braille" devices indicating the way out. Unfortunately, the MINER Act missed the opportunity to have lifelines installed in escape-ways that support monofilar and bifilar modes of communications to roving miners wearing cap-lamp transceivers.

The MINER Act should be amended to require that the monofilar and bifilar modes of propagation, coupling, and mode conversion be supported by the lifeline cables installed in conductor-free entries. The physical spacing between the conductors must periodically change along the entry to facilitate mode conversion.

In slightly conductive medias, energy is dissipated in the near field of a radiating electric dipole and stored in the vicinity of a magnetic dipole implying that energy is available for transmission into the far field. This condition is the technical reason that magnetic dipoles must be applied in the design of subsurface emergency EM communication systems.

Radiating magnetic dipole antennas are characterized by their magnetic moment (M).

The magnetic moment of a resonating loop antenna is given by, $$M = NIA \text{ in Ampere turn meter square } (ATM^2) \quad (2\text{-}15)$$

and $$M = \begin{cases} \sqrt{\left(\frac{|A|}{\pi\mu}\right)\left(\frac{P}{BW}\right)} & \text{ferrite rod} \\ \sqrt{\frac{RA}{\mu\left[\ln\frac{8R}{a} - \frac{7}{4}\right]}\left(\frac{P}{BW}\right)} & \text{air core loop} \end{cases} \text{Ampere turn meter}^2 \quad (2\text{-}16)$$

where,
N=number of turns of copper wire used in construction,
I=peak value of the circulating current in the coil in Amperes,
A=is a vector normal to the enclosed area of the loop in square meters,
R=radius of the loop antenna,
l=length of ferrite rod in meters,
a=radius of copper wire in meters,
P=essentially the power applied by the transmitter to the antenna, and
BW=3-dB bandwidth of the resonating magnetic dipole antenna in Hz.

The magnetic moment increases with the square root of power or by reducing bandwidth of the resonating magnetic dipole.

The transmission of electromagnetic waves through the subsurface waveguides are described in electrodynamics. The electric and magnetic field components radiate from an oscillating magnetic dipole.

The spherical coordinate system (r, φ, θ) is used to describe the general orientation of the field components. When the physical dimension of the loop is small relative to the wavelength (λ), the magnetic dipole field components may be described by Wait as follows:

Azimuthal (θ) component of the magnetic field in Amperes/meter $$H_\theta = \frac{Mk^3}{4\pi}\left[\frac{1}{(kr)^3} + \frac{i}{(kr)^2} - \frac{1}{(kr)}\right]e^{-ikr}\sin\theta, \quad (2\text{-}17)$$

Radial (r) component of the magnetic field in Amperes/meter $$H_r = \frac{Mk^3}{2\pi}\left[\frac{1}{(kr)^3} + \frac{i}{(kr)^2}\right]e^{-ikr}\cos\theta, \text{ and} \quad (2\text{-}18)$$

Longitudinal (φ) electric field component in Volts per meter $$E_\phi = \frac{i\mu\omega Mk^2}{4\pi}\left[\frac{-1}{(kr)^2} + \frac{1}{i(kr)}\right]e^{-ikr}\sin\theta. \quad (2\text{-}19)$$

where,
$\omega = 2\pi f_o$ is the radian frequency in radians per second and $f_o$ is the operating frequency in Hz,
$i = \sqrt{-1}$,
r=radial distance from the radiating antenna in meters, and
$k = \beta - i\alpha$, is the propagation constant with β being the phase constant in radians/meter and α the attenuation rate in nepers/meter.

The magnetic field vectors lie in the meridian plane. The electric vector ($E_\phi$) is perpendicular to the meridian plane and subscribes concentric circles around the z-axis magnetic dipole moment vector. The terms in the magnetic dipole field component Equations (2-17) through (2-19) have been arranged in the inverse power of r. The radial distance $r = \lambda/2\pi$ defines the near field (one skin depth) spherical surface surrounding the radiating dipole antenna. The natural media space surrounding the magnetic dipole can be divided into three regions: the near or static zone, induction zone, and far or radiating zone.

The near or static zone exists when the radial distance (r) is less than one skin depth, that is $r < \delta = \lambda/2\pi$, the reactive near fields drop off as $1/r^3$. Energy is stored in the reactive impedances and available to flow into the far field. Wait has shown, in the case of an electrically small electric dipole, the impedance is real and energy is dissipated in this zone.

When the radial distance (r) is one skin depth (e.g., $r=\lambda 2\pi$), the fields drop off as $1/r^2$.

When the far distance is much greater than one skin depth, the fields drop off as $1/r$.

These fields exhibit non-planar spherical spreading wave front. The radiation far-field fields are given by, $$H_\theta = \left[\frac{-Mk^2}{4\pi}\right]\frac{e^{-ikr}}{r}\sin\theta \text{ and} \quad (2\text{-}20)$$

$$E_\phi = \left[\frac{\mu\omega Mk}{4\pi}\right]\frac{e^{-ikr}}{r}\sin\theta \text{ in volts/meter.} \quad (2\text{-}21)$$

The radiation fields are transverse (e.g., orthogonal), which is expected of spherical wave propagation at great distances from all electromagnetic wave sources. The sine $\theta$ and cosine $\theta$ terms describe the antenna pattern for the dipole fields.

The fields of infinitesimal magnetic and electric dipoles embedded in infinite homogenous medium with electrical constants of conductivity $\sigma$, magnetic permeability $\mu$, and dielectric constant ($\in$) can be expressed in terms of the propagation constants of attenuation rate ($\alpha$) (nepers per meter) and phase constant ($\beta$) (radians per meter). For the magnetic dipole, $$H_\theta = \quad (2\text{-}22)$$
$$\frac{M}{4\pi r^3}\left\{\left[\left(\frac{\alpha}{\beta}\right) + \frac{1}{\beta r} - \beta r + \left(\frac{\alpha}{\beta}\right)^2 \beta r\right] + i\left(1 + 2\left(\frac{\alpha}{\beta}\right)\beta r\right)\right\}(\beta r)e^{-\left(\frac{\alpha}{\beta}\right)\beta r}$$
$$e^{-i\beta r}\sin\theta$$

and, $$H_\theta = (M/4\pi r^3)\{A\}e^{-i\phi_1} \quad (2\text{-}23)$$

$$H_r = \frac{M}{2\pi r^2}\left\{\left[\left(\frac{\alpha}{\beta}\right) + \frac{1}{\beta r}\right] + i\right\}(\beta r)e^{-\left(\frac{\alpha}{\beta}\right)\beta r}e^{-i\beta r}\cos\theta \quad (2\text{-}24)$$

and, $$H_r = (M/2\pi r^2)\{B\}e^{-i\phi_2} \quad (2\text{-}25)$$

In the limit as frequency approaches zero, the attenuation rate ($\alpha$), phase constant ($\beta$), and electric field ($E_\phi$) vanish and the magnetic fields $H_\theta$ and $H_r$ approach the static (DC) value. For the electric dipole $$E_\theta = \frac{Id\ell}{4\pi r^3} \quad (2\text{-}28)$$
$$\left(\frac{1}{\sigma}\right)\left\{\left[\left(\frac{\alpha}{\beta}\right) + \frac{1}{\beta r} - \beta r + \left(\frac{\alpha}{\beta}\right)^2\beta r\right] + i\left(1 + 2\left(\frac{\alpha}{\beta}\right)\beta r\right)\right\}(\beta r)e^{-\left(\frac{\alpha}{\beta}\right)\beta r}$$
$$e^{-i\beta r}\sin\theta \text{ and}$$

-continued $$E_\theta = (Id\ell/4\pi r^3)(1/\sigma)\{A\}e^{i\phi_1^{\prime}} \quad (2\text{-}29)$$

$$E_r = \frac{Id\ell}{2\pi r^3}\left(\frac{1}{\sigma}\right)\left\{\left[\left(\frac{\alpha}{\beta}\right) + \frac{1}{\beta r}\right] + i\right\}(\beta r)e^{-\left(\frac{\alpha}{\beta}\right)\beta r}e^{-i\beta r}\cos\theta \quad (2\text{-}30)$$

$$E_r = (Id\ell/2\pi r^3)(1/\sigma)\{B\}e^{-i\theta_2} \quad (2\text{-}31)$$

$$H_\phi = \frac{Id\ell}{4\pi r^2}\left\{\left[\left(\frac{\alpha}{\beta}\right) + \frac{1}{\beta r} + i\right](\beta r)e^{-\left(\frac{\alpha}{\beta}\right)\beta r}\right\}e^{-i\beta r}\sin\theta \text{ and,} \quad (2\text{-}32)$$

$$H_\phi = (Id\ell/4\pi r^2)\{B\}e^{-i\phi_2}. \quad (2\text{-}33)$$

Each field in Equations (2-22) through (2-33) has been separated into the magnetic ($M/4\pi r^3$ or $M/2\pi r^2$) or current ($Id\ell/4\pi r^2$ or $Id\ell/2\pi r^2$) spatial-excitation term and the geologic terms (A and B).

The magnitude of the azimuthal magnetic field component $H_\theta$ can be expressed in terms of the propagation factor ratio $\alpha/\beta$ and the space scaling factor $\beta r$ as $$|H_\theta| = \frac{M}{4\pi r^3}\left[\beta r\, e^{-\left(\frac{\alpha}{\beta}\right)\beta r}\right]\left\{\left[\frac{1}{\beta r} - \beta r + \left(\frac{\alpha}{\beta}\right) + \left(\frac{\alpha}{\beta}\right)^2\beta r\right]^2 + \left[1 + 2\left(\frac{\alpha}{\beta}\right)\beta r\right]^2\right\}^{\frac{1}{2}} \quad (2\text{-}34)$$

and phase by $$\phi_1 = -\beta r + \text{Tan}^{-1}\left[\frac{1 + 2\left(\frac{\alpha}{\beta}\right)\beta r}{\frac{1}{\beta r} - \beta r + \left(\frac{\alpha}{\beta}\right)^2\beta r + \left(\frac{\alpha}{\beta}\right)}\right] \quad (2\text{-}35)$$

The magnitude of electric field is mathematically $$|E_\phi| = \frac{M}{4\pi r^3}(\omega\mu)\left\{\left[\left(\frac{\alpha}{\beta}\right) + \frac{1}{\beta r}\right]^2 + 1\right\}^{\frac{1}{2}} \quad (2\text{-}36)$$

and $$\phi_2 = \beta r + \text{Tan}^{-1}\left[\frac{1}{\frac{\alpha}{\beta} + \frac{1}{\beta r}}\right]. \quad (2\text{-}37)$$

The magnitude of the magnetic ($H_\theta$) and electric field ($E_\theta$) components can be expressed in decibels (dB) with respect to one ampere per meter (dB re A/m) or volt per meter (dB re v/m) by taking the logarithm to the base 10 of both sides of the above equations and multiplying by 20. The magnitude of the azimuthal magnetic field component is expressed as $$20\log_{10}H_\theta = 20\log_{10}\frac{M}{4\pi r^3} + 20\log_{10}\{A\} \text{ dB } reA/m \quad (2\text{-}38)$$

$$= \text{spatial-excitation} + \text{geologic contribution}$$

The variable $\beta r$ represents the distance scaling factor from the radiating magnetic dipole to the point in the medium.

The magnitude and phase of the component fields depends on the ratio of the propagation factors $$\left(\frac{\alpha}{\beta}\right)$$

and the geologic space scaling factor ($\beta r$). The ratio of propagation factors ranges $$0 \leq \frac{\alpha}{\beta} \leq 1.$$

The attenuation rate ($\alpha$) and phase ($\beta$) rate of EM waves traveling through natural media is expressed by, $$\alpha = \omega\left[\frac{\mu\varepsilon}{2}\left(\left[1+\left(\frac{\sigma}{\varepsilon\omega}\right)^2\right]^{\frac{1}{2}}-1\right)\right]^{\frac{1}{2}} \text{ nepers per meter and} \quad (2\text{-}39)$$

$$\beta = \omega\left[\frac{\mu\varepsilon}{2}\left(\left[1+\left(\frac{\sigma}{\varepsilon\omega}\right)^2\right]^{\frac{1}{2}}+1\right)\right]^{\frac{1}{2}} \text{ radians per meter,} \quad (2\text{-}40)$$

where, $\omega = 2\pi f$ is the radian frequency and f is the frequency in Hz; and $\sigma$ = electrical conductivity in Siemens per meter (S/m)

The dimension less quantity $\sigma/\omega\varepsilon$ is the loss tangent. When the loss tangent is greater or less than unity, the wave constants simplify and separate as, $$\alpha = \begin{cases} \sqrt{\frac{\omega\mu\sigma}{2}} \; ; \; \frac{\sigma}{\omega\varepsilon} \gg 1 \\ \frac{\sigma}{2}\sqrt{\frac{\mu}{\varepsilon}} \; ; \; \frac{\sigma}{\omega\varepsilon} \gg 1 \end{cases} \quad (2\text{-}41)$$

Nepers per meter(multiply by 8.686 → dB)

$$\beta = \frac{2\pi}{\lambda} = \begin{cases} \sqrt{\frac{\omega\mu\sigma}{2}} \; ; \; \frac{\sigma}{\omega\varepsilon} \ll 1 \\ \omega\sqrt{\mu\varepsilon} \; ; \; \frac{\sigma}{\omega\varepsilon} \gg 1 \end{cases} \quad (2\text{-}42)$$

radians per meter

The velocity of the traveling wave in the media is given by, $$v = \frac{\omega}{\beta} = \begin{cases} \sqrt{\frac{2\omega}{\mu\sigma}} \; ; \; \frac{\sigma}{\omega\varepsilon} \gg 1 \\ \frac{c}{\sqrt{\varepsilon_r}} \; ; \; \frac{\sigma}{\omega\varepsilon} \ll 1 \end{cases} \text{ meters/second meters/second} \quad (2\text{-}43)$$

The electrical conductivity of mine water is like seawater due to the ionization of argillaceous matter in coal. The attenuation rate of electromagnetic waves through mine water with electrical conductivity ranging 1-10 S/m is shown in Table 2-2.

TABLE 2-2

| Attenuation Rate | | | | |
|---|---|---|---|---|
| Frequency (MHz) | Conductivity (S/m) | Attenuation Constant (Neper/m) | Attenuation Constant (dB/m) | Loss Tangent |
| 100 | 1 | 15.98 | 138.80228 | 2.220 |
| 300 | 1 | 19.77 | 171.72222 | 0.741 |
| 1,000 | 1 | 20.81 | 180.75566 | 0.222 |
| 3,000 | 1 | 20.92 | 181.71112 | 0.074 |
| Frequency (MHz) | Conductivity (S/m) | Attenuation constant (neper/m) | Attenuation constant (dB/m) | Loss Tangent |
| 100 | 10 | 61.40 | 533.3204 | 22.22 |
| 300 | 10 | 101.75 | 883.8005 | 7.470 |
| 1,000 | 10 | 159.77 | 1387.76222 | 2.222 |
| 3,000 | 10 | 197.70 | 1717.2222 | 0.741 |

Table 2-2 reveals why VHF/UHF field component transmission through mine water decreases the destination S/N ratio by 55-dB/foot (e.g., a factor of over 500). Table 2-3 lists the EM wave propagation parameters for a wide range of natural media electrical conductivity ($\varepsilon_r = 10$).

When the loss tangent ($\sigma/\omega\varepsilon$) is greater than unity, the attenuation and phase rate increase with the first power of frequency because conductivity increases with the first percent of frequency. The lowest possible frequency should be used in emergency communications. The LF/MF bands attenuation rates through natural media depend on electrical conductivity and frequency. At 300 kHz and through a 5 milliseimens/meter (mS/m) media, the attenuation rate is less than 5-dB/100-feet. By way of contrast, the VHF/UHF bands attenuation rate is 10-dB/foot, preventing communications through rock and roof falls.

The transmission path link budget is complicated by the reflection of EM waves from air-water interfaces.

TABLE 2-3

| Electromagnetic Wave Transmission Parameters. | | | | | |
|---|---|---|---|---|---|
| Frequency (MHz) | Loss Tangent | Attenuation Rate (dB/ft) | Phase Constant (radian/m) | Wavelength (=2π/β) (m) | Wavelength (ft) |
| $\sigma = 0.0005$ S/m $\varepsilon_r = 4$ | | | | | |
| 1 | 2.25 | 0.09 | 0.06 | 113.97 | 373.93 |
| 3 | 0.75 | 0.12 | 0.13 | 47.11 | 154.58 |
| 10 | 0.22 | 0.12 | 0.42 | 14.90 | 48.88 |
| 30 | 0.07 | 0.12 | 1.26 | 4.99 | 16.38 |
| 60 | 0.04 | 0.12 | 2.52 | 2.50 | 8.20 |
| 100 | 0.02 | 0.12 | 4.19 | 1.50 | 4.92 |
| 300 | 0.01 | 0.12 | 12.58 | 0.50 | 1.64 |
| $\sigma = 0.005$ S/m $\varepsilon_r = 4$ | | | | | |
| 0.002 | 11,250 | 0.016 | 0.006 | 1,600 | 3,280 |
| 0.02 | 1,250 | 0.053 | 0.02 | 316 | 1,036 |
| 0.2 | 112 | 0.159 | 0.06 | 100 | 328 |
| 1 | 22.47 | 0.36 | 0.14 | 43.74 | 143.50 |
| 3 | 7.49 | 0.60 | 0.26 | 24.16 | 79.26 |
| 10 | 2.25 | 0.95 | 0.55 | 11.40 | 37.39 |
| 30 | 0.75 | 1.18 | 1.33 | 4.71 | 15.46 |
| 60 | 0.37 | 1.23 | 2.56 | 2.46 | 8.06 |
| 100 | 0.22 | 1.24 | 4.22 | 1.49 | 4.89 |
| 300 | 0.07 | 1.25 | 12.58 | 0.50 | 1.64 |
| $\sigma = 0.05$ S/m $\varepsilon_r = 4$ | | | | | |
| 0.002 | 112,500 | 0.05 | .020 | 316 | 1036 |
| 0.020 | 11,250 | 0.167 | .063 | 100 | 328 |
| 0.2 | 1125 | 0.53 | .20 | 31.6 | 104 |

TABLE 2-3-continued

Electromagnetic Wave Transmission Parameters.

| Frequency (MHz) | Loss Tangent | Attenuation Rate (dB/ft) | Phase Constant (radian/m) | Wavelength (=2π/β) (m) | Wavelength (ft) |
|---|---|---|---|---|---|
| 1 | 224.69 | 1.17 | 0.45 | 14.11 | 46.29 |
| 3 | 74.90 | 2.02 | 0.77 | 8.11 | 26.61 |
| 10 | 22.47 | 3.64 | 1.44 | 4.37 | 14.35 |
| 30 | 7.49 | 6.03 | 2.60 | 2.42 | 7.93 |
| 60 | 3.74 | 7.98 | 3.93 | 1.60 | 5.25 |
| 100 | 2.25 | 9.48 | 5.51 | 1.14 | 3.74 |
| 300 | 0.75 | 11.76 | 13.34 | 0.47 | 1.55 |

The reflection coefficient is given by, $$\Gamma = \frac{E_R}{E_i} = \frac{Z_2 - Z_1}{Z_2 + Z_1}, \quad (2\text{-}44)$$

where,
$E_i$=incident electric field component,
$E_R$=reflected electric field,
$Z_2$=impedance natural media in region 2, and
$Z_1$=impedance of the natural media in region 1.
The impedance in any media is given by, $$Z = \frac{\sqrt{\frac{\mu}{\varepsilon}}}{\sqrt{1 - i\frac{\sigma}{\omega\varepsilon}}} \text{Ohms} \quad (2\text{-}45)$$

The magnitude of impedance is given by $$|Z_i| = \frac{\sqrt{\frac{\mu}{\varepsilon}}}{\left[1 + \left(\frac{\sigma}{\omega\varepsilon}\right)^2\right]^{\frac{1}{4}}} \text{Ohms} \quad (2\text{-}46)$$

which separates to, $$|Z| = \begin{cases} \sqrt{\frac{i\omega\mu}{\sigma}} = \sqrt{\frac{\omega\mu}{\sigma}} \angle 45°; \frac{\sigma}{\omega\varepsilon} \gg 1 \\ \frac{377}{\sqrt{\varepsilon_r}}; \frac{\sigma}{\omega\varepsilon} \ll 1 \end{cases} \text{Ohms} \quad (2\text{-}47)$$

TABLE 2-4

Electrical Parameters for Coal, Shale, Lake Water, and Air

| | Electrical Parameter | | Frequency | | | |
| | | | (1 MHz) | | (100 MHz) | |
| Surface | σ | $\varepsilon_r$ | $\frac{\sigma}{\omega\varepsilon}$ | |Z| | $\frac{\sigma}{\omega\varepsilon}$ | |Z| |
|---|---|---|---|---|---|---|
| Dry coal | 0.0005 | 4 | 2.247 | 120.1 | 0.022 | 188.3 |
| Saturated shale | 0.05 | 7 | 128.4 | 12.6 | 1.284 | 111.6 |
| Lake water | 0.02 | 81 | 4.44 | 19.6 | 0.044 | 41.8 |
| Limestone | 0.001 | 9 | 2.00 | 84.0 | 0.020 | 125.6 |
| Air | 0 | 1 | 0 | 376.7 | 0 | 376.7 |

When a radiating magnetic dipole antenna is operating in the resonant condition, a circulating current ($I_c$) flows in the antenna circuit consisting of a series connection of a capacitor and inductor, both energy storage devices. The relationship between the peak energy stored to energy dissipated in the antenna coil series resistor per cycle is called the quality factor (Q) and given by, $$Q_{CKT} = \frac{\text{peak energy stored in the inductor}}{\text{energy dissipated per cycle in the coil resistance}} \quad (2\text{-}48)$$

When the $Q_{CKT}$ of the antenna is less than unity, the stored energy is dissipated in the coil.

The resonating antenna circuit $Q_{CKT}$ is given by, $$Q_{CKT} = \frac{f_o}{BW}, \quad (2\text{-}49)$$

where,
$f_o$=resonant frequency of the antenna in Hz and
BW=3-dB bandwidth in Hertz.
From circuit theory, the unloaded $Q_u$ of the conductor is $$Q_u = Q_{CKT} Q_{LP} \quad (2\text{-}50)$$

$$\text{where, } Q_u = \frac{\omega L}{R_S} \quad (2\text{-}51)$$

and $R_S$ is modeled as a lumped, although it is actually distributed, DC resistance value. The low pass prototype filter quality factor ($Q_{LP}$) is used to determine energy dissipation loss in resonate circuit.

A through-the-Earth transmission bandwidth (BW) of 100 Hz is required to achieve a symbol transmission rate of 2 symbols/second. From equation (2-49) the quality factor of the loop antenna is 20.

The lumped non-physical DC resistance can be determined from the standard annealed wire table in series with the inductor and is presented in Table 2-5.

As the resonant frequency increases, the current flow crowds toward the surface of the conductor increasing the value of the "lumped" resistance. Radiation of EM energy away from the coil is accounted for by adding a non-physical radiation resistance value to the "lumped resistance value. When viewed as a receiving loop antenna, the radiation resistance includes the effect of the slightly conducting media being transformed into the loop antenna.

TABLE 2-5

Standard Annealed Copper Wire Resistance

| American Wire Gauge | Resistance (Ohms/1,000 ft) | Diameter (meters) |
|---|---|---|
| 12 | 1.59 | $2.04 \times 10^{-3}$ |
| 14 | 2.53 | $1.619 \times 10^{-3}$ |
| 16 | 4.01 | $1.284 \times 10^{-3}$ |
| 18 | 6.39 | $1.016 \times 10^{-3}$ |
| 20 | 10.15 | $0.808 \times 10^{-3}$ |
| 22 | 16.11 | $0.641 \times 10^{-3}$ |
| 24 | 25.67 | $0.508 \times 10^{-3}$ |
| 26 | 40.81 | $0.396 \times 10^{-3}$ |
| 28 | 64.90 | $0.319 \times 10^{-3}$ |

In typical communications systems, the antenna circuit Q ranges between 20 to more than 100. The current applied to the resonating antenna is multiplied by Q and represents the peak circulating current ($I_C$). The peak energy ($\varepsilon$) stored in the inductors and capacitors is given by, $$\varepsilon = \begin{cases} 1/2LI_C^2 \text{ inductive energy} \\ 1/2CV^2 \text{ capactive energy} \end{cases} \text{ in Joules} \quad (2\text{-}52)$$

The rate of exchange of inductive to capacitive energy is the operating frequency. If the resonating series circuit of the radiating antenna were to become an open circuit at the peak of the energy storage cycle, an incendiary spark with 0.25 millijoules of energy would ignite methane gas. The inductance (L) of coils used in building magnetic dipole antennas is given by $$L = \begin{cases} \left(\frac{\mu}{l}\right)AN^2 \text{ ferrite rod} \\ \dfrac{}{\mu_o R\left[\ln\left(\frac{8R}{a}\right) - \frac{7}{4}\right]N^2} \text{ air core loop} \end{cases} \text{Henry} \quad (2\text{-}53)$$

where

R=radius of the air core loop antenna in meters,

α=radius of the magnetic wire in meters,

N=number of turns, l=length of the coil in meters,

A=area of the antenna in square meters, and $\mu_r$=relative magnetic permeability.

The intrinsically safe magnetic moment (M) limit of a resonating magnetic dipole antenna is given by $$M = \begin{cases} 10^2 \sqrt{\dfrac{|A|}{4\pi\mu_r}} \text{ ferrite rod} \\ 10^2 \sqrt{\dfrac{\pi R^3}{4\left[\ln\frac{8R}{a} - \frac{7}{4}\right]}} \text{ air core loop} \end{cases} \text{Ampere turn } m^2 \quad (2\text{-}54)$$

The magnetic moment is independent of the number of turns. The intrinsically safe magnetic moment for an air core coil is given in Table 2-6.

TABLE 2-6

Intrinsically Safe Magnetic Moment of a Magnetic Dipole Antenna
Intrinsically Safe Magnetic Moment for Loop Antenna (16 AWG)
$a = 0.508 \times 10^{-3}$ m

| Loop Circumference (feet [meters]) | Radius (meters) | Magnetic Moment (Ampere turn meter$^2$) |
|---|---|---|
| 10 [3.04] | 0.483 | 9.725 |
| 50 [15.243] | 2.426 | 112.88 |
| 100 [30.481] | 4.852 | 307.40 |
| 200 [60.975] | 9.704 | 839.36 |

The safe limit maximum magnetic moment of the radiating antenna (e.g., one-inch diameter ferrite rod with a $\mu_r$ of 120, built with 22 turns, an inductance of 95 microhenries, and operating with a peak circulating current of 2.29 Ampere) is 3 ATM2.

The magnetic moment increases with circumference of the loop. The surface receiving antennas must be constructed with electrostatic shields to suppress the horizontally polarized electric field component of noise.

The definition of $Q_{CKT}$ given in Equation (2-48) suggests that a radiating magnetic dipole with Q of less than unity internally dissipates all of the stored energy on each oscillation cycle in the equivalent series resistance of the coil wire. When the low Q inductor is open circuited, there will be no energy discharge.

Each radiating magnetic dipole antenna magnetic moment (M) generates a magnetic field that by superposition is the sum magnitude of fields.

The susceptibility of mining personnel and various types of equipment to electromagnetic (EM) fields has been investigated by the Franklin Institute. The Franklin Institute investigation included blasting caps. During our development of an intrinsically safe mine-wide wireless low-to-medium frequency underground radio systems for the Bureau of Mines in the 1980s, analytical studies and field tests were conducted with blasting caps that corroborated the Franklin Institute results. The investigation concluded that blasting caps and machine control electronics were not susceptible to long wavelength signals.

Blasting caps are shipped to mines with the insulated copper wire leads emanating from the cap and stripped approximately one inch from the end of each copper wire. The ends of each copper wire are twisted together to form a short circuit. The leads are closely spaced and folded together to eliminate the possibility of forming a loop (e.g., magnetic dipole) with an enclosed area between the two leads or an electric dipole when both leads are separated and pulled apart. Blasting caps have lead length of approximately one meter with an internal blasting cap resistance of 200 ohms. The safe blasting cap current limit is one ampere and the blasting cap ignition current, $I_{EXP}$, is fifty amperes. The blasting cap is designed to have a safety factor of 50:1. Considering the blasting cap leads as a dangerous antenna when illuminated by an electromagnetic wave, the open circuit condition of the leads will create an electric dipole with two one-meter electrically conductive elements. The short circuit condition of the leads with maximized area ($1/\pi$ meter$^2$) will create a circular loop magnetic dipole with a circumference of two meters.

At a distance of one meter from the subsurface radiating TTE antenna (e.g., 839 ATM$^2$), the electric field, E, is 1.11 volts/meter (V/m) and the magnetic field, H, is $2.94 \times 10^{-3}$ Ampere/meter (A/m). The field strength depends on the first power of the magnetic moment. If the radiating antenna has a moment of 419 ATM², the field strength would be reduced by 50%. The wavelength at 2 kHz is 150,000 meters.

For the open circuit condition of leads, the effective antenna height ($h_{eff}$) is the physical length of antenna element related to wavelength=$1.33 \times 10^{-5}$ meter.

The electromotive force (emf) generated by antenna is given by $$\text{emf} = \text{electric field} \times h_{eff} = 1.33 \times 10^{-5} \text{ m} \times 1.11 \text{ v/m} = 1.476 \times 10^{-5} \text{ volt}. \quad (2\text{-}55)$$

The induced current is $$I_D = \text{emf}/200 \text{ ohms} = 0.0074 \text{ microamperes}. \quad (2\text{-}56)$$

Thus, the safety factor (SF) becomes $$SF = I_{EXP}/I_D = 6.75 \times 10^9 \text{ to } 1. \quad (2\text{-}57)$$

For the short circuit condition of leads, the magnetic dipole loop area (A) is $$A = \pi r^2 = 1/\pi m^2.$$

The electromotive force (emf) is $$\text{emf} = -iN\omega A\mu H = -i1(2\pi \times 2,000)(1/\pi)(4\pi \times 10^{-7})(2.94 \times 10^{-3}) = -i4.35 \times 10^{-8} \text{ volt}. \quad (2\text{-}58)$$

The induced current (I) is $$I = \text{emf}/200 \text{ ohms} = 9.9 \text{ milliamperes}. \quad (2\text{-}59)$$

Thus, the safety factor (SF) becomes $$SF = I_{EXP}/I_D = 5.05 \times 10^3 \text{ to } 1. \quad (2\text{-}60)$$

In the extreme, if the blasting cap were connected in series with the antenna, the safety factor=501/216=231 to 1.

For a remote detonation device, with a blasting cap cable length of 1,000 meters, the effective antenna height, $h_e$, is the length of the cable relative to the wavelength, which is $$h_e = 0.007 \quad (2\text{-}61)$$

The electromotive force (emf) is $$\text{emf} = h_e E = 7 \times 10^{-3}(1.11) = 7.4 \times 10^{-3} \text{ microvolts}. \quad (2\text{-}62)$$

The induced current is $$I_D = \text{emf}/200 \text{ ohms} = 37 \text{ microamperes}. \quad (2\text{-}63)$$

Thus, the safety factor (SF) becomes $$SF = I_{EXP}/I_D = 1.35 \times 10^5 \text{ to } 1. \quad (2\text{-}64)$$

Note: The detonation cable supports the simultaneous transmission of the monofilar and bifilar modes. The electric field component that is tangential to the cable induces monofilar current flow in each conductor. As the characteristic impedance changes along the cable, mode conversion occurs and bifilar mode (e.g., differential) current flows through the blasting cap igniter.

The susceptibility of electronic equipment follows from the same basic analysis. Electronic equipment has shielding that will reduce the magnitude of the electric field applied to the electronics. Lead lengths are typically 0.01 meter. The induced voltage would be 0.07 microvolts. Logic switching signals are in the 100-millivolt to 1.01-volt range. The safety factor of $1.35 \times 10^4$ to 1 is large enough to ensure complete safety.

The frequencies used by continuous miners and shearer remote control transmitters are generally between 78 MHz and 1.5 GHz. The operating frequencies of TTE (e.g., 2 to 10 kHz) are far enough below those of the remote control frequencies to avoid interference. The TTE signal will not cause interference nor will it affect any stationary, portable, or remote control solid-state equipment. The TTE equipment will also not cause any health effects.

The cap-lamp intrinsically-safe (IS) magnetic moment is 1.1 ampere per meter². The magnitude of the electric field component is 22.2 volts per meter. The power is 1.3 watts. The absorption rate for a miner weighing 100 kg is $1.3 \times 10^{-2}$ w/kg and safety factor of 6.12 to 1.

The horizontally stratified Earth overlying the underground mining complex causes the EM wave to be guided vertically.

The through-the-Earth transmission signals from trapped miners with cap-lamp transceivers and ULF band F1/F1 repeaters are subjected to very high reflection loss (R) at the air-earth surface boundary, the roof entry boundary on downward trave, and to a lesser extent, at each interface in a layered Earth geologic model. When reaching the interface, the EM wave is reflected back into the soil or overburden.

The radiating condition of a through-the-Earth (TTE) subsurface transmitter antenna requires an N-turn magnetic dipole antenna with a resonant circulating current (I) and enclosed area (A). The intrinsically safe magnetic moment (M=NIA) is presented in Table 2-6. The TTE communications problem is dominated by the surface electrical noise spectral density and required transmission bandwidth (e.g., 100 Hz) for text message transmission.

The RFI noise transmission in the ionosphere-Earth waveguide limits the upward transmission distance.

The typical measured surface electrical noise measured in a 100-Hz bandwidth is −144-dB re one Ampere/meter (dB re A/m). The noise originates from one-half millisecond duration lighting discharges in the ionosphere-Earth waveguide and exhibits a noise spectral density minimum near 2,000 Hz.

Because the RFI is oftentimes generated by sources that are several wavelengths (λ) from the mine, the far field wavefronts are plane surfaces. The EM gradiometric method of suppressing plane wavefront RFI noise should be considered.

The up-link TTE EM from a trapped miner must be much greater than the RFI noise spectrum. The destination signal-to-noise (S/N) ratio must be greater than 20-dB for intelligible transmission, $$dB = \begin{cases} 10\log_{10} SNR (\text{power ratio}) \\ 20\log_{10} SNR (\text{voltage ratio}) \end{cases}, \quad (2\text{-}66)$$

where SNR is the S/N ratio.

The RFI noise magnetic field density (B=μH) is stated as the magnetic in webers per square meter. The magnetic field noise spectral density exhibits a local minimum in the ULF band (e.g., 300 to 3,000 Hz) near 2,000 Hz. If the RFI noise was the only consideration, then the TTE communications system operations frequency should be near 2,000 Hz. Because the transmission loss through the Earth surface boundary decreases with increasing frequency while the absorption (e.g., attenuation) loss decreases with frequency, the selection of the optimum operation frequency requires further analysis.

The lightning generated noise quasi-transverse electromagnetic (quasi-TEM) wave exhibits a vertically polarized electric field emanating from negative build up charge on the Earth's surface. The charge polarity alternates every half wavelength of radial distance from the lightning strike, causing a horizontally polarized electric field on conductive boundaries. By the Poynting vector theorem (P=E×H), the horizontally-polarized field components travel downward into the soil with propagation constant (κ). The horizontal electric field component causes the vertically polarized electric field to tilt with angle θ given by, $$\theta = \tan^{-1} \frac{1}{\sqrt{\varepsilon_r}} \frac{1}{\left[1 + \left(\frac{\sigma}{\omega\varepsilon}\right)^2\right]^{\frac{1}{4}}}; \frac{\sigma}{\omega\varepsilon} \gg 1 \quad (2\text{-}67)$$

Three-phase AC power transmission systems operate with unbalanced phase currents causing ground currents to flow within one skin depth (e.g., 100s of miles) from the transmission line. The fundamental and harmonics flow in higher electrical conductivity underground layers. The underground current flow generates magnetic fields observable in the measured noise data.

The destination signal must be at least 10-dB above the noise for the TTE system to exhibit a BER of at least 1 in 100. The magnetic field noise can be suppressed by 30-dB by employing a cross-polarized vertical magnetic dipole (VMD) receiving antenna. An electromagnetic gradiometer (EMG) antenna suppresses the surface noise by at least 60-dB. The TTE communication depth through twenty milliseimen/meter soils for intrinsically-safe (IS) transmission magnetic moment (M) VMD antennas in the mine is given in the Table 2-10 for VMD and EMG receiving antennas.

The average depth of cover in American mines is about 1,000-feet. Gradiometer receivers will achieve a BER of better than 1 bit in 10 million bits. Equation 2-48 suggests that a phase coherent VMD array built with $Q_{CKT}$ antenna of less than unity can achieve intrinsically-safe (IS) operation with very high magnetic moments. Such arrays are under development.

A review of American Bureau of Mines RFI data gathered for many American mine company properties show a noise minimum near 2,000 Hz, which would appear to be the optimal frequency for through-the-Earth two-way data and text message transmission. The transmission loss, or absorption into heat, is very high in passing through each geologic layer. The ULF transmission parameters are given in Table 2-7.

TABLE 2-7

Electromagnetic Wave Transmission Factors
($\sigma = 0.05$ S/m and $\varepsilon_r = 10$).

| Frequency (Hertz) | Loss Tangent | Attenuation Rate (dB/ft) | Phase Constant (radian/m) | Wavelength meter (feet) | Skin depth meter (feet) |
|---|---|---|---|---|---|
| 30 | 3,000,000 | $6.4 \times 10^{-3}$ | $2.43 \times 10^{-2}$ | 2,582 (8469) | 411 (1348) |
| 300 | 300,000 | $2.04 \times 10^{-2}$ | $7.69 \times 10^{-2}$ | 817 (2680) | 130 (426) |
| 500 | 180,000 | $2.62 \times 10^{-2}$ | $9.9 \times 10^{-3}$ | 632 (2073) | 101 (330) |
| 1000 | 90,000 | $3.73 \times 10^{-2}$ | $1.41 \times 10^{-2}$ | 447 (1466) | 71 (232) |
| 1,500 | 60,000 | $4.5 \times 10^{-2}$ | $1.7 \times 10^{-2}$ | 365 (1197) | 59 (192) |
| 2,000 | 45,000 | $5.26 \times 10^{-2}$ | $1.99 \times 10^{-2}$ | 316 (1036) | 50 (164) |

Radiating magnetic dipoles near interface boundaries have equivalent circuits that include the reflected impedance of the boundary. For this reason, the first reflection interface is substantially in the near field. The near reflection loss is omitted from the total path loss.

The reflection loss increases significantly as the frequency is decreased, while the transmission through the air-earth interface improves as the frequency is increased.

From petrophysics the attenuation rate increases with the first power of frequency.

The TTE waveguide up and down transmission paths can be analyzed to determine the destination signal to noise ratio. Intrinsic safety considerations limit up-link transmit power and magnetic moment (M) so the magnetic dipole coil inductance and peak circulating flow lies under the UL913 ignition curve. The down-link transmit magnetic moment is not limited, which allows this communications link to be realizable with commercially available technology. Equations (2-17) and (2-18) can be compared to show that the radial component of the magnetic field versus mine entry depth will result in the largest vertically polarized magnetic field component at the surface.

The normalized magnitude of the magnetic field component is increased by 20 log M in-dB where M is the intrinsically-safe (IS) value of magnetic moment (see Table 2-6).

Intrinsically safe radial magnetic field components above a surface are given in Table 2-9.

TABLE 2-8

Magnitude of Radial Magnetic Field Components for a Normalized Magnetic Moment of 1 ATM$^2$ Operating at a Frequency of 2,000 Hz in 20 mS/m Overburden

| Depth | Magnetic Field (dB | |
|---|---|---|
| Feet | Just | Above |
| 500 (152) | −152 | −175 |
| 1,000 | −183 | −206 |
| 1,500 | −207 | −230 |
| 2,000 | −228 | −241 |
| 2,500 | −249 | −262 |

TABLE 2-9

Intrinsically Safe Radial Magnetic Field Components Above a Surface

| | Circumference of a Vertical Magnetic Dipole Antenna (ft) | | | |
|---|---|---|---|---|
| | 50 | 100 | 140 | 300 |
| Depth (ft) | Intrinsically Safe Radial Magnetic Field Components (dB re 1 A/m) | | | |
| 500 | −137 | −128 | −124 | −114 |
| 1,000 | −168 | −159 | −155 | −145 |
| 1,500 | −192 | −183 | −179 | −169 |
| 2,000 | −203 | −194 | −190 | −180 |
| 2,500 | −226 | −217 | −213 | −203 |

The magnetic moment can be increased from the intrinsically-safe (IS) value as, $$20\log M = \begin{cases} 10\log\left(\dfrac{A\ell}{\pi\mu}\right) + 10\log\left(\dfrac{P_d}{BW}\right) \text{ferrite core} \\ 10\log 2\pi R^3 - 10\log\left[\text{Ln}\dfrac{8R}{a} - \dfrac{7}{4}\right] + 10\log\left(\dfrac{P_d}{BW}\right) \text{air core} \end{cases} \quad (2\text{-}68)$$

The magnetic moment can be increased by decreasing BW. Doubling the power ($P_d$) applied to the antenna only increases magnetic moment (M) by 3-dB for the same BW. The price paid for higher power is increased demand for battery capacity. This condition is one of the reasons that the system design goal is to decrease required bandwidth, thereby increasing detection sensitivity.

TABLE 2-10

Surface Signal-to-Noise Ratio for Vertical Magnetic Dipole Antennas

| Depth | Surface Signal-to-Noise Ratio (dB) Circumference of a Vertical Magnetic Dipole | | | | | | | |
|---|---|---|---|---|---|---|---|---|
| | 50 | | 100 | | 140 | | 300 | |
| (ft) | VMD | EMG | VMD | EMG | VMD | EMG | VMD | EMG |
| 500 | 27 | 47 | 36 | 56 | 40 | 60 | 50 | 70 |
| 1,000 | −4 | 16 | 5 | 25 | 9 | 29 | 19 | 39 |
| 1,500 | −28 | −9 | −19 | 1 | −15 | 5 | −5 | 15 |
| 2,000 | −39 | −19 | −30 | −10 | −26 | −6 | −16 | 4 |
| 2,500 | −62 | −42 | −53 | −33 | −49 | −29 | −39 | −19 |

The mine communications and tracking system, illustrated in FIG. 2-12, and fulfilling the Option 2, features transceivers designed with identical circuit modules. The software definable transceiver block diagram is illustrated in FIG. 2-31.

Bluetooth transmission enables the transceiver to communicate with external gas monitors and text messaging keyboards. A personal digital assistant (PDA) enables wireless modification of the software code for specific applications.

The magnetic dipole antenna is switched to series resonant condition when the push-to-talk (PTT) voice or data transmission is requested. The transceiver provides simplex/half duplex wireless communications between a miner-on-the-move and the distributed antenna and transmission facility. The transceiver series-to-parallel switch connects the magnetic dipole antenna in a parallel resonant condition. This design allows the transceiver to monitor the distributed antenna and transmission lifeline conductor waveguide for radiated signals, including the modulated carrier frequency traffic and radio frequency interference (RFI) spectral density generated by electrical equipment powered from the mine AC power distribution cables.

The antenna received electromotive force, emf, is applied to a variable gain amplifier optimized for minimum noise spectral density. The 24-bit analog-to-digital (A/D) converter enables the receiving mode of the transceiver to operate over a dynamic range of 144-dB. The A/D converter signal is applied to a field programmable gated array (FPGA).

The physical layer employs multi-level frequency (4FSK) modulation and demodulation of each carrier frequency in the ultra low, low, or medium-frequency bands. The modulation scheme enables multiple communication channels to be available in MF communications system. The dispatch channel is used to net mining groups together. Carrier frequencies in the ultra low frequency (ULF) band are used in through-the-Earth communications. The instantaneous transceiver bandwidths are either 100 Hz or 30 kHz for packet transmission rates of 80-bytes/second or 26 kilobits/second, respectively.

The topology of the distributed antenna and transmission lifeline conductor waveguide facility illustrated in FIG. 2-12, is physically, not algorithmically, redundant. The termination ends of the waveguide (e.g., at working face area) employ ULF-band carrier frequency transceivers for two-way text and synthetic voice transmission for through-the-Earth (TTE) communications. The termination ends include a second repeater-transceiver operating with a low-to-medium frequency band carrier frequency, determined by the radio frequency interference (RFI) spectrum analyzer layer to monitor busy channels and RFI noise bands. The transmission signal is a multi-level frequency modulated with a packet message. The transmitted packet signal reaches the portal via bifilar mode propagation on the distributed antenna and transmission lifeline conductor waveguide. The face area termination end transceivers operate as a bridge between the surface for ULF data messaging (e.g., text or sensor data) and the low-to-medium frequency distributed antenna and transmission lifeline waveguide for mine-wide coverage. A miner-on-the-move can communicate data messages to the surface and portal.

Miners-in-motion wear either a cap-lamp or gas monitoring transceiver. Either transceiver periodically bursts a 134-kHz radio wave energy to power-up and then listen to the 134-kHz reply from nearby passive reverse radio frequency identification (RFID) tags integrated with the lifeline waveguide. The spectrum analyzer and tracking layer imbedded codes are distributed between the FPGA, digital signal processor, and microprocessor integrated circuits. The periodic burst from the cap-lamp or gas monitoring transceiver can be used by mine rescue team members carrying a Fox Hunter direction finding antenna to locate down and trapped miners.

Transceivers feature fixed-length digitally encoded packet messages for voice and data (e.g., text, location, or ID sensor values). The base band processor (CML) decodes and assembles the packet message. The messages are 48-bytes in length with 4-bytes to identify the type of message and provide control information. The synchronization preamble requires 8-bytes for a total packet length of 52-bytes for the application payload.

The transceiver, transmission facility traffic monitoring mode, employs a media access control (MAC) layer. The carrier sensing, multiple access with collision avoidance protocol is applied in the traffic-monitoring mode. Detecting a traffic null, a dithered time period elapses before a packet transmission starts. The random back-off time period reduces the likelihood of packet collisions in the transmission facility. The MAC layer adds a header to each packet transmission containing the destination address and other information. The physical layer overhead adds 10-bytes bringing the packet to 71-bytes. The 26-kilobits/second data rate requires a packet transmission period of 22-milliseconds.

The transmission facility repeater-transceivers are built with circuits described that are separated by 5,000 to 10,000-feet. Parallel entries driven into the coal block each have installed lifeline conductor waveguides. The conductor waveguides are connected together at the specified separation distance. Each parallel conductor waveguide is brought together at a common point, but insulated from each other. A repeater-transceiver is installed in a protective borehole near the common point such that the magnetic dipole antenna inductively induces approximately an equal carrier frequency signal current in each conductor. Reciprocity applies and the packet traffic carrier frequency signal current flowing in each conductor waveguide, by Ampere's law, generates a magnetic field along the distributed antenna. The magnetic field component near by the antenna induces electromotive force signals in the magnetic dipole antenna during the monitoring mode. The conductor waveguides are also inductively coupled together when installed in a confined area and couple across breakers in otherwise continuous cables. A break of at least 50-feet is required to create an radio frequency signal block. The repeater network provides radio coverage over miles of entries.

An advantage of the 5,000 to 10,000 foot repeater separation is that only one rechargeable battery pack is required per mile of entries. This compares favorably with very high frequency (VHF)/UHF networks.

The repeater-transceivers have been designed with 1.66-inch diameter cylindrical enclosures for insertion into roof bolt holes. The enclosures have achieved MSHA flameproof approvals. The cylindrical enclosures have internal rechargeable batteries protected by redundant current trip circuits. A flameproof enclosure used for protective burial, and includes a graphical display for text messaging.

An EM-Gradiometer can be used on the surface or flying above to detect the signal from a system refuse chamber (200 in FIG. 2) or cap-lamp transceiver 102. It is hand carried on the surface, or flown on an unmanned aerial vehicle (UAV) to pinpoint the location of trapped miners by sensing the origin of the transmitted signal. What it's looking for are any TTE EM waves that travel straight upward through the layered earth.

If the maximum response of an EM-Gradiometer is correlated with global positioning system (GPS) information and mine maps, the miner's location within the mining complex and their depth below the surface can be surmised. EM-Gradiometers are modified to display text messages sent from a tracking beacon sent from a refuse chamber or cap-lamp battery transceiver.

Figure 2:
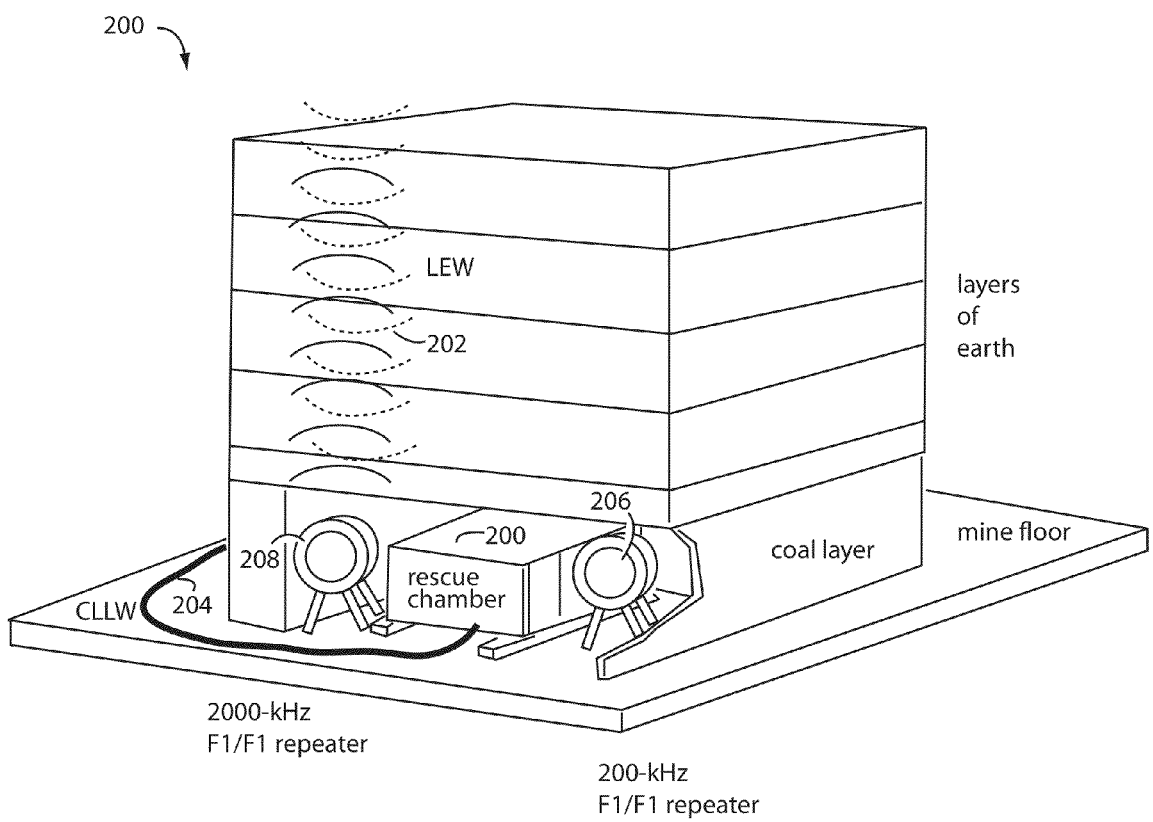
FIG. 2 is a diagram of a refuge chamber equipped with layered earth and conductor lifeline waveguide transmission infrastructure.

FIG. 2 represents a refuse chamber 200 with layered earth (LEW) 202 and conductor lifeline (CLLW) 204 waveguide transmission infrastructure. A 200-kHz F1/F1 repeater 206 enables transmission in the conductor/lifeline waveguide (CLLW) 109. Another, 2000-Hz F1/F1 repeater 208 enables transmission in the layered earth waveguide (LEW) 107. Simplex, half-duplex digital voice transmission is used in both waveguides. A coal seam waveguide (CSW) provides working face coverage, and the LEW waveguide can be used as the last link to the surface for emergency communication.

EM-Gradiometers use two oppositely wound coils to create polarized horizontal magnetic dipoles. These are coaxially separated by a short distance. Upward traveling EM wave magnetic field components are polarized. A surface or airborne gradiometer will see an electromotive force (EMF) generated in each coil. Such EMF can be mathematically represented by, $$\text{emf} = -N\frac{d\phi}{dt}, \quad (1\text{-}12)$$

where N=the number of turns of magnetic wire and
Φ=the flux of the magnetic field.
The flux can be mathematically represented by, $$\phi = BA, \quad (1\text{-}13)$$

where, B=μH the magnetic field density Webbers per square meter,

H=the magnetic field intensity in amperes per meter, and
$\mu = \mu_o \mu_r$,
where, $\mu_o = 4\pi \times 10^{-7}$ and $\mu_r$ is the relative magnetic permeability.

Continuous wave (CW) magnetic fields generate electromotive force voltage mathematically expressed by, $$\text{emf} = -iN\mu_o\omega(\mu_r A)H \text{ volts} \quad (1\text{-}14)$$

Figure 3:
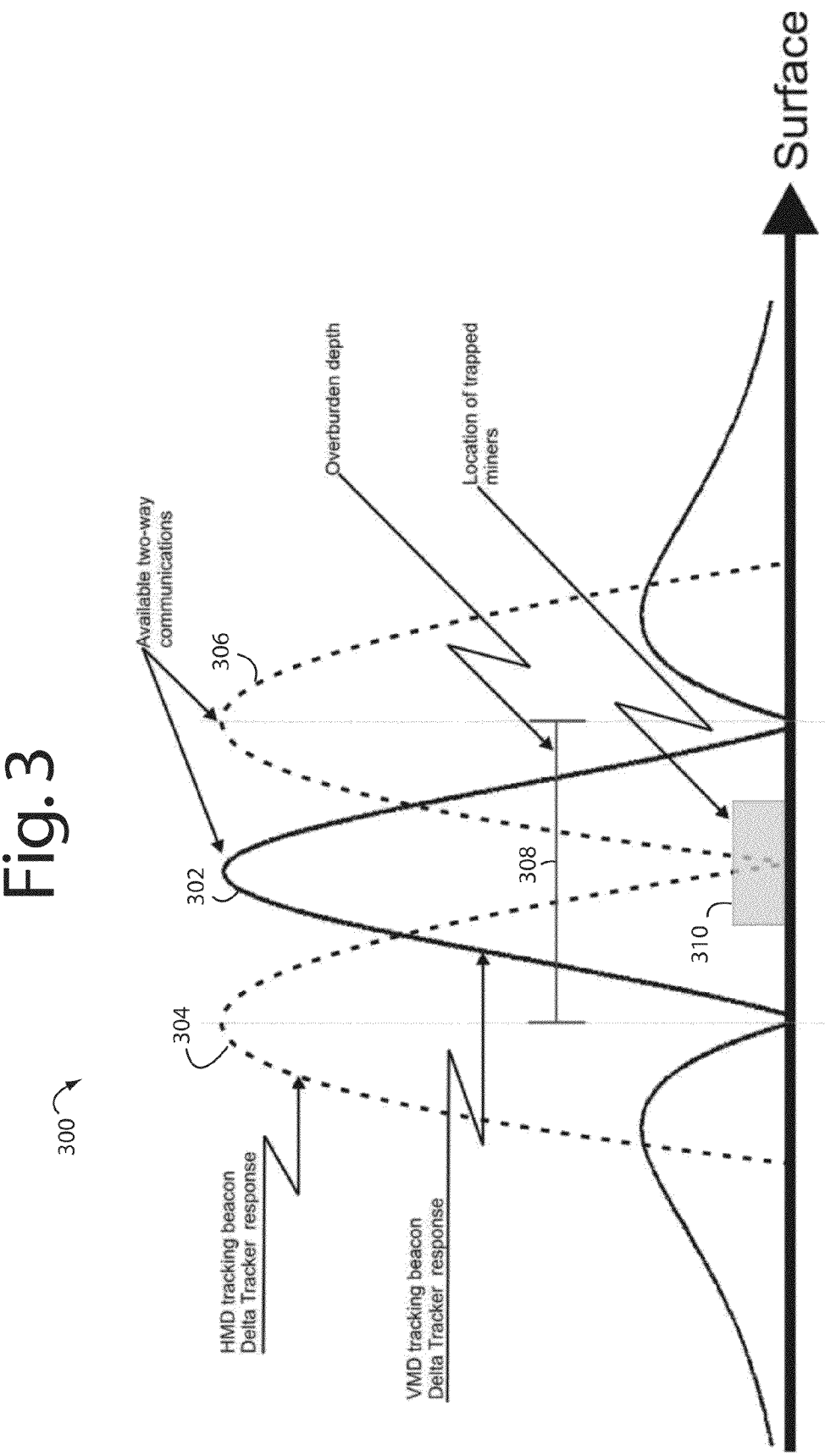
FIG. 3 is a graph representing how signals from miners underground appear at the surface to a Delta Tracker EM Gradiometer.

A series connection of the coils generates an output voltage V=emf$_1$−emf$_2$. For every incidence angle, plane wavefronts generate identical EMF values force the differential summation to zero (suppression). The ratio of the magnitudes of the EMF generated in a single antenna coil to the differential sum voltage expressed in logarithms is the suppression factor for the gradiometer. The gradiometer response along a flight or survey path over a trapped miner is illustrated in FIG. 3. EM-Gradiometers suppress the plane wavefront surface RFI noise in the receiving antenna. Surface RFI noise would otherwise severely limit the depth of detection.

FIG. 3 is a graph 300 representing how signals 302, 304, and 306 from miners underground with cap-lamp and beacon transceivers will appear at the surface to a Delta Tracker type EM Gradiometer. Signal 302 is maximum at points directly above when using a vertical magnetic dipole (VMD). Signals 304 and 306 will have maximums observed by a horizontal magnetic dipole (HMD) at a separation distance (D) 308 that varies in proportion to the depth of overburden above, for example, a refuse chamber or cap-lamp transceiver 310. Signals 302, 304, and 306 can be used as carriers to support voice and text communication with the surface.

Refuse chamber and cap-lamp transceivers operating in the TTE ultra low frequency (ULF) band use a horizontal magnetic dipole (HMD) antenna to generate a magnetic field. If the seam depth is less than one skin depth (s), a vertical magnetic dipole (VMD) is used. Otherwise, a horizontal magnetic dipole (HMD) is preferred.

FIG. 3 shows what happens when an EM-Gradiometer is moved or flown over the surface areas that are directly vertical from a trapped miner. A characteristic peak and null in the gradiometer response occurs exactly over the location of a radiating magnetic dipole antenna. The peak-to-peak (HMD) or null-to-null (VMD) separation distance can be used to estimate the depth of burial. But, any refractions occurring near the surface can lead to errors in the depth estimates.

A quick airborne detection of a trapped miner is made possible in embodiments of the present invention. An EM-Gradiometer payload on an unmanned aerial vehicle (UAV) is flown over the mine site. UAV navigation is handed off to a Situation Awareness Computer System (SACS) at the mine. The SACS is preprogrammed to control the UAV search pattern with a flight duration limited to twenty (20) hours. Trapped miner detection training is periodically conducted by MSHA at the mine site. The SACS terrain map provides automatic flight control information to the UAV auto pilot, the location is quickly determined. A hand-held EM-Gradiometer is directed to the location directly above where the trapped miner is expected to be.

The radio communications and tracking system design requirements for emergency and operational conditions in underground mines are vastly different from those imposed in the standard telecommunications industry. Specifically, the design requirements and existing data transmission protocol cannot be applied. The underground system design is first and foremost based on radio geophysics fundamentals. The absorption (attenuation) of EM energy along transmission paths is significant when compared with the attenuation rates encountered in terrestrial and satellite communications networks. Because attenuation rates are significant, the design must focus on maximizing receiver (detection) sensitivity.

When considering transmission in a coal mine, the intrinsic safety limitations restrict energy release from batteries and reactive circuit components to less than 0.25 millijoule. This limits transmit power and forces the receiver to be optimized for maximum detection sensitivity. The destination signal to noise ratio must be greater than 20-dB to achieve acceptable bit error rate for intelligible communications. The destination signal (S) arriving at each receiver must be significantly greater than the noise (N). As the SNR degrades, the intelligibility of the message becomes unacceptable. The system design must minimize the RFI noise as well as the noise generated in the receiver input circuits for through-the-earth communicating. Methods of combating RFI employing gradiometer methods were presented in the preceding paragraphs. The receiver design itself must minimize noise for maximum detection sensitivity.

Figure 5:
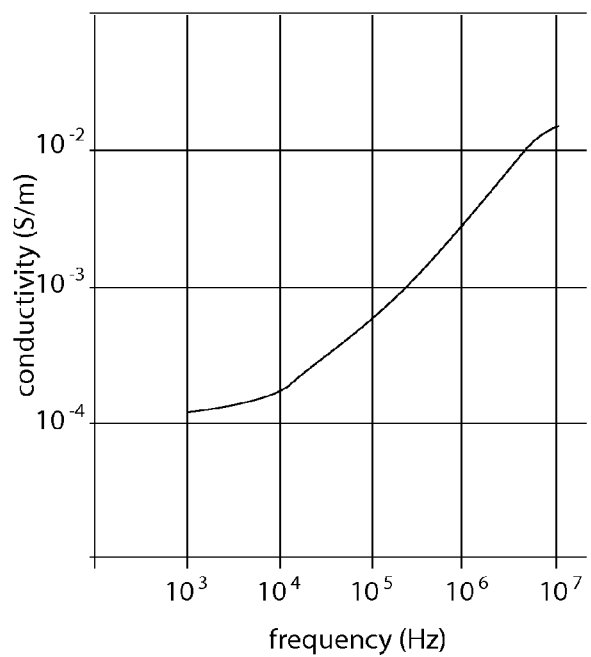
FIG. 5 is a graph of the electrical conductivity ($\sigma$) of sedimentary rocks as measured in a laboratory and shows a first-order dependence on frequency, in Siemens per meter versus frequency.

Referring now to FIG. 5, the electrical conductivity ($\sigma$) of sedimentary rocks has been measured and shows a first-order dependence on frequency, in Siemens per meter versus frequency. The electrical conductivity is frequency dependent because of the complex nature of the natural media dielectric constant.

Figure 6:
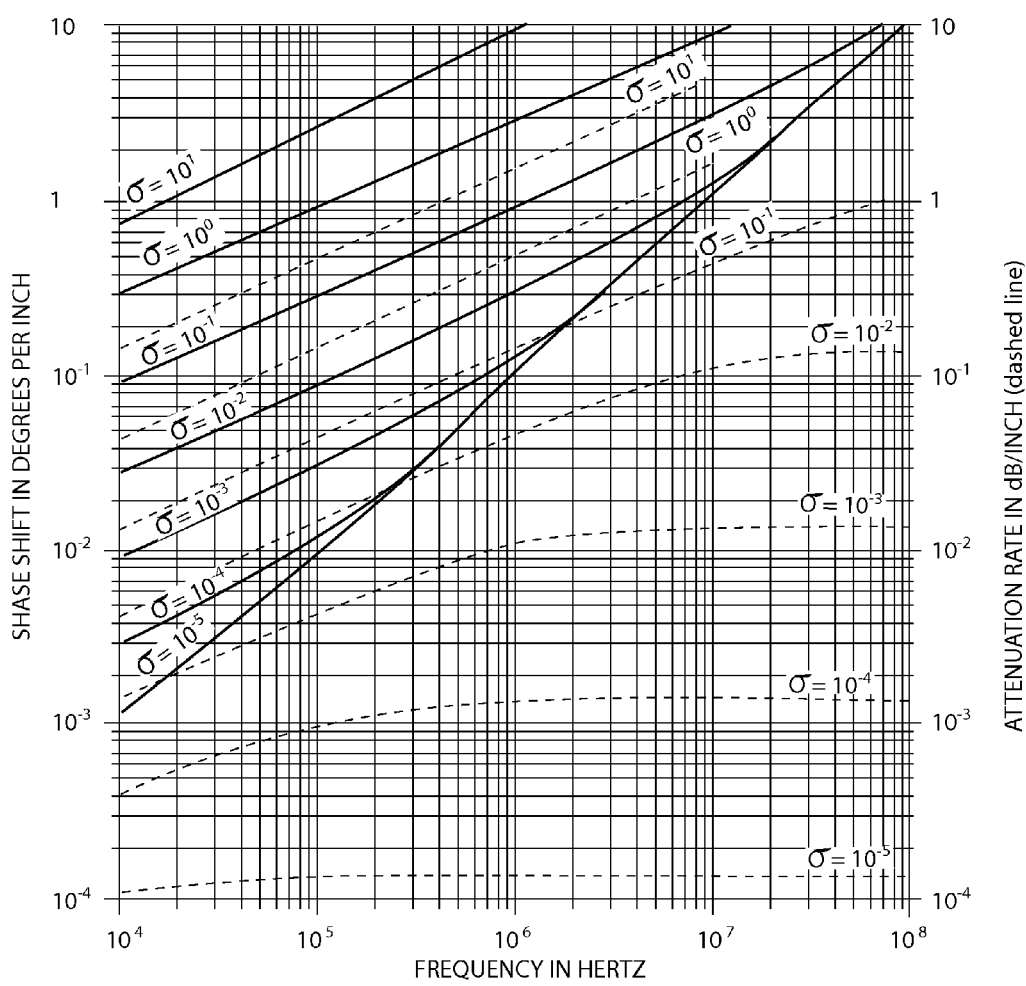
FIG. 6 represents the attenuation rate ($\alpha$) and phase shift ($\beta$) values in graphical form.

FIG. 6 represents the attenuation rate ($\alpha$) and phase shift ($\beta$) values in graphical form.

Figure 7:
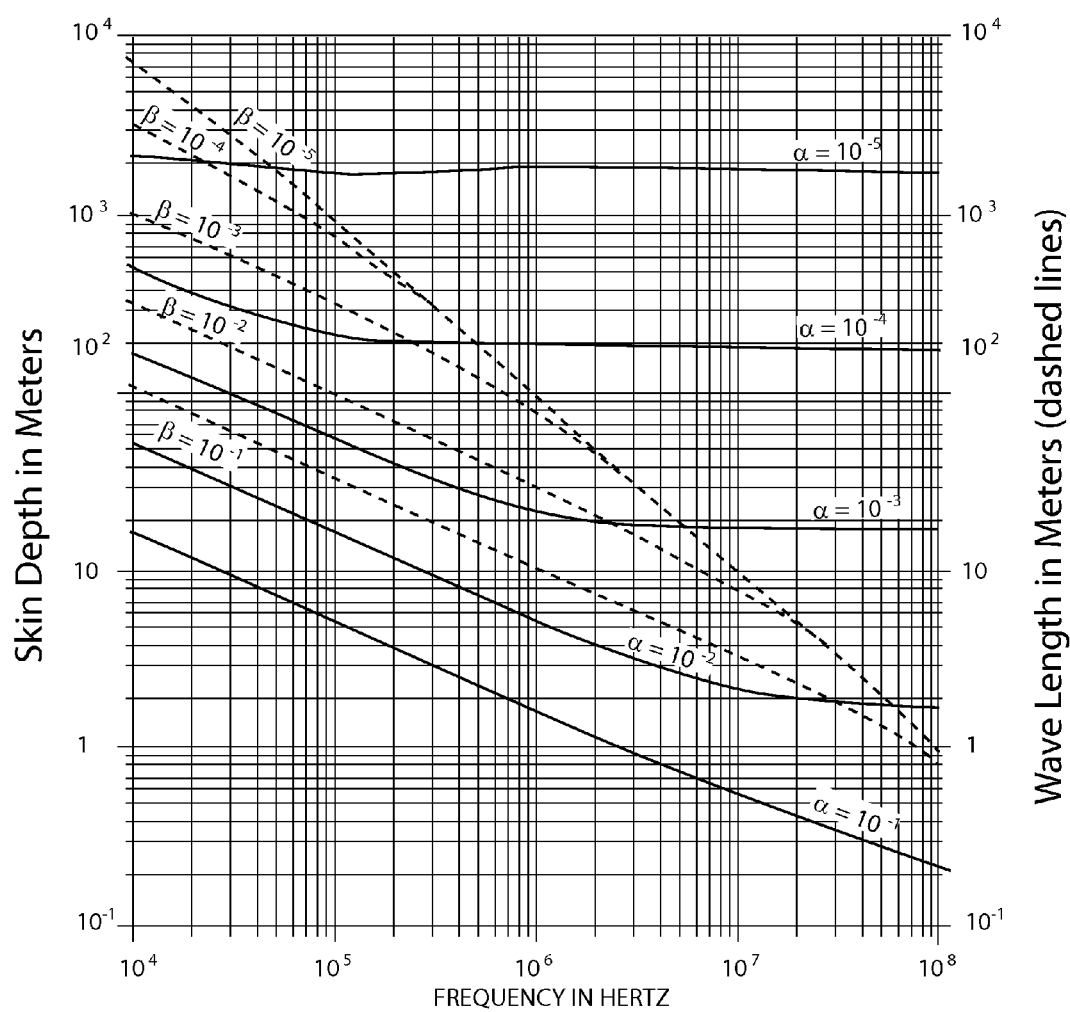
FIG. 7 represents the skin depth and wavelength of subsurface EM waves.

FIG. 7 represents the skin depth and wavelength of subsurface EM waves. In FIG. 6, the attenuation rate ($\alpha$) and phase constant ($\beta$) for a Uniform Plane Wave Propagating in a Natural Medium with a Relative Dielectric Constant of ten. Bottom-to-Top Curves Represent Increases in Natural Media Conductivity From $10^{-5}$ to $10^1$ S/m. In FIG. 7, Skin Depth and Wavelength in a Natural Medium with a Relative Dielectric Constant of 10.

Figure 8:
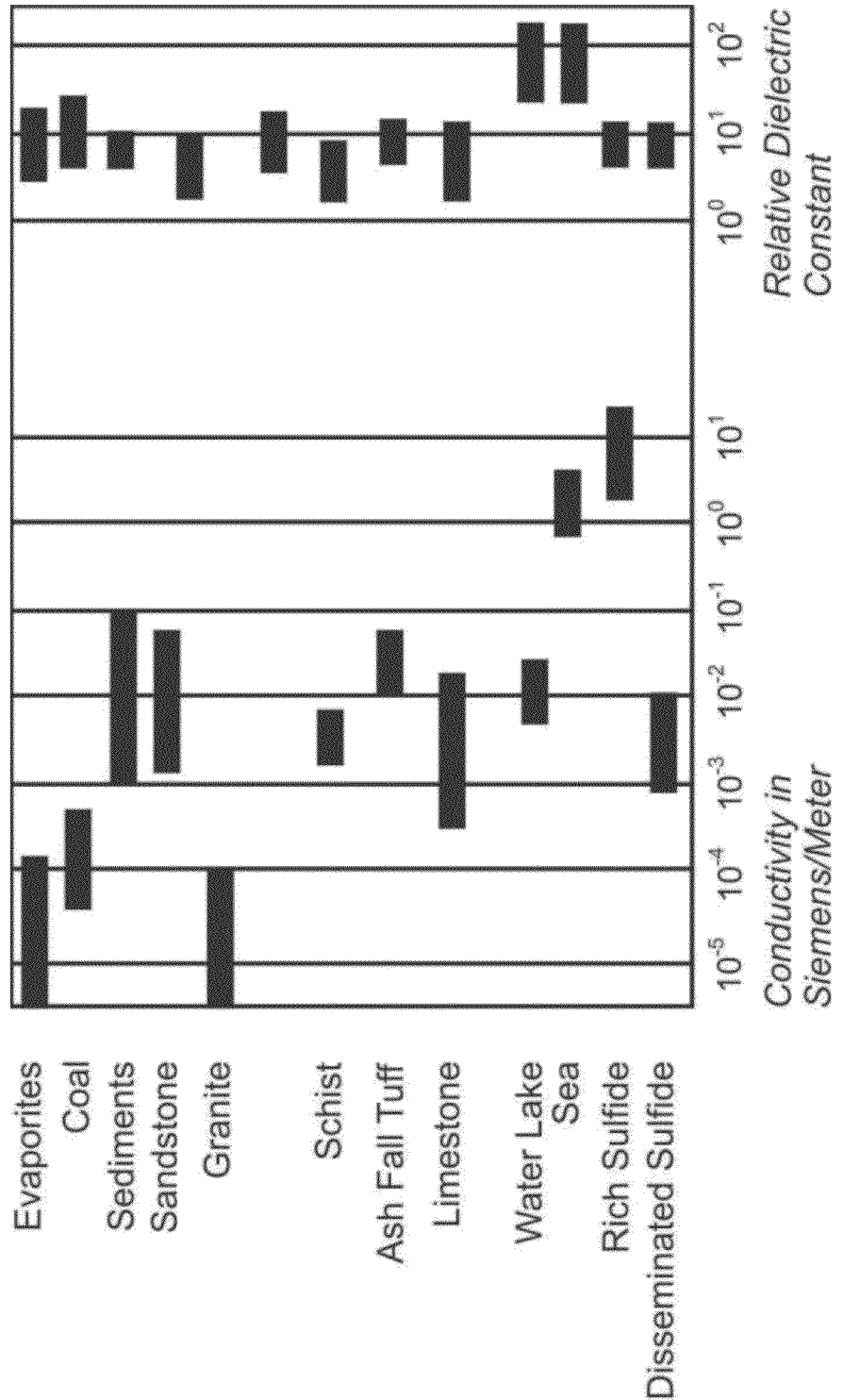
FIG. 8 is a graph showing the range of electrical conductivity and relative dielectric constant for natural media, in which the propagation constant can be estimated for various types of natural media.

FIG. 8 shows the range of electrical conductivity and relative dielectric constant for natural media, whereby the propagation constant can be estimated for various types of natural media.

The electrical conductivity of most natural media increases with frequency. The left end of the bar symbol in FIG. 1-16 corresponds to low frequency values. FIG. 1-14 shows that the lower frequency signal attenuation rate decreases from high frequency values so that deeper targets are detected at lower frequencies.

A lot of the energy in EM waves is reflected at the boundaries and interfaces of two electrically different natural media. Only a portion of the energy from the transmitter will actually reach the receiver. Another major portion of the transmitted energy is absorbed in the intervening media and lost as heat.

When the propagating electromagnetic wave intersects a boundary of contrasting electrical parameters (petrophysics), reflections, refraction and scattering occur.

Underground radio communication research, development, and in-mine demonstrations have determined that five different waveguides can be exploited to support electromagnetic (EM) wave transmission in underground mines.

Namely, the EM wave transmission waveguides simultaneously used by embodiments of the present invention are the: Ionosphere-earth surface waveguide; through-the-layered-earth (TTE) waveguide; conductor/lifeline (CLL) waveguide; coal/trona/potash seam (CS) waveguide; and, tunnel waveguide.

A multi-mode radio communications transceiver able to use these five waveguides is provided for miners use in underground mines. The system allows two-way text messaging and voice communications between roaming underground mine personnel.

The through-the-layered-earth waveguide supports ULF (e.g., 300 to 3,000-Hz) band transmission. The ULF band limitation includes the problem of driving high currents in very long wire antennas. Deployment of long wire antennas in mountainous terrain and obtaining permission from surface landowners is a formidable problem. Voice band waveforms cannot be directly communicated by ULF EM waves so that text messaging must be used. The maximum transmission distance is determined primarily by the absorption of EM wave energy when traveling through soil and rock; reflection losses from boundaries (air-earth surface and coal-entry) with high impedance contrast; limits on the detection sensitivity of a receiver; and the magnetic moment of the radiating magnetic dipole.

The absorption of energy can be determined from the attenuation rate. The attenuation rate is primarily determined by the operating frequency and electrical parameters of the soil and rock. The reflection loss is predominately determined by the contrast in electrical parameters at a geologic boundary, which are frequency dependent. The electrical conductivity is strongly dependent on the complex nature of the dielectric constant of soil and rock and increases with frequency. This condition causes the attenuation rate to increase with the first power operating frequency. The detection sensitivity degrades with $10 \log_{10}$ BW. Narrow bandwidth (BW) transmission infrastructure are required in emergency communications and tracking. The magnetic movement is restricted by intrinsic safety considerations. These phenomena are the driving factor underlying the design of ULF radio equipment for through-the-earth communications. Extremely low frequency (30-300-Hz) require loop antenna that cannot be used in roaming miner communications devices. The high power level required to drive long wire antennas has limited the ULF radio equipment to one-way, down-link communications. For this reason, ULF transmission should not be used in roaming miner communications systems where quick voice communication is essential.

The coal seam waveguide and conductor/lifeline waveguides support the low frequency LF band (e.g., 30-300-kHz) transmission. Often, higher electrical conductivity sedimentary rock surrounds lower electrical conductivity rock layers. This condition, in addition to dielectric constant changes, forms natural waveguides in the earth where quasi-transverse electromagnetic waves travel great distances. In mudstone and shale sedimentary rock, the electrical conductivity increases from $10^{-3}$ to $10^{-2}$ Siemens per meter (S/m) in the LF band. The conductivity of sandstone, granite, coal, salt, trona, quartz, oil-saturated sandstone, and Gilsonite exhibit conductivities near $10^{-4}$ S/m. The natural waveguide decreases the spread of the EM wave from inverse of radial distance (r) from the transmitting antenna to the square root r of the radial distance. The waveguide increases the operating range. Even when the natural waveguide does not form in the soil and rock medium, the LF Band transmission distance is significant. Advanced LF transceiver design for the Stolar Radio Imaging Method (RIM IV) instrumentation has achieved transmission distances of 400 meters in rock and more than 800 meters in the natural coal seam waveguide at an operating frequency of 100-kHz. The operating distance exceeds 1,600 meters in salt and granite. The RIM IV transceivers employ specially formulated ferrite-rod antennas with operating quality factors greater than 50.

Transmission of UHF electromagnetic waves in larger cross section mine entries and tunnels achieve hundreds of meters with scattering enabling transmission around corners. UHF EM waves are reflected at every air-earth on air-coal interface causing a transmission loss of at least 20-dB. The high attenuation rate of UHF EM in coal and sedimentary rock severely limits transmission distance.

The horizontal layers of the stratified earth overlying a underground mining complex causes radiations from EM wave sources in the mine to be directed straight up. The through-the earth transmission signals from trapped miners with cap-lamp transceivers and ULF band F1/F1 repeaters are subjected to very high reflection loss (R) at the air-earth surface boundary and the rock entry boundary on downward travel. To a lesser extent, at each interface in layered earth geologic model. When reaching the interface, the EM wave is reflected back into the soil or overburden. The RFI noise transmission in the ionosphere-earth waveguide limits the upward transmission distance.

The far field wavefronts are plane surfaces because the RFI is often times generated by sources that are several wavelengths ($\lambda$) from the mine. The EM-Gradiometer naturally suppresses plane wavefront RFI noise. A noise minimum near 2,000-Hz would appear to be the optimal frequency for the through-the-earth two-way data and text message transmission. The transmission loss (absorption into heat) is very high in passing through each geologic layer. The ultra low frequency (ULF) transmission parameters are illustrated in Table 1-4.

TABLE 1-4

EM Wave Transmission Factors $\sigma = 0.05$ S/m $E_\alpha = 10$

| Frequency (Hertz) | Loss Tangent | Attenuation Rate (dB/ft) | Phase Constant ($\beta$) (Rad/m) | Wavelength ($\lambda$) meter (feet) | Skin depth ($\delta$) meter (feet) |
|---|---|---|---|---|---|
| 30 | 3,000,000 | $6.4 \times 10^{-3}$ | $2.43 \times 10^{-2}$ | 2582 (8469) | 411 (1348) |
| 300 | 300,000 | $2.04 \times 10^{-2}$ | $7.69 \times 10^{-2}$ | 817 (2680) | 130 (426) |
| 500 | 180,000 | $2.62 \times 10^{-2}$ | $9.9 \times 10^{-3}$ | 632 (2073) | 101 (330) |
| 1000 | 90,000 | $3.73 \times 10^{-2}$ | $1.41 \times 10^{-2}$ | 447 (1466) | 71 (232) |
| 1500 | 60,000 | $4.5 \times 10^{-2}$ | $1.7 \times 10^{-2}$ | 365 (1197) | 59 (192) |
| 2000 | 45,000 | $5.26 \times 10^{-1}$ | $1.99 \times 10^{-1}$ | 316 (1036) | 50 (164) |

Radiating magnetic dipoles near interface boundaries have equivalent circuits that include the reflected impedance of the boundary. For this reason, the first reflection interface is substantially in the near field. The near reflection loss is omitted from the total path loss.

The reflection loss of air-earth interfaces increases significantly as the frequency is decreased, while the transmission through the air-earth interface improves as the frequency is increased. The loss tangent corresponds to the following electrical conductivity at 2-kHz:

| Limestone | $\sigma = 0.0044$ S/m | Wet Sandstone |
| Sandstone | $\sigma = 0.022$ S/m | Mudstone |
| Saturated Shale | $\sigma = 0.044$ S/m. | Shale |

The attenuation rate increases with the first power of frequency.

In TTE waveguides, the intrinsic safety considerations limit uplink transmit power and magnetic moment (M) so the magnetic dipole coil inductance and peak circulating flow lies under the UL913 ignition curve. This translates to a maximum magnetic moment (M) to four (4) ampere turn meter$^2$ (ATM$^2$). The down link transmit magnetic moment is not limited, make this communications link realizable with commercially available technology. If the power center or refuse chamber 2000-Hz F1/F1 transceiver and antenna are enclosed in a flame proof enclosure with an intrinsically safe battery, the magnetic moment (m) is not restricted.

Examination of equations 1-13 and 1-15 determines the radial magnetic field component is two times larger (6 dB) then the azimuthal field component in the near field $$\left(\text{distance} < \frac{\lambda}{2\pi}\right).$$

In the far field, the azimuthal magnetic field component predominates. For this reason, deeper mines require TTE communications systems to deploy horizontal magnetic dipole (HMD) antennas.

Equation 1-10 can be used to determine the azimuthal ($\theta$) component of the magnetic field at the surface of the slightly conducting whole space. The magnetic field (H) transmission through-the-earth air interface reflection increases the loss. Table 1-5 illustrates the up-link destination signal to noise ratio.

TABLE 1-5

Through-the-Earth Uplink Transmission Distance Signal to Noise Ratio (SNR) at the Surface ($\sigma = 0.05$ S/m, M = 4 ATm$^2$)

| | Transmission Frequency in Hertz | | | | | |
|---|---|---|---|---|---|---|
| | 30 | 300 | 500 | 1000 | 1500 | 2000 |
| Earth-Air Reflections loss in-dB | −29 | −27.5 | −27 | −25 | −24 | −23 |
| Magnetic Field in-dB re 1 A/m ft (m) | | | | | | |
| 300 (90) | −122 | −125 | −125 | −124 | −124 | −124 |
| 500 (152) | | −138 | −137 | −138 | −139 | −140 |
| 1000 (304) | | −157 | −158 | −164 | −169 | −173 |
| 1500 (457) | | −170 | −171 | −186 | −194 | −204 |
| RFI Noise in-dB relative to 1 A/m | −136 | −134 | −145 | −145 | −144 | |
| Destination SNR ft (m) | | | | | | |
| 300 (90) | | −16.5 | −18 | −4 | +3 | +3.0 |
| 500 (152) | | −20.5 | −30 | −18 | −18 | +19 |
| 1000 (304) | | −48.5 | −51 | −44 | −48 | −52 |
| 1500 (457) | | −61.5 | −64 | −66 | −73 | −83 |

The destination signal to noise ratios illustrated in the above table show that up-link communications would not be possible through overburden without suppressing the RFI noise. The electromagnetic wave gradiometer (EM-Gradiometer) achieves a RFI noise plane wave suppression of 70 to 80-dB. The destination signal to noise ratio is illustrated in Table 1-6.

TABLE 1-6

EM-Gradiometer
Destination Signal to Noise Ratio (SNR) in-dB
Transmission Frequency in Hertz

| Depth (ft) | 300 | 500 | 1000 | 1500 | 2000 |
|---|---|---|---|---|---|
| 300 | 53.5 | 52 | 66 | 73 | 73 |
| 500 | 49.5 | 40 | 52 | 52 | 51 |
| 1000 | 21.5 | 19 | 26 | 24 | 18 |
| 1500 | 8.5 | 6 | 6 | −3 | −13 |

EM-Gradiometer detection sensitivity depends on gradiometer inductive coil separation distance (s).

A natural coal, trona, and potash seam waveguide occurs in layered sedimentary geology because the electrical conductivity of shale, mudstone, and fire clay ranges between 0.01 and 0.1 Siemens per meter (S/m) or 100 and 10 ohm-meters. The conductivity of coal, trona, and potash is near 0.0005 S/m or 2,000 ohm-meters. The 10-to-1 contrast in conductivity causes a waveguide to form and waves to travel within the seam.

The electric field ($E_Z$) component of the traveling EM wave is polarized in the vertical direction and the magnetic field ($H_y$) component is polarized horizontally in the seam. The energy in this part of the EM wave travels laterally in the coal seam from a transmitter to a receiver. There is a horizontally polarized electric field ($E_X$) that has zero value in the center of the seam and reaches a maximum value at the sedimentary rock-coal interface. The $E_X$ component is responsible for transmission of the EM wave signal into the boundary rock layer. The energy in this part of the EM wave travels vertically and out of the coal bed (e.g., the coal seam is a leaky waveguide). Energy in the EM wave "leaks" into the fractured rock overlying the coal bed, thus, weaker roof rock is detected with Stolar Radio Imaging Method (RIM) tomography. Fractures in the boundary layer increase the roof fall hazard. Roof control measures should be intensified in these areas. In roof fall hazard zones, the attenuation rate of the EM wave rapidly increase. Due to this waveguide behavior, the magnitude of the coal seam radio wave decreases because of two different factors. The EM wave magnitude decreases because of the attenuation rate and cylindrical spreading of wave energy in the coal seam. The cylindrically spreading factor can be mathematically described by $$\frac{1}{\sqrt{r}}$$

where r is the distance from the transmitting to the receiving antenna. This factor compares with the non-waveguide far-field spherically spreading factor of $$\frac{1}{r}.$$

Thus, at 100 meters, the magnitude of the EM wave within the coal seam decreases by a factor of only 10 in the waveguide and by a factor of 100 in an unbounded medium. An advantage of the seam waveguide is greater travel distance. Another advantage is that the traveling EM wave predominantly remains within the coal seam waveguide (e.g., the coal bed).

Coal seam EM wave are very sensitive to changes in the waveguide geology. The radio-wave attenuation rate in decibels per 100-feet and phase shift in electrical degrees per 100-feet are well known. The EM wave is called a zero order mode quasi-transverse EM wave. All waveguide modes above the zero order are cutoff. This phenomenon means that the EM wave does not bounce from the roof to the floor as it would in a multi-mode case. Multipath propagation is suppressed by the relatively high attenuation rate.

The effect of attenuation in the seam waveguide is to reduce the magnitude of the EM wave along the path. The coal seam attenuation rate increases with frequency. The wavelength increases as frequency decreases, which, for example, gives RIM greater operating range.

Under sandstone sedimentary rock, the attenuation rate increases because more of the RIM signal travels vertically into the boundary rock (e.g., leaks from the waveguide). If water is injected into the coal from an overlying paleochannel, then clay in the coal causes the electrical conductivity and attenuation rate and phase shift to increase.

The attenuation rate significantly increases under sandstone paleochannels. Along the margins of paleochannels, the channel scours into the bounding shale sedimentary rock. Differential compaction rapidly degrades roof rock strength. Roof falls are likely to occur along the margin, suggesting that ground control should be increased in this segment of mine entries.

The passageway waveguide transmission mode operates in the UHF (e.g., 300 to 3,000 MHz) band. Passageways form waveguides for transmission of electromagnetic waves.

A passageway waveguide transmission is possible when one-half wavelength is less than the width and height of the tunnel. When the half wavelength is greater than the passageway dimension, evanescence waves form that not propagate in an underground passageway and the transmission is said to be cutoff. Waveguides exhibit a very high attenuation rate when operating in the evanescence mode. Ultra high frequency (UHF) band transmission has been found to provide quality communications because of its favorable wavelength. Rock falls in the passageway or narrowing down of the opening initiate the evanescence mode of wave propagation. The attenuation rate also depends on loss associated with the roof, floor, and rib rock electrical parameters, plus wall roughness and tilt. Absorbing wall conditions occur when UHF-band transceivers are operated in mining sections, but cannot solve a mine-wide communications problem. Miners in non-metal underground mines conduct operations over long periods of time in localized zones. In these mines, leaky-feeder cable and repeater transceivers installed at 500 to 1,000-foot intervals can provide roaming miners with communications.

Leaky feeder or fiberoptic transmission infrastructure are being installed in the man and material (M&M) entries in support of mining operations (monitoring environment and machines). For the most part, M&M entries already have electrical conductors such as rail, conveyor belts structure and metallic cables that support Hill-Wait bifilar mode transmission. Even though the leaky feeder or fiberoptic transmission facility fail in a significant event, they would not be needed after the event since mining equipment is shut down. The conductor/lifeline waveguide transmission facility most likely remain operational after the event.

The leaky feeder or fiberoptic transmission facility is merged with the cable/lifeline waveguide (CLLW) to form a narrow and wide bandwidth transmission facility. A leaky feeder of fiberoptic cable designed with two insulated sixteen gauge conductors to support the LF band Hill/Wait bifilar mode transmission. If the leaky feeder or fiberoptic cable is installed in M&M entries, the Hill/Wait bifilar mode of transmission already exists. Conductor/life line is installed in every entry not served by the leaky feeder/fiberoptic transmission facility.

Such depends on two types of communications devices. A cap-lamp and refuse chamber transceiver with through-the-earth, conductor/lifeline and UHF transmission capability. This concept is realized by integrating a software definable transceiver (SDT) in the cap-lamp transceiver. The cap-lamp transceiver include an analog 900 MHz narrow band FM or an internet protocol transceiver. The LEW and CLLW transmission requires 2000-Hz and LF band F1/F1 transceivers. To ensure that the emergency and operational transmission remains operational after an event, voice/text message transmission is divided between narrow and wide bandwidth transmission infrastructure.

Efficient antenna designs use very long wires for through-the-earth, air-core or ferrite-rod loop antennas for guide-wire or natural waveguide, and monopole antennas for wide bandwidth transmission. An important design requirement is driven by the high-Q design requirement of magnetic dipole antennas.

Figure 9:
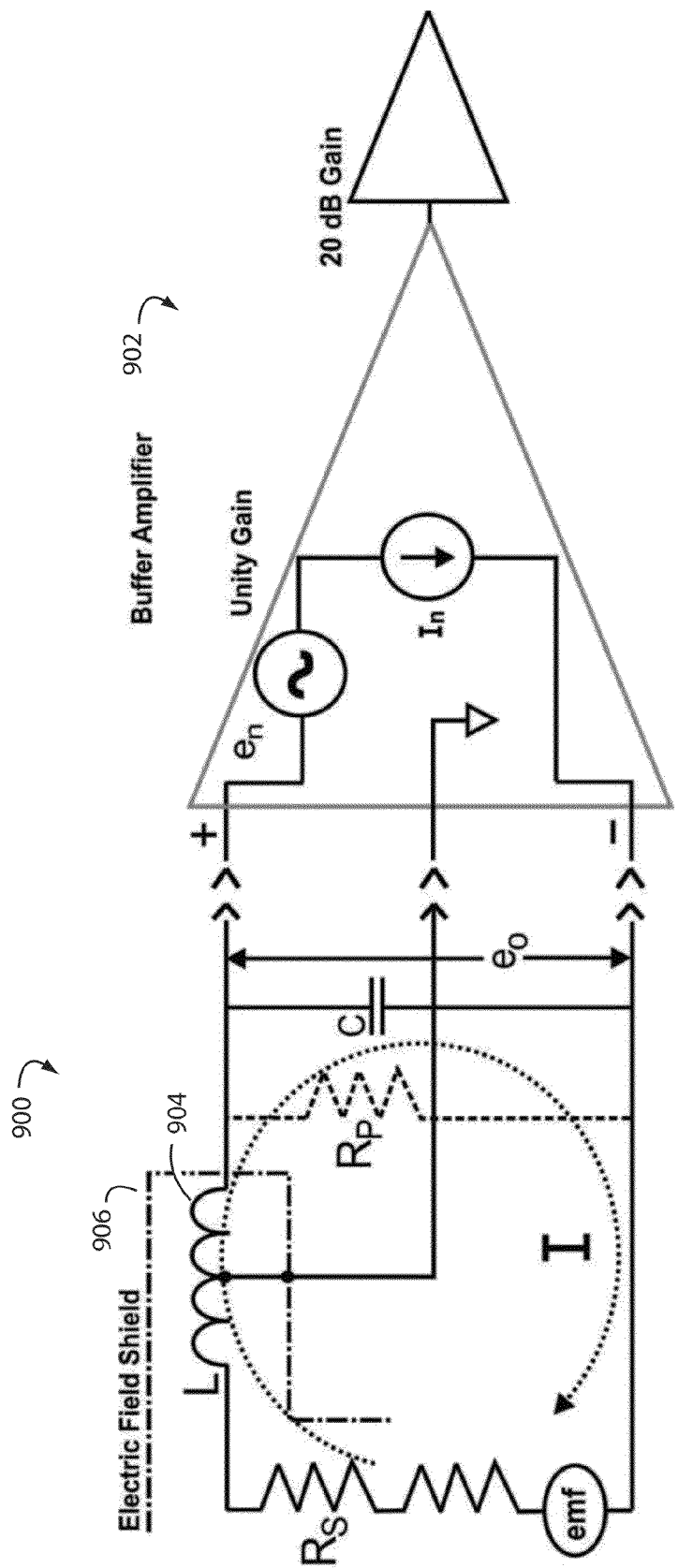
FIG. 9 is a schematic diagram representing a receiver antenna and first stage buffer amplifier.

FIG. 9 represents a receiver antenna 900 and first stage buffer amplifier 902. A ferrite rod antenna 904 includes an electric field shield 906 to significantly suppress electric field induced noise. The EM wave magnetic field component threading the area of the induction coil, consisting of N-number of turns, produces an electromotive force voltage (EMF) that can be mathematically represented by, $$\text{emf} = -N\frac{d\phi}{dt}, \quad (1\text{-}65)$$

where, $\phi=BA$ is the Magnetic Flux in Webbers;
B is the magnetic flux density in tesla (weber per square meter) and A is the effective area of the magnetic dipole antenna in square meters.
For a sinusoidal magnetic flux, the EMF voltage induced in the antenna can be mathematically represented by, $$\text{emf}=iN\omega(\mu_r A)\mu_o HB, \quad (1\text{-}66)$$

where,
N is the number of turns of the electrical conductor used in building the induction coil wound on the ferrite rod;
H is the magnetic field in amperes per meter; and
$\mu_r$ is the relative permeability of the ferrite rod antenna.
A ferrite rod with an initial permeability of 5,000 and a length/diameter ratio of 12 achieves a relative permeability of 120. The induced EMF increases with the number of turns (N) and first power operating frequency $\omega$, therefore, the transmission frequency used should be as high as possible to take advantage of $\omega$, but still low enough for the illuminating primary wave to encounter a low attenuation rate. The voltage also increases with the first power of effective area ($\mu_r A$) and magnetic field (H) of the illuminating EM wave. For a 1-inch-diameter ferrite rod, the area can be mathematically represented by, $$A=\pi(0.0127)^2=5.07\times10^{-4}\text{ square meters.} \quad (1\text{-}67)$$

and the effective area is 120 A=$6.04\times10^{-2}$ square meters. For a 30-inch diameter air-core loop, $$A=\pi(0.38)^2=0.456 \text{ square meters}$$

A software-defined radio (SDR) is a very high-speed, two-channel digital platform. A field-programmable, gated array (FPGA), digital signal processor (DSP), and microcontroller have been designed and built for interfacing with RF circuits, microphones, and speakers.

Mining complexes usually extend over large underground areas. Radio communications and tracking systems must be compatible with the expanding nature of the mining process and the maintenance difficulties encountered in the real mining environment. The maintenance problem is aggravated by the shortfall in training for mining technicians and engineers, who now require extensive training in safety and operational procedures.

The MINER Act addresses emergency communications and tracking of personnel entering underground mines. Because emergency conditions require quick mine-wide radio communications and tracking, the equipment must be extremely reliable and roaming miners must be trained in its operation. Unlike an atmospheric or office environment, the system must be self-healing, redundant, and failsafe both during and after an event. These characteristics are achieved through ruggedizing the design for the transmission networks operating in the natural and manmade waveguides and through temperature/vibration cycling as part of the production process. By using a self-healing transmission network design, explosion rockfalls and exceedingly high fire temperatures of severe incidents not disrupt the integrity of the communications network. Mining companies are unlikely to provide extreme reliability in maintaining separate emergency and operational systems. Therefore, an integrated emergency and operational system has considerable advantages. The advanced capabilities of the design are in stark contrast with early examples of communications and tracking technology. For the most part, current systems are a collection of commercial radio technologies developed for the terrestrial market needing leaky feeder or locating wired systems in different entries. The history of mine explosions and fires demonstrates the many technical shortfalls of today's commercial radio technology when applied in the underground mining environment.

Studies of past mine disasters have found that in wired mines telephone wire pairs either burned or were cut in two, preventing emergency communications between trapped miners and between the trapped miners and the surface. Information detailing the emergency conditions must be received in the first few minutes after an incident or the incident escalates out of control.

If the leaky feeder system exceeds the 0.25-millijoule energy level in sourcing power through the leaky feeder cable, the leaky feeder cable communications system cannot be used when ventilation is lost. Some environmental monitoring systems that source power through the monitoring cable must also be shut down if they exceed 0.25-millijoule energy limit. The PED system must be shut down when ventilation is lost.

Survivability of robust radio communications and tracking systems must be addressed. Rail lines, conveyor belt structures, water pipes, power cables, and steel cables are more likely to withstand a mine accident than a fragile VHF/UHF antenna structure, telephone wire pairs, leaky feeder cables, or small-gauge wires. These fragile transmission systems are likely to fail in an explosion or fire. Natural waveguides in the layered earth geologic model and developed infrastructure are likely to survive catastrophic events. The self-healing F1/F1 transmission network designed with the yellow CAT lifeline loop in every passageway enable the transmission network to survive. The working section power center (s) and refuse chamber (s) include very narrow bandwidth 2000 Hz transmission facility-tying the end of the emergency communication link to the surface and the EM-Gradiometer receiver. The power center and refuse chamber also include the narrow bandwidth yellow CAT LF transmission facility that includes F1/F1 repeaters. Even with a robust transmission network in place, such as RadCAT, control software must be self-organizing and self-healing if disruptions should occur. Currently designed mine-wide environmental monitoring systems cannot maintain operation in explosive conditions or when mine ventilation is shut down. A network can support environmental monitoring of methane and oxygen levels as well as tracking information.

The mining complex development includes multiple working faces and entries with cross cut and "stopping" to direct ventilation-fresh and return air flow. An event has trapped mine personnel near the working face. Each entry has an installed "yellow CAT" Life Line cable with at least two insulated copper conductors that supports the Hill/Wait "bifilar" mode of electromagnetic wave transmission. The yellow CAT cable with multi core fiber optic (FO) be installed in man and material entries. The yellow CAT-2 cable includes at least two insulated copper conductors. The conductors supply power to MSHA approved flame proof enclosure with intrinsically safe batteries. The changing current is only available in fresh air entries and shut off in an event.

The reflectors used in both primary and secondary escape ways are only reflective on one side. If the miner points the cap-lamp into the mine reflectors cannot be seen. If the cap-lamp is pointed out of the mine, the miner see blue reflectors in the intake airway (primary escape way), red reflectors in the return airway and green in the neutral air beltline.

systems use existing installed conductor waveguides in a typical mining complex as well as the natural waveguides represented by the layered earth comprising the overburden and the coal seam that is being mined. These waveguides allow the transmission of EM waves or radio signals over the distances required to accomplish effective tracking and communications under both emergency and operational conditions.

Robust conductor transmission waveguides are already installed as utilities in many, but not all, mine passageways in underground mines. Mine personnel caught in a mine fire commonly report having difficulty determining the correct way out, suggesting the need for a guide wire or cable with directional indicators to facilitate egress from smoke-filled mine entries (See, U.S. Pat. No. 5,146,611, issued Sep. 8, 1992).

In passageways without conductors in place, the yellow CAT lifeline multi-strand steel core cable can serve as a lifeline transmission waveguide. However, the yellow CAT lifeline cable includes at least two insulated conductors to enable Hill-Wait monofilar-mode and bifilar-mode signal transmission and recharging intrinsic batteries deployed in the transmission facility. Low-cost passive RFID tags provide location identification. Blue tags are intake airways with the blue side showing way-out. Red tags are return airway with the red side showing way-out. These tags replace the way-in (red)/way-out (blue) tags installed in all passageways in United States mining complexes, as required by MSHA.

RFID tags can be integrated into the design of the Yellow CAT lifeline. Each RFID tag is powered up by a periodic 130-kHz burst transmission from the cap-lamp transceiver. The RFID tag retransmission is received by the cap-lamp transceivers. First, a synthetic voice generated in the transceiver tells the roaming miner that he is heading out in, for example, $3^{rd}$ right at XC31. The time stamp, transceiver identification, and location are transmitted by the cap-lamp transceiver through the 200-kHz F1/F1 repeater bi-directional network for posting on the LCD included in the SACS, as well as any underground tracking LCDs.

The passive RFID tags are installed at 50-feet intervals in every entry in the mining complex. If RFID tags were located on each roaming miner and reader at specified locations, then multiple miners in moving vehicles could not be separately identified.

Electrically, the attenuation rate of the conductor/lifeline transmission waveguide is less than 1-dB/1,000 meters at 100-kHz. The attenuation rate increases to 3-dB/1,000 meter at 300-kHz, which can be compared with the attenuation rate of 21-dB/1,000-feet for leaky-feeder cable at 450 MHz and a requirement to station leaky feeder two-way amplifiers at intervals of 1,500-feet. Thus, the LF band conductor/lifeline attenuation rate can be as much as approximately 20 times less than the attenuation rate of the VHF/UHF-band leaky feeder cable. Previous deployment of mine-wide LF/MF wireless technology experimentally found that coupling to guide-wire waveguides was maximum in the 200- to 300-kHz frequency band. The LF/MF band attenuation rate of radio signal transmission in the natural seam-mode waveguide is less than 5-dB/100-feet in coal and less than 3-dB/100-feet in potash and trona seams. In metalliferous mines, the attenuation rate through host rock is often less than 16-dB/100-feet. The effective transmission or communication distance depends on the electrical conductivity of the natural medium.

From an emergency communications standpoint, enough of the robust conductor and seam-mode transmission waveguide structures are likely to survive the initial effects of most severe mine events to keep the network functioning. The 2000-Hz transmission infrastructure at the power center or refuse chamber closes the communications path to the surface. This statement is especially true when bi-directional (self-healing) transmission networks are employed. In such events, communications still would be possible with conductor/lifeline and seam waveguides LF band signal. The F1/F1 networks have an overlay of at least five operating digital-modulated frequency (FSK) carrier frequencies.

Because mines are in a constant state of development, the communications system needs to be constantly expanding. From an operations standpoint, the use of in-place and natural transmission waveguides would minimize installation and maintenance costs of an underground radio system. In the system, the F1/F1 repeater with 1.5 meter-diameter loop antennas provides a 2000-foot radius communications coverage area in by the last open crosscut. The F1/F1 repeater transceiver and battery is installed in a flame proof enclosure with an intrinsically safe battery, the coverage and radius exceed 2000-feet.

In a leaky feeder coaxial-cable radio system, the cable cost and installation can exceed $2.50/foot. Reliable repairs to coaxial cables are difficult to achieve in the damp and often dusty mine environment. Although the emergency, operational, and economic advantages of LF/MF radio systems were apparent in the earlier United States Bureau of Mines (USBM) and South African Chamber of Mines (SACM) LF/MF work, technological breakthroughs were required before a practical mine-wide radio system could be successfully installed and operated in an underground mine. Although the prior work experimentally demonstrated more than 3,000-feet of coal seam waveguide and 20,000-feet of conductor/lifeline waveguide distance in roadways with in-place conductors, mine-wide mobile-to-mobile communication was not possible in large multiple-passageway mining complexes. The problem was resolved by developing the yellow CAT lifeline (U.S. Pat. No. 5,146,611, issued Sep. 8, 1992), which is an affordable installation in all entries of small and large underground mines. The LF/MF mine-wide radio communication technology barrier was identified as a problem relating to the inability of repeaters to interact and efficiently couple radio signals between mobile radios and the in-place conductor-transmission-line and coal seam waveguides. Repeaters can extend the lateral transmission distance from the conductor/lifeline at least 100-feet.

A simple yellow CAT lifeline was introduced into underground mining in Utah Power and Light's Cottonwood and Deer Creek coal mines in the late 1980's. U.S. Pat. No. 5,146,611, issued Sep. 8, 1992, describes the method of building a Hill and Wait modal propagation into a lightweight mine emergency communications cable featuring multiple strong synthetic fibers, non-insulated conductors, and at least one insulated copper wire. Such cables have been installed in a number of United States and Australian coal mines.

In embodiments of the present invention, a conventional yellow CAT cable is modified to include a multi-strand steel cable with at least two insulated copper conductors to enable Hill-Wait monofilar and bifilar transmission modes. The two insulated copper conductors distribute power through fresh air entries to trickle charge intrinsically safe batteries protected by the MSHA-approved battery. (See, U.S. Pat. No. 5,301,082, issued Apr. 5, 1994). Three insulated conductors in the cable minimize stresses in the cable. The recharging current must be shut off when ventilation is disrupted. The yellow CAT cable be advanced in design to include multi core of fiber optics for wideband high speed data transmission. The cable design include specially designed connectors for rapid expansion of the mining complex.

A yellowCAT-2 life line cable design includes a reflective yellow jacket with way-out indicators. A fiber optic (FO) core is placed inside of a protective tube to illuminate strain on the fiber optic member. Each protective tube be color coded. The insulated copper conductors be identified with red and black insulation.

MSHA approved flame proof enclosures are used for all equipment required in the transmission facility. Cables designed for leaky feeder transmission have shields that support only the monofilar mode with very high attenuation rate, which is a factor of ten greater than the bifilar mode. The coupling from the transceiver is based on electric field induction of current in the monofilar transmission mode in the yellow CAT cable design. Because of impedance changes along the unshielded yellow CAT cable, reflections convert the monofilar mode to the bifilar mode with an exceedingly low attenuation rate. An MSHA-approved yellow plastic cover with Braille-type way-out indicators serve as the outer cover of the yellow CAT lifeline. The yellow CAT cable be installed through all entries without electrical conductors.

The yellow CAT life line includes at least two insulated copper conductor and multi-stand steel cable or Kevlar core strength member is with an MSHA-approved yellow cover. Fiber optic core is included in the yellow CAT-FO2 installed in man and material entries. The electromagnetic wave transmission distance along the yellow CAT cable can be determined from in-mine measurement. The transmit magnetic dipole coupling factor is 20-dB. From that point on the vertical axis, a linear line with slope equal to the bifilar attenuation rate of 0.001-dB/foot is typical. The radio receiver RFI, with the transmitter turned off, represents the RFI at that location in an underground mining complex (e.g., ~120-dB).

Figure 4:
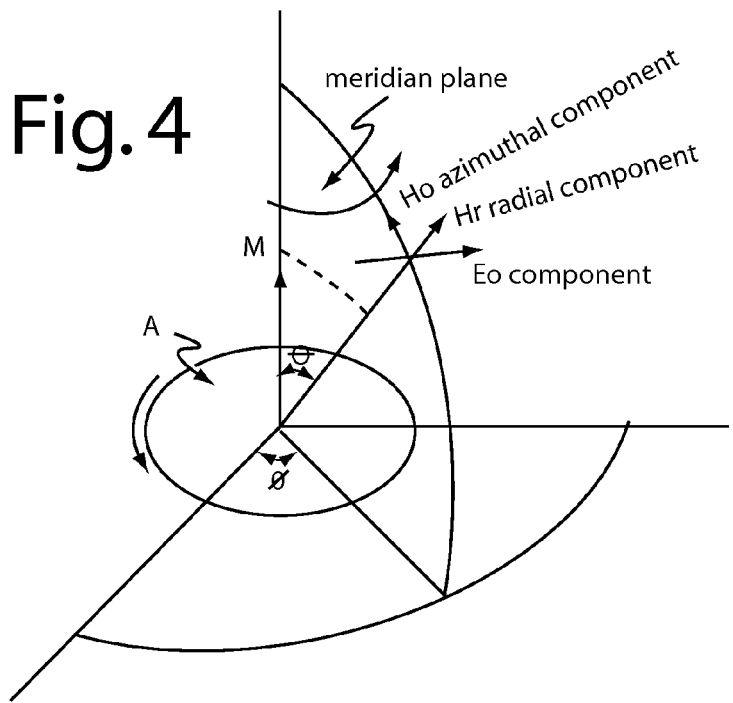
FIG. 4 is a three-dimensional (3D) graph representing the electric and magnetic field components radiating from an oscillating magnetic dipole.

The required destination signal-to-noise ratio for the transmission network is 40-dB. As indicated in FIG. 2-4, the transmission signal-to-noise ratio is achieved for transmission distances of less than 60,000-feet. For a destination signal to noise ratio of 40-dB, the transmission distance exceeds 60,000 ft at a carrier frequency in the low frequency band (30-300-kHz).

At each power center serving a working section, through-the-earth (2000 Hz), conductor/Life Line and face area CSW F1/F1 repeaters be integrated and moved with the power center. A through-the-earth waveguide repeater provides two-way (ULF-ultra low frequency-2,000 Hz) text message and voice transmission to the surface. A transceiver on the surface provides a return text and voice message link. With a transmitter on the surface, the text and voice messaging symbol rate is 80 bits per second (one symbol per second). The Conductor/Life Line Waveguide (CLLW) LF F1/F1 repeater provides work area coverage in the coal seam waveguide (CSW). The operating frequency is in the LF band (250, 275, and 300-kHz) for synthetic voice, voice, text messaging and tracking. Separate carrier frequency and F1/F1 repeaters are provided for supervisors networking, maintenance networking and tracking system. RFID tags can be integrated with the yellow CAT cable at 50-ft intervals.

Each roaming miner is equipped with a cap-lamp transceiver designed to communicate in all waveguides and initiate RFID tag location transmission.

Figure 13:
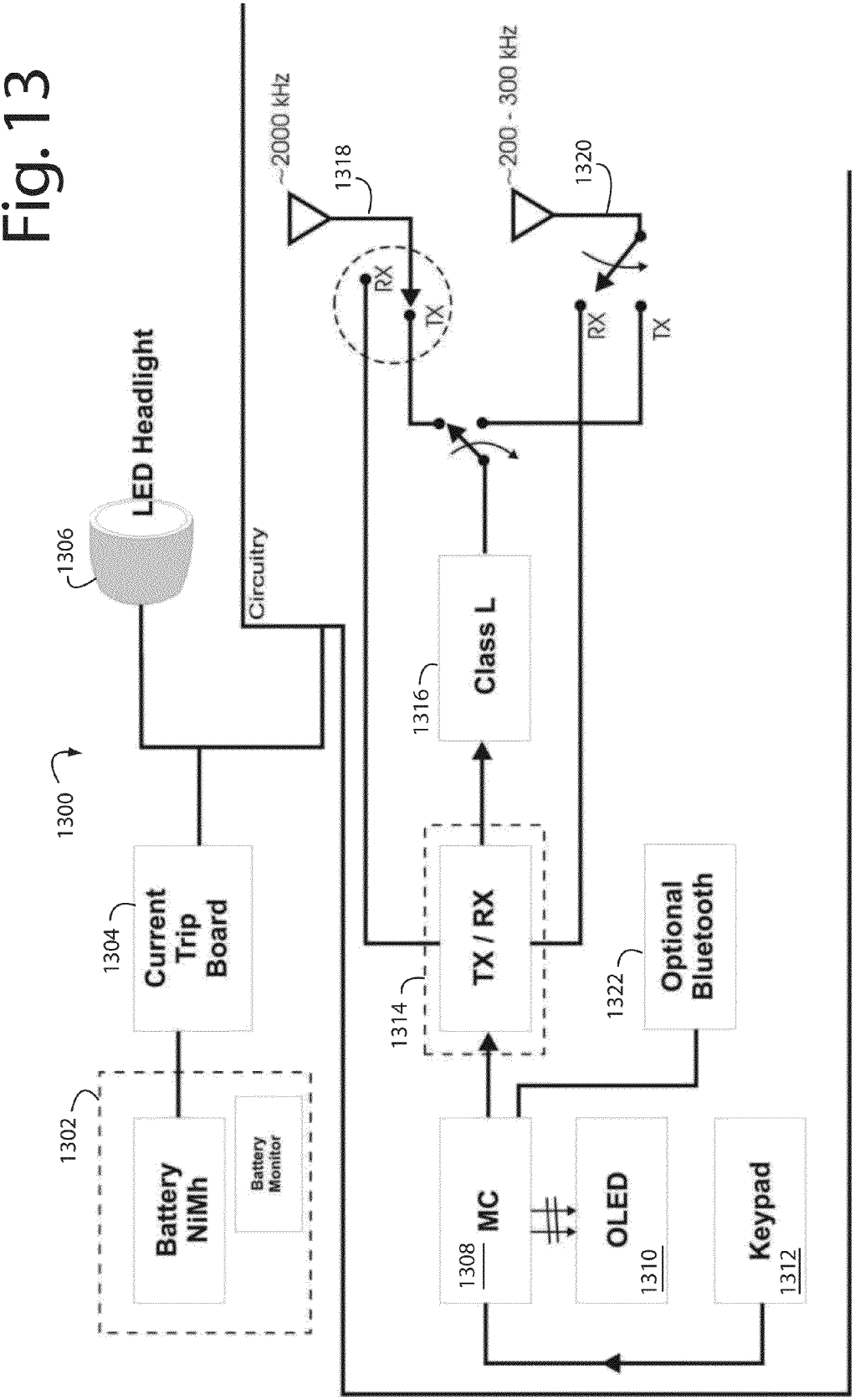
FIG. 13 is a functional block diagram of a cap-lamp transceiver embodiment of the present invention.

FIG. 13 represents a cap-lamp transceiver 1300 that provides two-way, simplex-half duplex digital transmission at the frequencies in the LF and VHF/UHF bands and includes operational links to a passive RFID tag tracking system. A battery 1302 is made intrinsically safe by a current limiting board 1304. These power an LED headlight 1306, a microcomputer (MC) 1308, an organic LED display 1310, and a keypad 1312. A software-defined and agile ULF-UHF radio transmitter/receiver 1314 drives a Class-L amplifier 1316 connected through T/R switches to a 2000-kHz antenna 1318 and a 200-300 kHz antenna 1320. A BLUETOOTH device 1322 provides connectivity with a PDA like a BLACKBERRY.

The through-the-earth emergency transmission is achieved via the 2000-kHz link from the cap-lamp to a ULF F1/F1 transceiver located at the power center or refuse chamber. The transceiver 1300, includes a text message display 1310 and a touch screen keyboard 1312 for text messaging and received message display. A Blackberry-type PDA can be interconnected to the cap-lamp transceiver and F1/F1 network through a Bluetooth communications link. The situation awareness computer system (SACS) graphical display can be updated to indicate location icons of mine assets and roaming miners updated on the PDA display.

A text messaging device would be built into a cap-lamp battery. A ULF and LF/MF-band digital SDT board are used. A typical cap-lamp battery 1302 is 10-ampere/hour nickel hydride, and the lamp 1306 uses light-emitting diode (LED) clusters. A microphone and speaker can be included to enable peer-to-peer voice communications.

In some embodiments, an analog VHF/UHF FM transceiver is integrated with the digital core to enable voice communications with leaky feeder cable transmission systems.

When transceiver 1300 is operating in its TTE transmission mode, a cap-lamp 200-kHz link to the power center or refuse chamber LF F1/F1 transceiver demodulates the text or voice message and couples the demodulated message to the 2000 Hz F1/F1 transceiver for transmission through the earth. The radiation term in Equation 1-13 predominates in deeper mines, which implies that the cap-lamp transceiver should be designed with a horizontal magnetic dipole (HMD) for transmission through CSW waveguide. However, for transmissions of LF signals into the Conductor Lifeline Waveguide (CLLW), a vertical magnetic dipole (VMD) should be used. Consequently, both a HMD and a VMD antenna must be incorporated into the transceiver. In addition, a HMD antenna must be used when using the transceiver to couple to the coal seam waveguide.

The MINER Act requires lifelines with directional indicators to be installed in all entries of an underground coal mine. A lifeline design can include a multiple-strand steel support cable core along with a small-diameter insulated copper wire. The wire ensemble be enclosed in an MSHA-approved thermal plastic yellow cover. The lifeline supports the Hill-Wait monofilar and bifilar modes of electromagnetic wave transmission along the yellow CAT lifeline.

Low-cost passive RFID tags can be used to replace the two-sided tags deployed in the mine entries. Each RFID tag is encoded, for example, with an entry designation (e.g., $3^{rd}$ left) and crosscut number (e.g., X41).

Transceivers automatically burst an LF 134-kHz transmission to power up RFID tag, evoking a location transmission to the nearby cap-lamp transceiver. The transceiver turns on and transmits the location and miner identification number through the 200-kHz F1/F1 network. Since the F1/F1 repeater network operates as a receiver at 200-kHz, the passive RFID tag transmission is suppressed by a filter in the 200-kHz F1/F1 repeaters and not assigned to the tracking network. Transceiver filters in the other network transceivers suppress tracking signal transmissions.

Mine fires create smoke that can blind miners trying to escape. When a miner with a transceiver passes a passive RFID tag location, a synthetic voice speaks out, "you are headed out, $3^{rd}$ left at crosscut 30", which is the actual miner's current location. By command from the surface, the synthetic voice may give alternative escapeway information.

For example, in the Wilberg Coal Mine fire, the only escaping miner went through a neutral air beltline return to escape from the longwall face. If the trapped miners could have received this information, they would not have died waiting for the call that could not be transmitted over the burned down cable in the longwall man and material entry.

Table 2-1 summarizes the EM characteristics of TTE tracking or communication transmission links.

TABLE 2-1

Summary of the EM Characteristics of a Through-the-Earth Tracking or Communications Link.

Layered strata cause a vertical waveguide to form.
  Electrical conductivity (σ) increases with frequency.
  Attenuation rate through overburden depends on electrical conductivity.
  The upward traveling EM wave from the tracking beacon, 2000 Hz F1/F1 repeater, or cap-lamp transceiver has EM components described by Equations 1-27 through 1-29.
    For surface depths greater than the skin depth given by Equation 1-56, the radiation term $\left(\frac{1}{kr}\right)$ predominates, which means that the surface EM signal is larger for the transmitter ferrite rod deployed as a horizontal magnetic dipole (HMD). The skin depth is 50.3 m at 2-kHz for σ = 0.05 s/m and a relative dielectric constant $\epsilon_r$ = 10. The wavelength is 316 m and the loss tangent is $4.5 \times 10^4$. The overburden impedance is 0.56 ohms.
    The index of refraction is $n = \frac{c}{v} = 470$.
      The air-surface interface reflects most of the EM wave back into the overburden soil. At 1,000-kHz, only about 3% of the EM wave is transmitted through the interface.
      The reflection loss and attenuation for typical overburden soils is such that the total attenuation is estimated to be approximately 86-dB at 2000 Hz.
      The surface radio frequency interference (RFI) spectrum is such that the noise is essentially plane waves that can be rejected by measuring gradient fields on the surface.

TABLE 2-1-continued

Summary of the EM Characteristics of a Through-the-Earth Tracking or Communications Link.

The surface signal measurement detection sensitivity is given in Equation 1-24. The detection depth of signals transmitter from the tracking beacon or cap-lamp transceiver with a magnetic moment of 4 can be estimated from table 1-6 and 1-7.
    Enclosing the antenna and 2000 Hz F1/F1 repeater transceiver in an MSHA approved flame proof enclosure with a trickle charged intrinsically safe battery enables the magnetic moment (M) to be increased by at least 40-dB.

Polarized magnetic field lines pass through the ferrite rod magnetic dipoles. The field lines lie on the surface of an expanded torus, representing radiation. The companion electric fields are horizontally polarized and encircle the ferrite rod. The horizontal electric field on the ferrite rod induces strong currents in the conductor component located on the rib of the entry. Wenker current is induced in conductors located on the roof of the entry. Fewer dead spots occur along man and material entries. The transceiver transmits an EM wave electrical field component (E) in the LF/MF band that induces (couples) a current signal in the yellow CAT cable. The induction current (I) flow that is mathematically given by, $$I = \frac{2\pi E}{i\omega\mu\ln(ka)}, \qquad (2\text{-}1)$$

where,
  $\omega = 2\pi f$ and f is the frequency in hertz of the primary EM wave,
  $\mu = \mu_o \mu_r$ is the magnetic permeability of the surrounding rock mass, $\mu_o = 4\pi \times 10^{-7}$ farads per meter and $\mu_r = 1$ in most natural media,
  $k = \beta - i\alpha$ is the wave propagation constant where $\beta$ is the phase constant and $\beta$ is the attenuation rate, and
  a = the radius of the conductor in meters.

The induction current (I) decreases with the first power of frequency ($\omega$) and the first power of the electric field component (E).

As the current flows along the yellow CAT cable, a radiating magnetic field component (H) is generated, which couples F1/F1 signals to the transceivers, is mathematically given by, $$H \approx \frac{I}{2}\left(\frac{ik}{2\pi r}\right)^{1/2} e^{-ikr}, \qquad (2\text{-}2)$$

where r is the radial distance to the measuring point.

Increasing the cable radius (a) decreases the induced current (I). The radiating magnetic field spreading factor is dependent on the square root of distance (r) from the cable. The square root of r spreading is important when considering coverage in the mine entry. The coverage area is approximately 100-feet from the yellow CAT cable at the repeater location decreasing to 100-feet at a distance of 2,000-feet from the repeater. At greater distances, the coverage area is at least the entry width. At 100-kHz, the attenuation rate along the yellow CAT cable is only 1-dB per 1,000-feet, approximately 20 times less attenuation rate than a leaky feeder cable.

One option to maximize receiver detection sensitivity is to minimize the instantaneous bandwidth (BW) of all system receivers. The option of increasing transmit power is restricted in view of the MSHA intrinsic safety regulation and approval procedures. The specified 10-MHz bandwidth of leaky feeder receivers causes the detection sensitivity to be 30-dB worse than the system receivers. Leaky feeder or monitoring systems that supply power throughout the cable system are not safe and must be de-energized when ventilation is shut down. The design requirements for modern land and satellite transmission networks are wideband, violating the fundamental laws of radio geophysics governing transmission through slightly conducting media. Although the radio communications and tracking system design is predominantly controlled by radio geophysics considerations, the design is also critically dependent on standard communications theory.

Through the years, modulation processes have been developed to increase the information transmission rate, initially using an analog process. In recent years, digital processes predominate design requirements. Digital modulation processes advanced with the development of coding theory, requiring protocols to enable synchronization and interface with other networks and equipment. Digital transmission networks are extremely wideband to enable synchronization and service subscriber's data transmission.

Leaky feeder transmission systems are being installed in United States mines as a first step in complying with the MINER Act of 2006. Over 180 systems eventually be installed. Installing a leaky feeder mine-wide radio system in all entries of the mining complex is economically infeasible to justify. The economic justification for installing these systems in men and material entries can be made, but not in escape ways, return entries, and barricade or rescue tents when miners are in emergency situations. Today's advanced mining equipment is being designed for monitoring and automated control systems. The speed of operation in some cases exceeds the physical capabilities of a mine operator. A wideband transmission facility be achieved with leaky feeder or fiber optics. The system design merges narrow and wide bandwidth technology capable of digital, coded voice and data transmission, including a VHF/UHF-capable transceiver to interface with an existing leaky feeder network.

Batteries used in underground coal mines for use in emergency conditions must be intrinsically safe and not capable of supplying more than 0.25 millijoule of energy when the battery terminals are shorted together. This requires an MSHA-approved current trip printed wiring board, see U.S. Pat. No. 5,301,052, issued Apr. 5, 1994.

The electronic design world has changed with the advent of the digital telecommunications networks and cell phones. Today engineering designs are based on field-programmable gate arrays (FPGA) interconnected to microcontrollers and gigabit memory. The design must be reprogrammable with in-application programming (IAP). This have is built into the design of the software-definable transceiver (SDT) employed throughout the transceivers.

Each of the SDT transceivers in the transceiver cap-lamp battery and F1/F1 repeaters is a mesh network component. The F1/F1 repeaters serve as Access Points (nodes) within the network and the cap-lamp transceivers connect through the Access Points. The Bluetooth protocol is used within the transceivers to communicate with other devices used in the remote control equipment and environmental monitoring at designated points in the coal mine.

Figure 10:
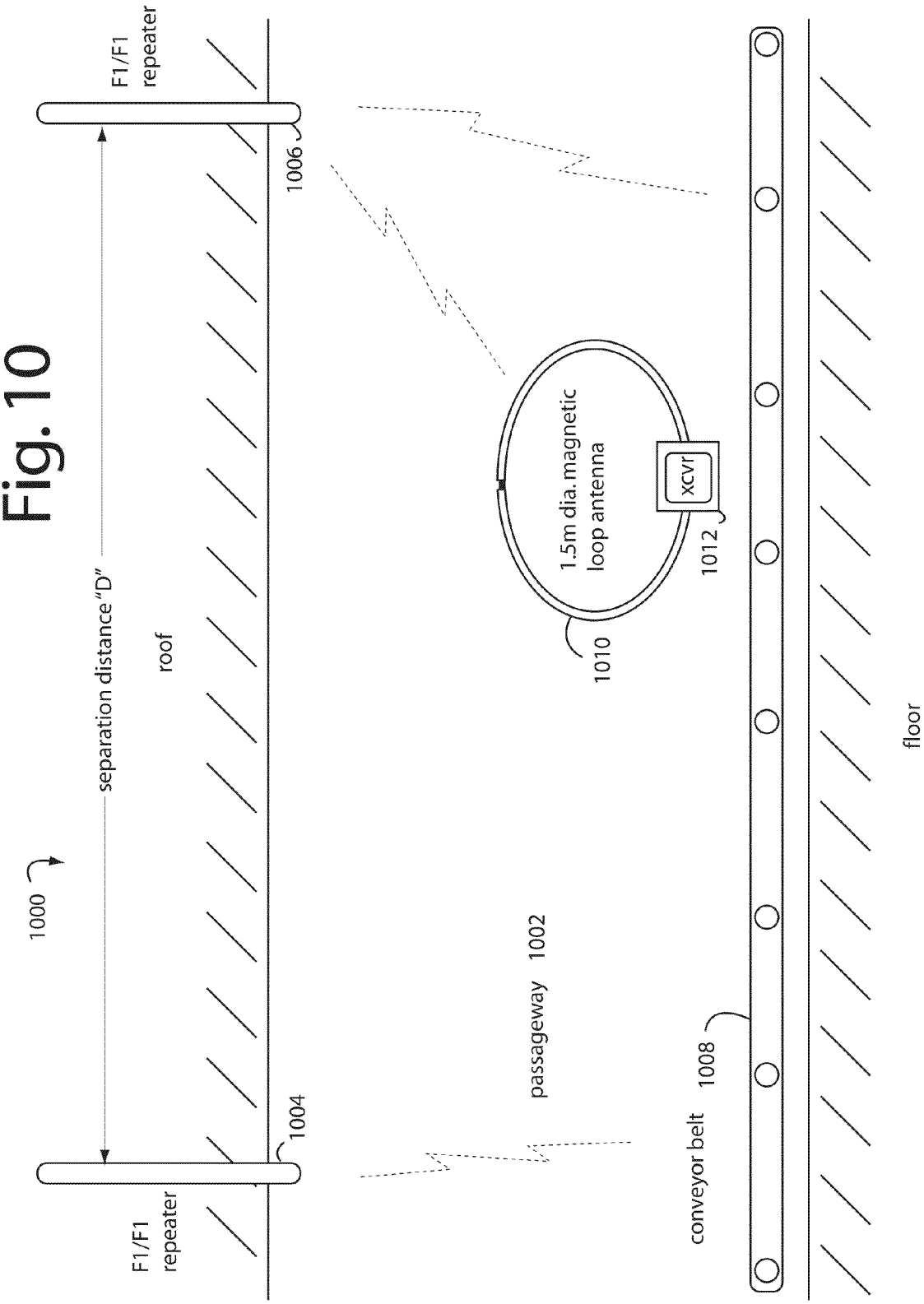
FIG. 10 is a side view cutaway diagram representing a mine with a passageway and F1/F1 repeaters mounted in the ceilings.

FIG. 10 represents a mine 1000 with a passageway 1002 and F1/F1 repeaters 1004 and 1006 mounted in the ceilings. The F1/F1 repeaters 1004 and 1006 operate in the LF (30-300 kHz) band, and carry the network transmission messages for the system network. They are separated by a distance (D). Multiple F1/F1 networks can be overlaid in an underground mine. The F1/F1 repeater housings are cylindrical and holes can easily be drilled into the roof rock for them. MSHA approved flame proof enclosures enable operation following an event.

The F1/F1 repeater transmitters generate EM waves with an electric field component $\in_\phi$, that illuminates, e.g., a conveyor belt structure 1008. An electrical current induces too in any other existing conductors, e.g., yellow CAT lifeline, nearby steel cables, three-phase power cables, leaky feeder cable, telephone lines, etc. The induced current flow creates a secondary EM field with the magnetic component H shown in FIG. 10. Either a cap-lamp transceiver or another F1/F1 repeater can receives the message (see Equation 1-41) at nodes in the mesh network. In many situations, the nodes are distributed along the guide wire waveguide. A 1.5 meter diameter magnetic loop antenna 1010 and transceiver 1012 in protective sheathings and enclosures are shown for example.

The maximum separation distance (D) between repeaters shown in FIG. 10 can be derived theoretically. Alternatively, a few measured data acquired in a conductor-less underground passageway can be used to determine the important system parameters. The transmitter coupling to the transmission waveguide is dependent on transmitter magnetic moment (M) as $20 \log_{10} M$. The attenuation rate through the waveguide is determined by the slope of a graphically constructed line. The RFI noise for the waveguide is measured by the system receiver. Then, the spreading factor for the waveguide can be applied to the data.

The separation distance (D) can be determined from a graphical construction. The distance (D) is reduced because of insertion losses at belt transfer points and power centers. This loss lowers the constructed linear line by the loss decibel amount. Each power center adds attenuation to the network.

In entries without electrical conductors, a yellow CAT lifeline guide-wire waveguide can be installed by draping it from hooks in the walls or ceilings. The conductor/lifeline waveguide is constructed by hanging a yellow CAT cable from roof bolt hangers. A disposable yellow CAT cable typically weighs 26 pounds/1,000-feet. Such cable has a very low-attenuation-rate for the Hill-Wait bifilar mode of guide-wire waveguide EM wave propagation.

A lifeline guide wire includes at least two insulated copper conductor and a multi-strand steel cable or Kevlar core with an MSHA-approved yellow cover. If it is ever accidentally cut, the yellow CAT cable can be simply reconnected to restore the waveguide. Each yellow CAT cable can be inductively coupled to a power cable or conveyor belt, for example, by continuing the cable for at least 150-feet along a three-phase power cable. No contact connection to any other cable is required, and the coupling loss is 8-dB. Installing a companion repeater on the surface, can establish an emergency transmission through-the-earth link.

Through-the-earth (TTE) communications of over 900-feet was demonstrated at Consol Energy's Leverage Coal Mine. Using a 2,000-Hz F1/F1 repeater and a surface EM-Gradiometer, a simulated trapped miner was located using a grid search procedure. The 2,000-Hz F1/F1 repeater provides TTE text messaging.

The development of coal mine entries is followed by the movement of the power center to just toward the mine entrance (outby) the last open crosscut. The working face is close enough to the F1/F1 repeater located at the power center to provide high-quality emergency and operational radio coverage in the working area. From this location, the F1/F1 repeater batteries can be trickle charged. When ventilation is shut down, the F1/F1 repeater remains operational using power from an MSHA approved intrinsically safe battery.

The strength of a resonant magnetic dipole radiating fields depends on the magnetic moment, which rapidly increases with the square of its radius. A factor of one hundred (e.g., 40-dB) increase can be achieved with a large-diameter resonant loop antenna located with the power center. The loop antenna and 2000-Hz F1/F1 repeater can be detached from the power center as miners retreat to the tent in a rescue location. By transmitting at 2000 Hz, the cap-lamp transceiver can communicate text messages through the 2000-Hz F1/F1 repeater to the surface.

The F1/F1 transceiver includes an in-application programmable (IAP) software-definable transceiver (SDT) design to enable remote reprogramming of the frequency synthesizer for generation and super heterodyne reception of the narrow-band radio frequency signals. Reprogramming is achieved with a personal data assistant (PDA). The repeater's transmitter and receiver operate with the same carrier frequency. Any carrier frequency in the LF band can be used for any of the F1/F1 overlay mesh networks. The F1/F1 operational capability enables each transceiver to receive and decode the digital signal and, with a time-delay, retransmit of the received signal. A significant advantage of an F1/F1 repeater is the requirement of only a single antenna, eliminating the need for four antennas at each repeater site as was necessary in the original UPL mine-wide wireless network.

The transmit magnetic moment (M) is not restricted because coil conductors, resonating capacitors, digital core (SDT) electronics and intrinsically safe batteries are completely enclosed in a flame proof enclosure. The batteries are trickle charged through MSHA approved packing gland.

In coal mine communications, mine-wide coverage requires propagation through natural media (e.g., sedimentary rock or coal. Natural waveguides exist in layered deposits and the infrastructure of an underground mining complex, including: Ionosphere-earth waveguide; Through-the-earth waveguide (TTEW); Conductor/lifeline waveguide (CLLW); Coal seam waveguide (CSW), and Tunnel waveguide (UHF/fiber optics).

Mining and roof falls release methane, so radio communications and tracking equipment must be intrinsically safe and designed to meet RFI emissions regulations.

Cap-lamp transceivers must operate within the 0.25-millijoule explosive methane limit, as defined by Underwriters Laboratory Publication 913. Using much higher magnetic moments requires flame proof enclosures for the radiating magnetic dipole antenna structure.

Magnetic dipole antennas exhibit imaginary near-field impedance and electric dipoles exhibit real impedance. Energy is stored in the near-field field of a magnetic dipole and dissipated in the case of an electric dipole. The stored energy in the near field of the magnetic dipoles is available radiation into the natural media.

Signal coupling to the conductor/lifeline waveguide (CLLW) is by the electric field component of the electromagnetic wave radiating from the magnetic dipole antenna. A roaming miner requires a vertical magnetic dipole integrated inside the cap-lamp transceiver to efficiently couple to the CLLW. A horizontal magnetic dipole efficiently couples to the CSW waveguide.

The signal coupling from the conductor/lifeline waveguide to a receiving vertical magnetic dipole is effectuated by the magnetic field component of a radiating electromagnetic wave radiating from the conductor/lifeline waveguide.

Narrow bandwidth (BW) operation is a requirement in emergency communications and tracking systems. The magnitude of the electric and magnetic field components of the electromagnetic wave radiating from a magnetic dipole are directly proportional to the magnetic moment (M) vectors given by, $$M = NIA \text{ ampere turn per square meter,} \quad (3\text{-}1)$$

where N=number of turns of wire used in building the antenna,
I=circulating current in amperes at resonance, and
A=the area vector normal to the loop with a magnitude equal to the loop area in square meters.

At resonance, the EMF induced in the receiving magnetic dipole antenna is multiplied by $Q_{CKT}$. The equivalent resistance in series with the coil is multiplied by $Q^2$. If placed across a parallel resonant magnetic dipole equivalent circuit. Resonant magnetic dipoles circulating current is the product of induced current and the quality factor (Q) given by, $$Q_{CKT} = \frac{f_o}{BW}, \quad (3\text{-}2)$$

where $f_o$ is the resonant frequency in Hertz.

Using the definition of Q and the peak energy stored in the magnetic dipole, the magnetic moment is dependent on bandwidth as $$M = \sqrt{\left(\frac{\ell A}{\pi \mu}\right) \frac{P_d}{BW}}, \quad (3\text{-}3)$$

where $P_d$ is the power dissipated (applied) in the magnetic dipole and BW is the 3-dB bandwidth of the antenna circuit.

To maximize the magnetic moment, the bandwidth must be minimized.

Cap-lamp transmit or amplifier power has to be limited for intrinsic safety considerations. Thus the only option left to increase the communication distance is to increase receiver detection sensitivity. The receiver sensitivity for 20-dB 10-dB signal-to-noise ratio is, $$S^{20} = -166.8 + 10 \log_{10} BW + 10 \log_{10} NF \text{ dBm} \quad (3\text{-}4)$$

where $10 \log_{10} NF$ is near 1.5.

The bandwidth must be minimized and not maximized as is the goal of modern-day communications technology.

The MINER Act of 2006 requires a lifeline in escapeways. In the bifilar mode, EM wave propagation losses along a two-conductor guide-wave waveguide are only 1-dB per 1,000 meters. So a lifeline built with a multi-strand steel core and insulated copper wire can provide lost-cost distributed antenna to miners on the move in every entry. The lifeline is easy to extend into developing entries. If broken, it can be easily reconnected.

Fox hunter antennas are compound electric and resonant magnetic dipoles that can double coverage in the work face area, compared to a single magnetic dipole. Operational communications require wideband transmission. Narrow and wide bandwidth transmission can be supported by integrating fiber optic cable in the yellow CAT life line installed in man and material entries.

In general, the signal transmission distance through natural media such as coal and sedimentary rock is severely limited. Linking natural and mining complex infrastructure waveguides together for digital data transmission requires the integration of both narrow and wide bandwidth transceivers in a network. These waveguides can be exploited to extend the otherwise limited communications range. Even though each waveguide individually has its own distance limitations. For example, radio frequency interference (RFI) limits the intelligible communications distance in each waveguide, which is, in general, an inverse function of the radio interference frequency. Because mine disasters commonly disrupt the fresh air-flow system, a properly designed radio communications and tracking transceiver must be designed and certified by MSHA to be intrinsically safe to remain operational when ventilation is disrupted. The entire design must be intrinsically safe or system components enclosed in an MSHA approved flame proof enclosure. The transmitting antenna must be designed with intrinsically safe magnetic moment.

A system installed in a coal mine can operate in five natural and redundant electromagnetic (EM) wave transmission modes and frequency bands: Ionosphere-earth waveguide (RF bands); Through-the-earth (TTE) waveguide (ULF band); Conductor/lifeline guide-wire waveguide (LF band); Coal seam waveguide (LF band); and, Passageway leaky feeder EM fiber optic waveguide (VHF/UHF bands band). Switching among ULF, LF, VHF, and UHF bands is what requires the use of a software defined radio (SDR) and a field programmable gate array (FPGA).

Since the digital data bit rates are limited by the carrier frequency band, the data rates are a few Hertz per second in the ULF band, and rise to a few kilohertz per second in the LF and MF bands. The bit rate in fiber optics transmission can, of course, be gigabits per second.

systems must comply with United States Mine Safety and Health Administration (MSHA) regulations, and other provisions like the MINER Act. These dictate intrinsically safe operation and other requirements.

Figure 11:
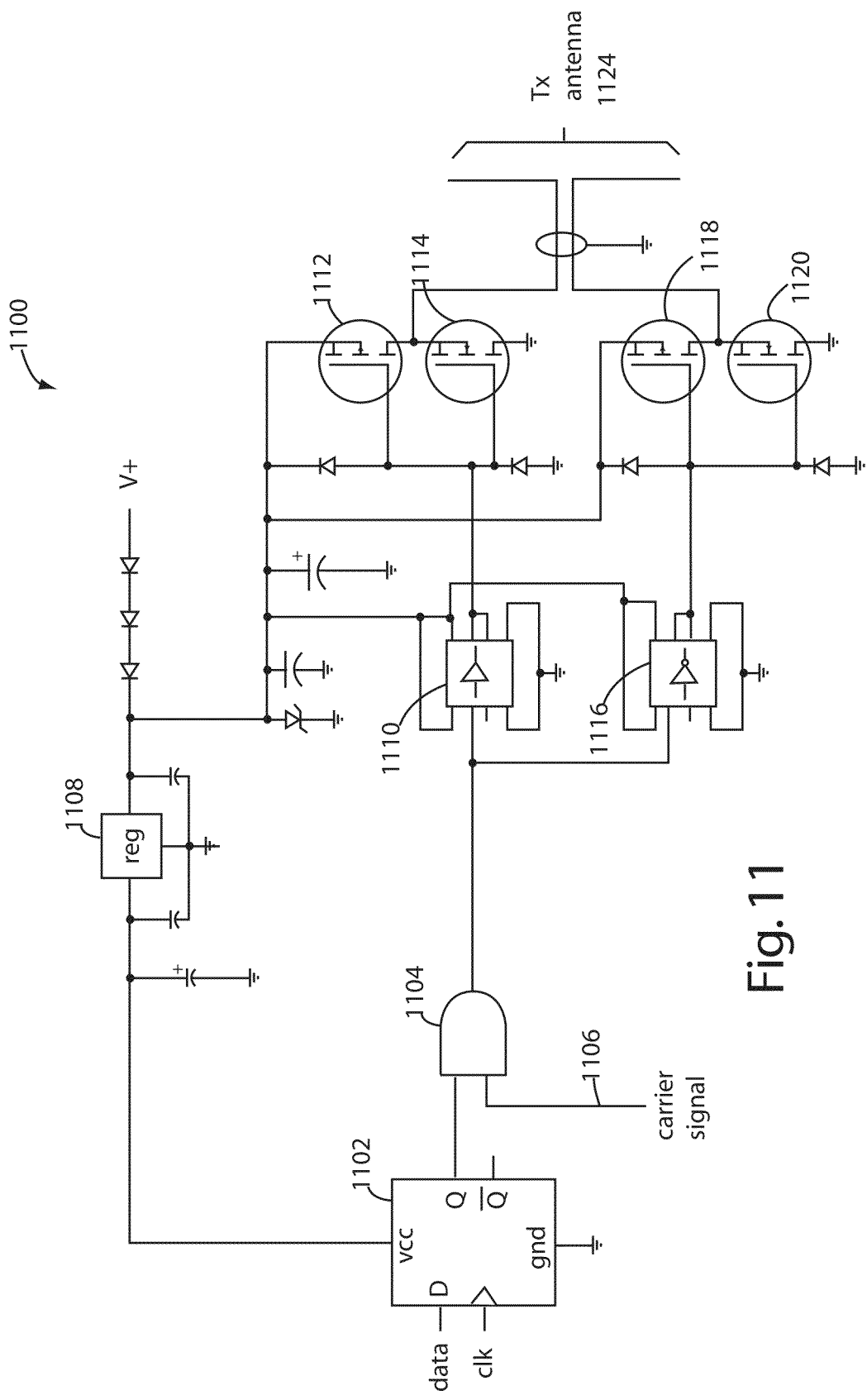
FIG. 11 is a schematic diagram of a Stolar Class-L power output amplifier.

In FIG. 11, a Class-L power output amplifier 1100 comprises a balanced radio power output that differentially drives a dipole antenna or other balanced load. One half of the differential power output drives one side of the antenna from ground to the maximum positive rail, while the other half of the differential power output drives the opposite side of the antenna from the maximum positive rail to the ground. The result is a voltage swing across the antenna twice that which would occur if a single-ended output were driving an unbalanced load. Because the power output is the square of the voltage divided by the load impedance, four times the power can be output to the antenna.

Class-L amplifier 1100 has a D-type flip-flop 1102 that accepts data input modulation and clocks, a logic AND-gate 1104 for gating through a radio carrier input 1106 according to the modulation, and a three-terminal voltage regulator 1108 that provides operating power to the digital logic. A MOSFET-driver 1110 drives a totem-pole arrangement of two power MOSFET's 1112 and 1114. An inverting MOSFET-driver 1116 drives another totem-pole arrangement of two power MOSFET's 1118 and 1120. Taken altogether, the MOSFET-drivers and the four MOSFET's implement a digital, differential drive radio power output. A balanced transmission line 1122 connects the output to an antenna 1124.

In one implementation that worked well, the MOSFET-driver 1110 was a Maxim Integrated Products (Sunnyvale, Calif.) MAX4420CSA, the inverting MOSFET-driver 1116 was a MAX4429CSA, the MOSFET's 1112 and 1118 were International Rectifier (El Segundo, Calif.) IRF9540N HEXFET Power MOSFET's, and the MOSFET's 1114 and 1120 were IFR640 HEXFET Power MOSFET's.

In many applications, the V+ power rail will be directly connected to a battery, e.g., 6-volts or 112-volts. The differential output drive of amplifier 1100 results in twice the voltage swing at antenna 1124 than would otherwise be possible with a single-ended output. The power output is therefore increased as the square of the voltage, divided by the load impedance. On one-half of each carrier cycle, the top dipole part of the antenna will be V+ relative to the bottom dipole part. On the next one-half of the carrier cycle, the top dipole part of the antenna will be −(V+) relative to the bottom dipole part. The peak-to-peak swing is therefore 2*(V+).

Figure 12:
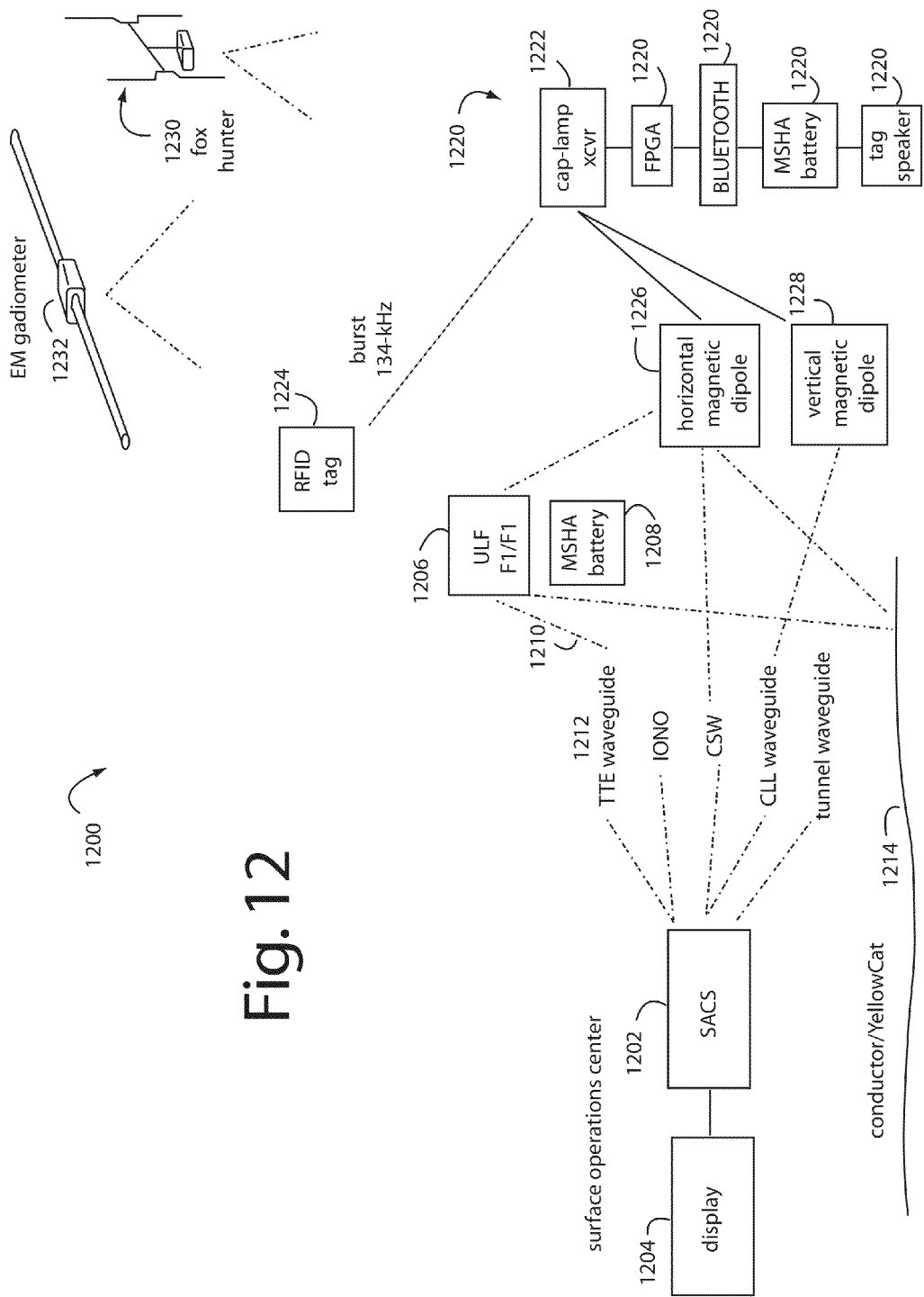
FIG. 12 is functional block diagram of an underground radio communications and personnel tracking system embodiment of the present invention.

FIG. 12 represents a system 1200 to provide communications and tracking capabilities in a highly redundant, self-healing, and reliable manner. Each system 1200 includes a situation awareness computer system (SACS) 1202 with a graphical display 1204, flame proof F1/F1 repeater transceivers 1206 with MSHA approved intrinsically safe batteries 1208 for narrow bandwidth transmission 1210 in the through-the-earth 1212 and conductor/yellow CAT wave guide 1214. The F1/F1 repeater transceivers 1206 provides bidirectional redundant paths from the end of a development entry power center or a rescue center to the surface.

A multi-network cap-lamp 1220 includes a multi-mode transceiver 1222 for voice, synthetic voice, and text messaging for roaming miners and mine rescue teams and communications with passive RFID tags. Passive RFID tags 1224 are placed in all the mine entries. A high-power class-L radio frequency amplifier drives resonant magnetic dipole antennas 1226 and 1228. A directional fox hunter antenna 1230 for use by mine rescue teams can be used to determine the location of miners wearing cap-lamp 1210 when trapped within a mining complex. High power magnetic dipole antenna flame proof enclosures are used with a wireless bi-directional, self-healing, mesh network constructed with F1/F1 repeaters 1206.

A typical mine will be equipped with conveyor belt, power cables, rails, and yellow CAT lifelines that are serendipitously employed in the leaky feeder tunnel waveguide modes. Yellow CAT lifeline cable 1214 further includes a wideband fiber optic transmission network. A multi-functional personal data assistant (PDA) 1232 has a MSHA approved flame proof enclosure and intrinsically safe battery with IEEE 802.115 electronics for fiber optic termination. A EM-Gradiometer 1242 is used on the surface, or flown over the surface, to take measurements that can be used to zero-in on the underground location of trapped miners below.

The tracking or locating of miners roaming or barricaded in a very large underground mining complex requires intrinsically safe hardware that can be safely used in an operating coal mine. In the system 1200, tracking and determining the location of miners on the move is implemented within the physically redundant distributed antenna and distribution facility of the conductor wave guide.

Each cap-lamp transceiver 1222 can transmit coded two-way text messages through the conductor waveguide to a through the earth (TTE) Transceiver repeater (MF to ULF band) the to an EM-Gradiometer 1232 deployed on the surface.

Passive RFID tags 1224 are periodically installed (with a separation distance equal to the required tracking resolution) in all entries to provide location, identification, and time stamp data for cap-lamp transceiver 1222 via distributed antenna and transmission networks of conductor waveguide and F1/F1 repeaters 1206.

A gas monitor with a text messaging display and keyboard and voice transceiver can be stored with emergency supplies.

F1/F1 repeaters 1206 include O-rings in 1.661-inch-outside-dimension stainless steel tubes, allowing the repeaters to withstand 5,000-feet of immersion into NQ (76-mm size) boreholes. The ferrite rod antennas are sealed in fiberglass tubes with the same immersion capability.

Another system used to locate trapped miners for use during in-mine rescue operations is a so-called Fox Hunter Antenna 1230 carried by the rescue team. This device is a directional antenna designed to produce maximum response when pointed at a trapped miner's beaconing cap-lamp transceiver 1314. The "fox hunter" antenna 1230 equipped with a transceiver would also be capable of two-way text and voice messaging with trapped miners.

The "fox hunter" antenna is constructed with a horizontal magnetic dipole (HMD) and a vertical electric dipole (VED). The antenna can be carried by the mine rescue team to determine the direction to the trapped miner. The "fox hunter" antenna technology is incorporated into the system as one of the tracking and communication modes.

Multiple F1/F1 transmission networks are preferably frequency overlaid (because of the software definable transceiver) and installed as a mining complex is developed. The transmission network utilizes F1/F1 repeaters 1206 as a assortment of Access Points to construct a wireless network. Each time a radio transmission from a miner on the move with a beacon or cap-lamp transceiver 1222 accesses a nearby F1/F1 repeater 1206, a corresponding location ID is attached to a message sent to the SACS 1202 in the surface operations center. Each time a miner on the move passes by an RFID tag 1224, more tracking information is sent to the SACS 12302. Computer-generated information, an EM-Gradiometer 1232, or an fox hunter antenna 1230 can then be used to pinpoint every miner's location.

The digital transceiver employs a multiple access collision avoidance layer to prevent simultaneously transmissions from multiple transmitters.

In one embodiment of an underground dithered transmission system, the F1/F1 repeaters 1206 operate in the LF (30-300-kHz) band with mulitiple carrier frequencies using 4FSK modulation with the network transmission packet. The F1/F1 repeaters 1206 are packaged in long, thin cylindrical housings and can easily be inserted into holes drilled into the roof rock. Explosion proof enclosures may also be used to for the F1/F1 repeater transceivers. The associated F1/F1 repeater transceiver are protected in MSHA approved flame proof enclosures. The magnetic dipole antennas are designed with IS magnetic moment.

Vocoder processing enables the generation of a very narrow band voice signal, which allows resonant magnetic dipole antennas to develop IS magnetic moment while conserving transit power.

Each miner on the move with a two-way wearable cap-lamp transceiver sends and receives digital vocoder voice, data and text messages.

F1/F1 repeater transceivers are placed throughout the mine without restrictions on their layout except that every part of the mine must be covered by at least one relay transceiver. That way, every miner on the move will always be within reach of a relay transceiver. Each relay transceiver must also be in contact with at least one other F1/F1 repeater relay transceiver, making a fully inter-connected network.

The network can be self-organizing as long as the network is connected by sending each message through each relay transceiver exactly once. For example, in network parlance, this condition is known as "flooding" or "routing by flooding". This ensures that every message is propagated to every area of the mine including the portal. The network does not oscillate from looping messages because each F1/F1 repeater relay transceiver propagates each message only once.

To prevent two relay transceivers near each other from becoming jammed, a random back-off time delay between receiving and transmitting (e.g., dithering) and carrier sense multiple access (CSMA) are incorporated. In this way, if two relay transceivers within range of each other receive a message at the same time, one transceiver start to resend the message first and that relay transceiver continue until the message is complete without being jammed by the second relay transceiver. If some F1/F1 repeater relay transceivers are not within range of each other, simultaneous messages can be relayed by both, which provides some frequency reuse and increases the capacity somewhat.

Figure 14:
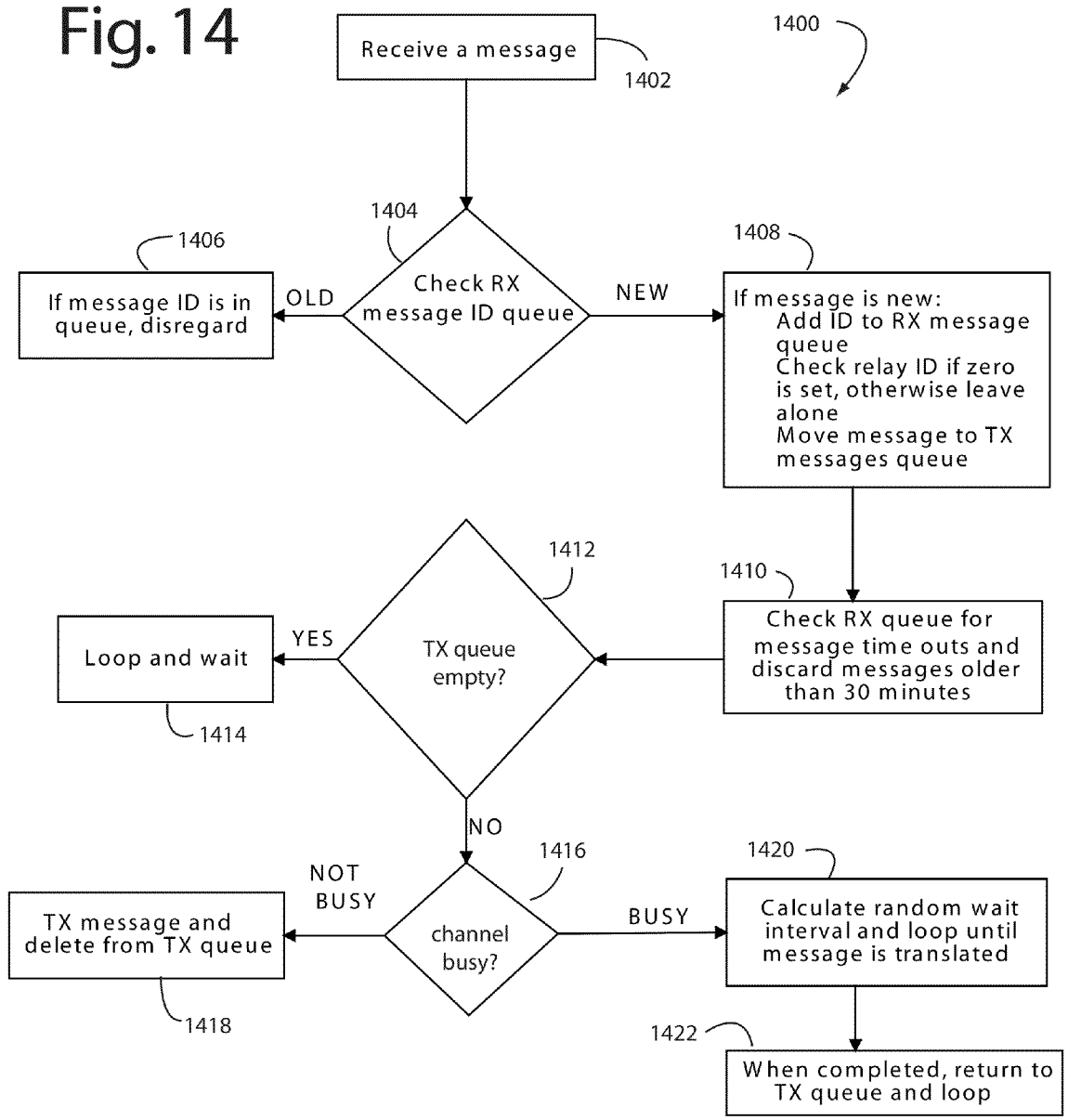
FIG. 14 is a flowchart diagram of an F1/F1 repeater method embodiment of the present invention.

FIG. 14 represents a relay message processing method 1400 for the F1/F1 repeaters. When a message is received in a step 1402, a step 1404 checks to see if the message ID is in the receiver queue. If so, the message is old and have already been relayed, it can be disregarded in a step 1406. Otherwise, it's a new message not seen before, and a step 1408 adds the ID to the queue, and relays it to the transmitter. A step 1410 discards messages older than 30-minutes. A step 1412 checks the transmitter queue. If empty, a step loops and waits. Otherwise, a step 1416 sees if the F1-channel is busy. If not busy, a step 1418 transmits the message and deletes it from the transmit queue. Otherwise, if busy, a step 1420 calculates a random wait to try again later. A step 1422 transmits the message after the random wait.

The proper design of a F1/F1 repeater network with multiple relay transceivers is an engineering challenge. Networks can flood when packet forwarding by the router from node to node is too inefficient. So the network capacity must be adequate for the task at hand. Maximizing the bit rates can avoid this potential limitation. Network simulators can be used during the network design phase analyze and optimized the capacity. In large mines, many relays are needed, so the messaging delays can be very substantial. Sub-networks using flooding could be employed, with the sub-networks connected via gateways or bridges to increase capacity and reduce delay.

For good face area coverage, the power center toward the mine entrance (outby) and the last open crosscut is the preferred location, e.g., for a MSHA approved flame proof F1/F1 repeater transceiver with a 1.5 meter diameter loop antenna. At this location, a horizontal magnetic dipole loop antenna and F1/F1 repeater transceiver move with the power center. The F1/F1 repeater transceiver antenna provide two-way voice and data communications throughout the face area. The F1/F1 repeater transceiver intrinsically safe battery be trickle charged from the power center.

F1/F1 transmission networks add message delays and latencies that double when passing through each repeater onto a destination. The digital bit rate, or effective bandwidth, is cut in half by each repeater. The effective bit rate (EBR) at destination is mathematically represented by, $$BER = \frac{\text{encoding bit rate}}{2^n}$$

where, n is the number of repeaters along the transmission path to destination.

The relatively low attenuation rate of Yellow CAT conductor/Life Line waveguides (1-3-dB per km at 200-kHz) sets the transmission distance between F1/F1 repeater transceivers to something in excess of 60,000 ft (11.4 miles), where destination S/N>40-dB. In contrast, electric power line transmissions of LF line carrier signals are routinely used to control and monitor substations more than one hundred miles distant.

Pace or refuse chamber communications require one F1/F1 repeater cutting the affected bit rate to 2400 bits per second. Transceiver embodiments can further include two-way Bluetooth RF modems to communicate with a hand-held personal digital assistants (PDA). The PDA's transmit foreman's reports to the surface operations center, display the mine map with locations of miners and mine assets updated through the 200-kHz tracking F1/F1 network, and reprogramming of the transceivers. The mine map loaded into the PDA can be updated at the surface through the SACS. F1/F1 repeater transceivers include self-diagnostic monitoring and control software algorithms designed to download from and to a field-programmable, gate array (FPGA), digital signal processor (DSP), PDA, and microcontroller. A Bluetooth RF modem two-way data link enables each PDA to set up the F1/F1 repeater control parameters, determine operational status, and log stored data. The PDA also be useful in training maintenance personnel and troubleshooting the system.

The MINER Act requires that a secure communications link be established with MSHA headquarters and MSHA-specified locations to comply with the 15-minute advisory of an incident. In order to ensure operation of this communications link following an event, surface wireless communications may need to be squelched during the incident. For example, personal cell phones operating in the near the portal region during the Sago search and rescue time period were the source of much confusion.

The F1/F1 repeater and cap-lamp battery transceivers include Bluetooth ports enabling remote monitoring sensors to easily interface with repeaters and cap-lamp battery transceivers. The technology can be used to remotely control devices in the mine. The monitoring data appear on the graphical display employed in the SACS installed in the surface operations center.

In alternative embodiments, a tracking beacon or transceiver can be attached to a self-contained self-rescuer (SCSR) and stashed in a refuse for a trapped miner. A surface transceiver is used for two-way communication. Mine rescue teams would be able to use the directional fox hunter antenna to locate and communicate with the trapped miners.

The system, comprising a wireless tracking system and a wireless two-way communications system, is designed for used in mine emergencies. If the system fails during an emergency, the consequences could be dire. Therefore, the system must be tested at regular intervals to ensure proper functioning. Self-checking software in the transceiver FPGAs interface with the surface computer so that locations of failure be documented at the surface network computer. An operator's manual accompanying each system include a test procedure to be followed to ensure that the equipment continues to perform properly.

A yellow CAT lifeline with a multi-strand steel wire or Kevlar core and at least two parallel insulated copper wire support monofilar and bifilar coupling and transmission in the entries without installed an electronic conductive rails or conveyor belts or power cables. Going left to right across the audit entries 1, 2, 3, 6, 7, and 8, yellow cat lifelines be installed through each of these entries to the developing face. The yellow CAT-FO2 be installed in the man and material (conveyor belt) entries. Alternatively, the yellow CAT lifeline could be looped around the pillars between entries 2 and 3 as well as entries 7 and 8. Yellow CAT cable can be branched into the first development entries. The F1/F1 repeaters are installed in 2-inch diameter roof boreholes. Some F1/F1 repeaters are moved with the power centers when they move. The F1/F1 repeaters at each power center have large-diameter resonant loop antennas mounted on ribs and stopping walls. They are detachable from the repeaters mounted on the power center. Such repeaters are advanced with the developing face. The repeaters enable overlay of a distributed mesh networks: tracking all-call (paging) and gas monitoring communication (200-khz); supervisor-to-supervisor voice (225-khz); maintenance-to-maintenance voice (250-khz); environmental monitoring (275-khz); and VHF/UHF leaky feeder on fiber optics.

The cap-lamp software-definable transceiver (SDT) 1314 (FIG. 13) provides voice and data communication with each of the (LF/MF) conductor/Life Line, through the earth at 2000 Hz, coal seam waveguides, and the UHF leaky feeder voice and wide band fiber optic (FO) infrastructure. Yellow CAT-FO2 life line cable 1214 (FIG. 12) supports: Hill-Wait bifilar transmission modes and the fiber optics are used for wide bandwidth optical transmission; low-frequency induction mode communication using an installed conveyor rail as power distribution cable and yellow CAT lifeline waveguide; low-frequency coal seam mode communication through the coal seam (2,000-feet); ultra low frequency (ULF) through-the-earth two-way text messaging with EM-Gradiometer; and, tracking using passive RFID tags 1224 and the SACS 1202 (FIG. 12).

Environmental monitoring sensors, health sensors, and PDAs (e.g., Blackberries) can communicate with F1/F1 repeaters and cap-lamp transceivers via Bluetooth transmissions. The SACS 1202 enable real-time tracking of mine personnel and vehicles tagged by special icons on the graphics display 1204. The surface operations center include a secure Internet voice and data link to MSHA head-quarters and the regional office.

The working faces are provided with radio service using tuned-loop antennas operating at 200-kHz, 225-kHz, and 250-kHz. These antennas are typically mounted with F1/F1 repeaters on the outby power center. The mine's development power center be equipped the same way.

In emergencies, the cap-lamp transceiver communicates text messages (80 Hz bit rate) by transmission with the 2,000-Hz resonant loop antenna and F1/F1 repeater. The F1/F1 repeater provides a redundant transmission link through the earth to the surface EM-Gradiometer. After each power center move, a communications check confirm operational readiness. The emergency communications system can be taken with the face crew when they depart to the rescue tent. The emergency and operations system can be permanently installed at the rescue location.

Designated rescue stations be equipped with additional tracking LCDs and multi-network transceivers. A surface EM-Gradiometer and through-the-earth 500-Hz repeaters be provided to the mine.

A radio communications and tracking system cap-lamp transceiver integrates a software-definable transceiver (SDT), Class L transmitters, a VHF/UHF analog FM transceiver, intrinsically safe battery pack, a light-emitting diode (LED) lamp, a detachable touchscreen/speaker/microphone, a Bluetooth port, and a text messaging display and quadrature array of two resonant magnetic dipole antennas. A wideband UHF antenna enables analog to leaky feeder cable and fiber optic node bi-directional communications. All subsystems when interconnected and functional create intrinsically safe or flame proof device.

Each cap-lamp transceiver provides two-way text messaging in through-the-earth transmission with the text messaging capability included in all waveguide transmission and fiber optic cable nodes. Some cap-lamp transceivers use frequency shift key (FSK) modulation in all waveguide transmissions. Analog FM modulated enables communication with leaky feeder cable.

The cap-lamp transceiver periodically illuminates the local passive radio frequency identification (RFID) tag. The RFID tag return signal is received and processed to determine a corresponding location in the mining complex.

The cap-lamp transceiver initiates dithered transmission of location, time stamp, cap-lamp identification, and travel direction on the tracking frequency (200-kHz). Location transmission terminates with an F1/F1 repeater receipt confirmation.

Cap-lamp transceivers' typical operating frequencies are: RFID tag, 134.2-kHz; Tracking/all call (paging)/monitoring and through-the-earth via ULF transceiver, 200-kHz; Supervisor, 225-kHz; Maintenance, 250-kHz; Environmental monitoring, 275-kHz VHF/UHF; and leaky feeder FO node.

Yellow-covered cable supporting the Hill-Wait monofilar and bifilar modes of transmission are fabricated with a multistrand steel cable or Kevlar multiple strands of stainless steal core and at least two 16-gauge insulated copper conductor wire. The cable includes multicore fiber optics. These cables are for installation in man and material entries of mines. The cable design includes molded way-out Braille indicators with passive RFID tags. The yellow cover is reflective, and the stainless steel strands enable the cable to be tied in a knot to restore transmission.

The cable is installed at mid height of the rib in all entries so as to construct a closed loop. Each pair of parallel entries forms a separate closed loop. The extreme ends of the loop are electrically connected together to form a mesh bi-directional transmission network.

The radiating vertical magnetic dipole (VMD) in the caplamp battery enclosure creates a horizontally polarized electric field component that induces monofilar current flow in the installed conductor/lifeline cable. The orientation of the radiating VMD induces much lower current in the roof electrical conductors. Few dead spots will thus occur when traveling in the mine entries.

F1/F1 repeaters integrate software-definable transceiver (SDT), Class L transceiver, intrinsically safe battery pack, Bluetooth port and magnetic dipole antenna. The repeater intrinsically safe battery is trickle charged from the mine section power center and two insulated copper conductors in the Lifeline cable. A ventilation failure and loss of mine power automatically switches each F1/F1 repeater to internal intrinsically safe battery, e.g., with at least a 40-hour, 10/90 endurance capability.

The F1/F1 repeater requires only a single magnetic dipole, which is an advantage over conventional F2/F1 repeater designs that require two operational antennas to provide local area coverage, and more over F2/F1/F4/F3 repeaters that require four separate antennas to provide chain repeater coverage.

A cylindrical enclosure for each F1/F1 repeater is inserted into a two inch diameter vertical roof borehole. The configuration hardens the repeater against catastrophic events. The VMD antenna of the F1/F1 repeater generates horizontal electric field components to efficiently couple to the conductor/lifeline waveguide.

The 2000 Hz F1/F1 repeater and magnetic dipole antenna enclosed in a flame proof enclosure. The magnetic dipole is enclosed by a MSHA approved hydraulic hose that forms an electric shield for the loop antenna. The ends of the loop antenna enter the flame proof enclosure through MSHA approved packing gland. The 2000 Hz F1/F1 repeater flame proof antenna is deployed as a vertical magnetic dipole (horizontal plane) for mine entries less than one skin depth deep. The flame proof antenna is deployed as a horizontal magnetic dipole for overburden depths greater than a skin depth.

The 2000 Hz F1/F1 repeater transceiver provides bidirectional through-the-earth waveguide transmission between the end of a development entry power center or refuse chamber and the surface. Establishes redundant bi-directional transmission link to the surface. Emergency and operational readiness is assured by transmission of tracking, all-call paging and gas monitoring to a 200-kHz mine-wide transmission facility.

A number of radio geophysics considerations affect the performance of any through-the-Earth (TTE) emergency mine communications system. These factors must be taken into account in the basic design of an operational TTE system.

The surface detection of an electromagnetic (EM) signal coming from a trapped miner transmitter and radiating antenna must be of sufficient signal-to-noise ratio to be a factor of four, 12-dB, greater than the magnitude of the surface radio frequency interference (RFI) signal induced in the receiving antenna on the surface. Surface RFI noise arrives at the receiver location by traveling in the ionosphere-Earth waveguide from the location of distant lightning discharges. The surface RFI also includes electric power transmission line unbalanced ground harmonics and other sources of surface current induced energy emissions. Magnetic field RFI spectral density plots of measured data illustrate that the minimum value of such plane wave front EM noise signals occur in a narrow bandwidth around a frequency of 2,000 Hz. For TTE operating frequencies outside of this narrow bandwidth, the noise level increases by several orders of magnitude. Moreover, if the receiving magnetic dipole antenna design does not include an electrostatic shield, the RFI noise level increases by a factor of 10,000, or 80-dB. Even when operating the TTE communication system at 2,000 Hz, the RFI, depending on the overburden depth, is still many factors of ten greater than the EM wave magnetic field component arriving at the Earth's surface from trapped miners.

The EM waves traveling through the stratified material overlying a trapped miner are reflected back into the overlying strata by the impedance contrast of air and the natural overburden media. The transmission loss through the interface reduces the EM field components from a trapped miner by at least a factor of ten, or 20-dB.

At an operating frequency of 2,000 Hz, the attenuation rate of the EM signal is 0.05-dB per foot in typical overlying natural media. Thus, the total attenuation through 2,000-feet of overburden reduces the signal by a factor of 100,000, or 100-dB. The TTE system link budget through 2,000-feet of overburden is attenuated by a factor of $1\times10^6$, or 120-dB. This factor is further increased by RFI noise and the multiplication of the instantaneous noise bandwidth of the receiver.

Any TTE system design approach that attempts to solve the problem by maximizing the radiating antenna magnetic moment faces formidable problems of a very large antenna surface area requirement and very high transmit power levels. A common approach to this problem is overpowering the transmitter antenna. However, this scheme is impractical because overcoming a 10-dB loss requires an increase in transmitter power received by a factor of ten, which quickly becomes impractical in a mine environment. Alternatively, a feasible solution to dealing with the extraordinary high pass transmission loss factor is found in state-of-the-art receiver design, which can be achieved through a gradiometric receiver design.

Electromagnetic gradiometer receivers use co-polarized magnetic dipole antennas to overcome the impacts of surface RFI, surface interface reflections, and natural attenuation of EM signals traveling through the Earth.

The RFI generated during a lightning discharge at a distinct location travels in the ionosphere-Earth waveguide and arrives at the mine site with electric and magnetic field components lying in a vertical plane. Because the electric field component is vertically polarized, an electric charge builds up on the air surface of the Earth interface. This charge buildup causes a smaller horizontal electric field component to lie on the Earth's surface. The horizontally polarized magnetic field of the main lightning strike emission also lies in a vertical plane with the vertical electric field component. The RFI noise ground wave is a quasi-transverse electromagnetic (quasi-TEM) wave. The Poynting vector of the horizontal components is downward directed into the soil and accounts for lightning strike energy attenuation (e.g., absorption) along the radial path from the lightning discharge location to the mine site. The horizontal magnetic field component that is co-polarized with the EM gradiometer resonant magnetic dipole antennas produces equal and opposing polarized electromotive force signals as, $emf_T = emf_1 - emf_2 = 0$.

The horizontal components of the plane wavefront are cancelled by the differential action of the co-polarized EM gradiometer antenna array. The radiating electric and magnetic field components from a magnetic dipole buried in the stratified Earth exhibit a spherical spreading wavefront. The wavefront crossing the surface interface undergoes refraction and reflection phenomena with a non-uniform wavefront magnetic field component intersecting the area vector of each co-polarized resonant magnetic dipole where $emf_1 \neq emf_2$. A Taylor series expansion of the detection problem shows that the distance from the trapped miner is mathematically related to the peak-to-peak separation distance of the gradiometer magnitude response along track over a trapped miner. A 180° phase shift occurs directly over a trapped miner. The communications between a trapped miner and the surface is conducted at one of the peak response points. The EM gradiometer RFI cancellation factor has been measured at 70-dB. Thus, introduction of a gradiometric receiver design reduces the transmitter requirements of the transmitter by many orders of magnitude.

The basic design of the transmitter and antenna of the two-way, TTE emergency communication system is shown in FIG. 3. The transmitters will be located in the existing refuge chambers throughout the mine. In the event that any trapped miners would need to leave a refuge chamber, the transmitter is hand carried for reasonable distances.

A two-way, TTE emergency communication system operates on an alphanumeric text messaging protocol. Messages can be either in the form of brief text or in the form of predetermined coded alerts or instructions. The basic system is extendable to operate with synthetic voice, which is an attractive feature for operation in dusty or smoky conditions.

Figure 15:
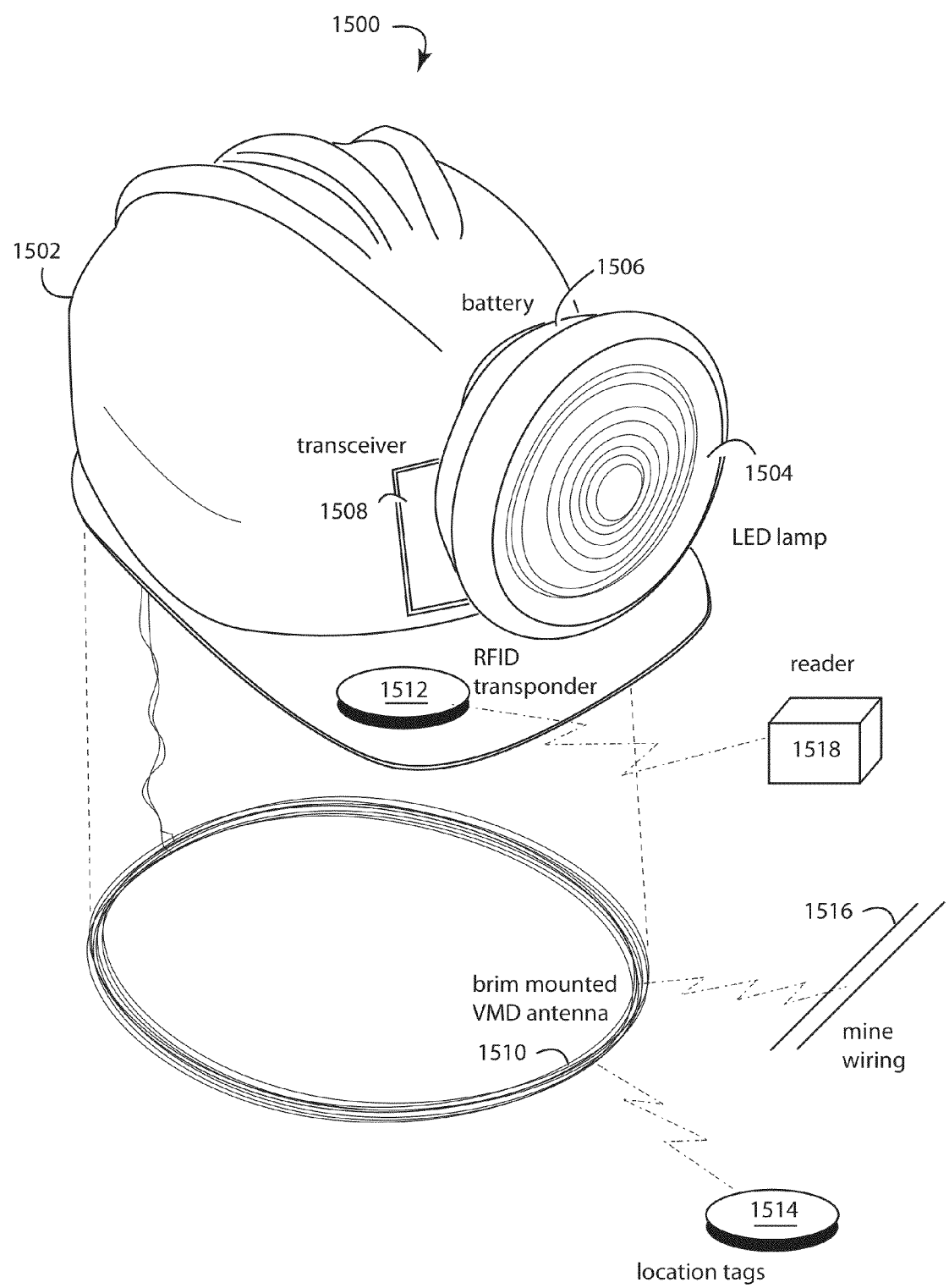
FIG. 15 is a perspective view diagram of a cap-lamp embodiment of the present invention in which a radio transceiver, brim mounted VMD antenna, and a disk transponder are added to an otherwise conventional safety hat.

FIG. 15 represents a cap-lamp 1500 in an embodiment of the present invention. Cap-lamp 1500 comprises a hard plastic shell 1502 to which are mounted an LED lamp 1504, and a rechargeable battery 1506. A radio transceiver 1508 provides two-way voice, data, and SMS text communication through a brim-mounted, air-core vertical magnetic dipole (VMD) antenna 1510. A passive RFID disk transponder 1512 provides electronic, wireless identification of the registered miner wearing the cap-lamp. Passive RFID disk transponders 1514 are stationed at fixed, surveyed locations throughout a mine. E.g., every 200-feet along the conductor waveguide 1516. Their burst transmissions are encoded with location information that can be read-in through the VMD antenna 1510 and transceiver 1508. Such information is interpreted to inform the miner wearing the cap-lamp where they are in the mine. If any conductor waveguide or mine wiring 1516 is nearby, or another type of virtual waveguide is possible, the VMD antenna 1510 and transceiver 1508 can establish a radio link for voice and/or digital packet communication with the surface operations centers. Peer-to-peer communications are also possible. A transponder reader 1518 permits queries of passive RFID disk transponder 1512 so miners that pass by can be automatically identified and transparently logged in.

The transceiver 1508 is configured to periodically burst a radio wave to power-up and then listen to a reply from nearby passive RFID tags 1514) integrated with lifeline waveguides. The periodic bursts are detectable by Fox Hunter direction finding antennas that can be used by rescue teams to locate downed and trapped miners.

The RFID disk transponders 1512 and 1514 can be implemented with Texas Instruments devices, RI-TRP-R9UR or RI-TRP-W9UR 85 mm disk transponders operating at 134.2 kHz with FSK modulation. The typical operating range of these particular devices is 1.5 meters.

A field-programmable gate array (FPGA) included in a cap-lamp can be used to execute signal processing software, e.g., to support an extensive library of synthetic voice and text messages. An embedded Bluetooth protocol provides 2.4 GHz communications between external devices. Additional transceiver inputs would allow a miner's health to be monitored in real time. A Bluetooth link enables PDA transmission of a foreman's report, including production data and maintenance advisories, to the cap-lamp, e.g., through a CLLW 225-kHz F1/F1 repeater network to the mine operations center. The cap-lamp transceiver effectively merges the emergency and operational communications systems.

Communications redundancy is realized by placing conductor waveguides in each mine entry and distributing F1/F1 repeaters overhead in roof drill holes. The conductor waveguide transforms into a distributed antenna and transmission facility when it's operated in the low end of the MF band. Escaping miners with cap-lamp battery MF transceivers are able to communicate with voice and text messages from anywhere in the underground mining complex. TTE transceivers in explosion proof enclosures are difficult to move, but these transceivers move easily. Waveguides need only be installed on one side of the entry to avoid null zones in the radio coverage. The passive ID tags can be installed at roof spades (surveyed locations markers) and power up transmitting the 134.2 kHz back to the cap-lamp when a cap-lamp transceiver beacon bursts every few minutes. A TTE repeater at the working face closes the loop with surface radios.

A phased array of magnetic dipole antennas each built with quality factors of less than unity will dissipate more energy per cycle than can be stored. Without the present invention, the maximum intrinsically safe magnetic moment is near 600-ampere turn meter square, and not enough to be useful for depths of more than 1500 feet. An equation and a table of Maximum IS magnetic moments are provided above. Moments of more than 1500 are needed to communicate through 2,000 feet of overburden. The table shows that a conventional IS VMD antenna could achieve 600 ATMS but would be difficult to deploy in a mine. A higher IS magnetic moment can be achieve with more practical loop diameters by configuring a stack of small circumference loop antennas, each with a circuit-Q of less than one. These should be driven phase coherently for a linear superposition of field magnitudes. Circuit-Q is peak energy stored per energy dissipated per cycle. That means that when circuit-Q is less than one. Unity, the loop inductance stored energy is more than dissipated on each resonance cycle. If the inductor wire were cut, there would be no emission of the stored energy. Hence the released energy will be zero instead of 0.25 millijoule.

The brim VMD antenna 1510 periodically bursts a 134.2 kHz transmission to "read" and power up the location passive RFID tag 1514. The transceiver 1508 combines an FPGA, microprocessor and DSP to read the 134.2 kHz transmission. The miner's ID is appended and a digital packet is assembled for transmission to operations centers, e.g., via MF radio link.

Although the present invention has been described in terms of the presently preferred embodiments, it is to be understood that the disclosure is not to be interpreted as limiting. Various alterations and modifications no doubt become apparent to those skilled in the art after having read the above disclosure. Accordingly, it is intended that the appended claims be interpreted as covering all alterations and modifications as fall within the "true" spirit and scope of the invention.

What is claimed is:

1. A cap-lamp and communications support system, comprising:
   a hard plastic miner's helmet shell (1502) with a brim, on which are directly mounted a light emitting diode (LED) lamp (1504) and a rechargeable battery (1506);
   a software definable radio transceiver (1508) mounted to the hard plastic miner's helmet shell and powered by the rechargeable battery, and configured for text messaging, voice communication, and passive radio frequency identification (RFID) tracking with RFID tags installed at regular intervals in a mine;
   an air-core vertical magnetic dipole (VMD) antenna (1510) mounted to said brim and connected to the radio transceiver and configured to wirelessly couple digital voice and/or digital packet communication radio signals into a mine communications network (1516) and any surface operation centers; and
   a passive RFID disk transponder (1512) for providing electronic, wireless identification of a miner previously registered and associated with the particular cap-lamp.

2. The cap-lamp and communications support system of claim 1, further comprising:
   a transponder reader (1518) configured for querying the passive RFID disk transponder (1512) such that any miners wearing the cap-lamp that pass by can be automatically identified and transparently logged in.

3. The cap-lamp and communications support system of claim 1, wherein is provided a multi-network cap-lamp with a multi-mode transceiver for voice, synthetic voice, and text messaging via a coal seam waveguide, a conductor/lifeline waveguide, a tunnel waveguide, other radio communication medium and pathway channels, and configured to be automatically selected and preferred according to their current ability to support a particular communication session.

4. The cap-lamp and communications support system of claim 1, further comprising:
   a mine management controller (104) configured for automatic mutual communication through various ever-changing media channels available to them including an ionosphere-earth waveguide (106), a layered earth waveguide (107), a coal seam waveguide (108), a conductor/lifeline waveguide (109), and a tunnel waveguide (110);
   wherein, the cap-lamp transceiver (1508) is further configured for voice and text communications on ultra-low frequency (ULF) to ultra-high frequency (UHF) carrier frequencies using kinds of modulation that instantaneously favor at least a particular one of the ionosphere-earth waveguide (106), layered earth waveguide (107), a coal seam waveguide, a conductor/lifeline waveguide, a tunnel waveguide, other radio communication medium and pathway channels automatically selected.

5. The cap-lamp and communications support system of claim 1, further comprising:
   an intrinsically safe (IS) vertical magnetic dipole (VMD) antenna and F1/F1 through-the-earth (TTE) transceiver repeater, wherein a phase coherent array of resonant VMD antenna elements are configured to each have a circuit-Q of less than unity, and thereby inherently limit currents to safe levels.

6. A cap-lamp and communications support system, comprising:
   a hard plastic shell (1502) on which are directly mounted an LED lamp (1504) and a rechargeable battery (1506);
   a radio transceiver (1508) mounted to the hard plastic shell and powered by the rechargeable battery, and configured to provide two-way voice, data, and SMS text communications underground in a mine;
   a brim-mounted, air-core vertical magnetic dipole (VMD) antenna (1510) connected to the radio transceiver and capable of coupling radio signals into a mine communications network (1516);
   a passive RFID disk transponder (1512) for providing electronic, wireless identification of a registered miner associated with the cap-lamp; and
   a plurality of passive RFID disk transponders (1514) for stationing at fixed, surveyed locations throughout a mine and which are encoded with location information that can be read-in through the VMD antenna and transceiver, wherein such information is interpretable to inform a miner wearing the cap-lamp where they are in the mine.

7. A cap-lamp and communications support system, comprising:
   a hard plastic shell (1502) on which are directly mounted an LED lamp (1504) and a rechargeable battery (1506);
   a radio transceiver (1508) mounted to the hard plastic shell and powered by the rechargeable battery, and configured to provide two-way voice, data, and SMS text communications underground in a mine;
   a brim-mounted, air-core vertical magnetic dipole (VMD) antenna (1510) connected to the radio transceiver and capable of coupling radio signals into a mine communications network (1516); and
   a passive RFID disk transponder (1512) for providing electronic, wireless identification of a registered miner associated with the cap-lamp;
   wherein, the transceiver (1508) is configured to periodically burst a radio wave to power-up and then listen to a reply from nearby passive reverse radio frequency identification (RFID) tags (1514) integrated with a lifeline waveguide (109); and
   said periodic bursts are detectable by Fox Hunter direction finding antennas when locating downed and trapped miners.

* * * * *